(12) United States Patent
Wang et al.

(10) Patent No.: US 12,473,742 B2
(45) Date of Patent: Nov. 18, 2025

(54) CLEANING DEVICE

(71) Applicant: XINGMAI INNOVATION TECHNOLOGY (SUZHOU) CO., LTD., Suzhou (CN)

(72) Inventors: Shengle Wang, Suzhou (CN); Shilei Zhang, Suzhou (CN)

(73) Assignee: XINGMAI INNOVATION TECHNOLOGY (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 19/203,165

(22) Filed: May 8, 2025

(65) Prior Publication Data
US 2025/0270835 A1 Aug. 28, 2025

Related U.S. Application Data

(63) Continuation of application No. 19/031,423, filed on Jan. 18, 2025, which is a continuation-in-part of
(Continued)

(30) Foreign Application Priority Data

| Feb. 16, 2023 | (CN) | 202320232759.7 |
| Apr. 27, 2023 | (WO) | PCT/CN2023/091116 |
| Sep. 8, 2023 | (CN) | 202311159683.0 |
| Nov. 17, 2023 | (CN) | 202311540590.2 |
| Jan. 17, 2024 | (CN) | 202410070430.4 |

(51) Int. Cl.
*E04H 4/16* (2006.01)
*E04H 4/12* (2006.01)
(Continued)

(52) U.S. Cl.
CPC ......... *E04H 4/1654* (2013.01); *E04H 4/1263* (2013.01); *G05D 1/467* (2024.01);
(Continued)

(58) Field of Classification Search
CPC ....... E04H 4/16; E04H 4/1636; E04H 4/1663; E04H 4/1263; E04H 4/1654
(Continued)

(56) References Cited

U.S. PATENT DOCUMENTS

2016/0060887 A1* 3/2016 Tryber .................. E04H 4/1263
15/1.7
2018/0229160 A1* 8/2018 Witelson ................ B01D 29/66

* cited by examiner

*Primary Examiner* — Monica S Carter
*Assistant Examiner* — Sharonda T Felton
(74) *Attorney, Agent, or Firm* — Soleado Law, PC

(57) ABSTRACT

The present disclosure provides a cleaning device, including a cleaning device body, a liquid inlet portion, a liquid outlet portion, a filtering mechanism, and a mode switching member. The filtering mechanism includes at least a filtering box. The filtering box includes at least a filtering box opening for water surface cleaning, a filtering box roller brush assembly, and a drive gear. The filtering box roller brush assembly is disposed at the filtering box opening for water surface cleaning. The drive gear is configured to drive the filtering box roller brush assembly to rotate. The mode switching member is configured for the cleaning device to be switched from a first motion state to a third motion state via a second motion state. A posture of the cleaning device in the first motion state is substantially identical to a posture of the cleaning device in the third motion state.

20 Claims, 24 Drawing Sheets

Related U.S. Application Data application No. PCT/CN2024/076040, filed on Feb. 5, 2024.

(51) Int. Cl.
| | |
|---|---|
| *G05D 1/467* | (2024.01) |
| *G05D 105/10* | (2024.01) |
| *G05D 107/00* | (2024.01) |
| *G05D 109/30* | (2024.01) |

(52) U.S. Cl.
CPC ..... *G05D 2105/10* (2024.01); *G05D 2107/29* (2024.01); *G05D 2109/38* (2024.01)

(58) Field of Classification Search
USPC .......................................................... 15/1.7
See application file for complete search history.

CLEANING DEVICE

CROSS REFERENCE TO RELATED APPLICATIONS

This application is a continuation of U.S. patent application Ser. No. 19/031,423, filed on Jan. 18, 2025, which is a continuation-in-part of International Patent Application No. PCT/CN2024/076040, filed with the World Intellectual Property Organization on Feb. 5, 2024 and entitled "CLEANING APPARATUS".

This international patent application (PCT/CN2024/076040) claims priority to International Patent Application No. PCT/CN2023/091116, filed with the World Intellectual Property Organization on Apr. 27, 2023 and entitled "WALKING APPARATUS FOR USE IN LIQUID, AND SWIMMING POOL CLEANING ROBOT"; Chinese Patent Application No. 202320232759.7, filed with the China National Intellectual Property Administration on Feb. 16, 2023 and entitled "TRANSMISSION APPARATUS AND POOL CLEANING ROBOT"; Chinese Patent Application No. 202311159683.0, filed with the China National Intellectual Property Administration on Sep. 8, 2023 and entitled "FILTERING ASSEMBLY AND UNDERWATER CLEANING DEVICE"; Chinese Patent Application No. 202311540590.2, filed with the China National Intellectual Property Administration on Nov. 17, 2023 and entitled "FILTERING ASSEMBLY AND UNDERWATER CLEANING DEVICE"; and Chinese Patent Application No. 202410070430.4, filed with the China National Intellectual Property Administration on Jan. 17, 2024 and entitled "POOL ROBOT AND CONTROL METHOD THEREOF, AND STORAGE MEDIUM", which are hereby incorporated by reference herein.

TECHNICAL FIELD

The present disclosure relates to the technical field of operating devices for liquid, and in particular, to a cleaning device.

BACKGROUND

Swimming pool cleaning and maintenance are essential to keep water clean and the swimming pool hygienic. Swimming pool cleaning robots in the market can be classified into three categories. For the first category, the cleaning robot can clean the bottom of the swimming pool only. For the second category, the cleaning robot can clean both the bottom and vertical wall surfaces of the swimming pool, but the cleaning robot should operate under a water surface. For the third category, the cleaning robot constantly floats on the water surface and cleans only the water surface. The three categories of swimming pool cleaning robots have their own characteristics, but these swimming pool cleaning robots cannot effectively adjust positions in a liquid environment and their depth in the liquid environment based on actual needs. As a result, the bottom of the swimming pool, the wall surfaces of the swimming pool, and the water surface cannot be comprehensively cleaned. Consequently, application ranges and operating efficiencies of these cleaning robots are limited.

Therefore, there is a need for a cleaning device which can be flexibly switched between a position on a liquid surface and a position under the liquid surface, to improve the operating efficiency of cleaning water and the application range and reduce cleaning costs.

SUMMARY OF THE DISCLOSURE

The present disclosure provides a cleaning device, including a cleaning device body. The cleaning device body includes: a liquid inlet portion, including at least a first water inlet and a second water inlet; a liquid outlet portion, including at least a first water outlet; a filtering mechanism, including at least a filtering box, where the filtering box includes at least a filtering box opening for underwater cleaning, a filtering box opening for water surface cleaning, and an outlet, the filtering box opening for underwater cleaning is in fluid communication with the first water inlet, the filtering box opening for water surface cleaning is in fluid communication with the second water inlet, and the outlet is in fluid communication with the first water outlet; and a drive mechanism, configured to generate a suction force, so that a first water flow path is formed by using at least the first water inlet, the filtering mechanism, and the liquid outlet portion. The filtering box further includes at least one filtering box roller brush assembly and at least one drive gear. The filtering box roller brush assembly is disposed at the filtering box opening for water surface cleaning. The drive gear is configured to drive the filtering box roller brush assembly to rotate. The cleaning device body further includes: a power mechanism, where the power mechanism includes at least a motor, and the motor is in transmission connection to the drive gear; and when the filtering box is removed from the cleaning device body, the filtering box roller brush assembly and the drive gear are removed simultaneously from the cleaning device body with the filtering box; and a mode switching member, including: a buoyancy cavity, configured to accommodate at least gas; an air inlet, configured for gas to enter the buoyancy cavity; and a buoyancy adjustment part, configured to drive the gas to enter the buoyancy cavity through the air inlet. The mode switching member is configured for the cleaning device to be switched from a first motion state to a third motion state via a second motion state. The cleaning device performs underwater cleaning in the first motion state. The cleaning device cleans a pool wall or a waterline in the second motion state. The cleaning device performs water surface cleaning in the third motion state. A posture of the cleaning device in the first motion state is substantially identical to a posture of the cleaning device in the third motion state.

BRIEF DESCRIPTION OF THE DRAWINGS

To more clearly describe the technical solutions in embodiments of the present disclosure, the following briefly introduces the accompanying drawings required for describing embodiments. It is clear that the accompanying drawings in the following description show merely some embodiments of the present disclosure, and a person of ordinary skill in the art may still derive other drawings from these accompanying drawings without creative efforts.

REFERENCE NUMERALS IN THE DRAWINGS

Figure 1:
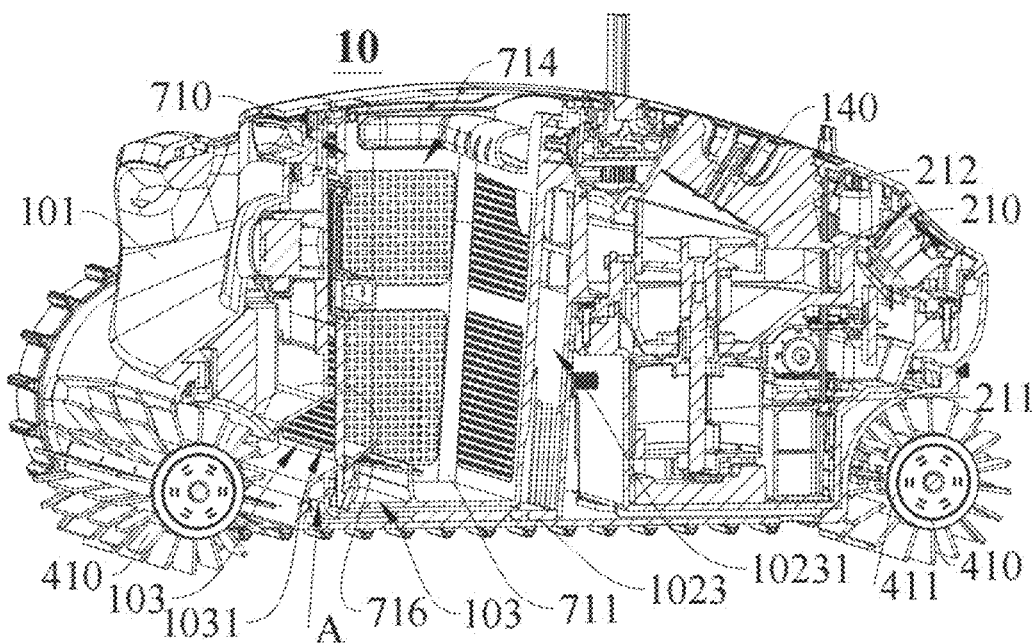
FIG. 1 is a schematic cross-sectional diagram of a cleaning device from a first angle according to a first embodiment of the present disclosure.

10: cleaning device; 101: cleaning device body; 101a: front wall; 101b: left side wall; 101c: right side wall; 1023: filtering box cavity; 10232: filtering box cavity opening; 10233: filtering box cavity duct; 10231: second cavity; 103: liquid inlet portion; 1031: first water inlet; 1032: second water inlet; 104: liquid outlet portion; 106: garbage guiding member; 1061: first port; 1062: second port; 100: movement propulsion mechanism; 111: track; 112: wheel; 1121: first wheel; 11211: drive paddle; 1122: second wheel; 120: transmission assembly; 121: movement drive part; 122: first gear; 123: first driven part; 1231: sixth gear 1232: seventh gear; 1233: eighth gear; 124: second driven part; 1241: second gear; 1242: third gear; 1243: transmission belt; 1244: fourth gear; 1245: fifth gear; 131: first propeller; 1311: first propeller impeller; 1312: first propeller motor; 1313: first propeller opening; 132: second propeller; 210: main water pump; 211: main water pump motor; 212: main water pump impeller; 213: main pump water inlet; 214: main pump water outlet; 215: main water pump impeller casing; 410: first cleaning part; 411: roller brush for underwater cleaning; 420: second cleaning part; 421: roller brush for water surface cleaning; 430: cleaning member; 431: rotary brush; 432: rotation shaft; 4311: cleaning portion; 43111: cleaning surface; 440: connection portion; 441: fixed portion; 442: telescopic portion; 450: first transmission mechanism; 451: oscillating gear; 452: worm gear; 453: worm; 454: transmission gear; 461: first direction shaft; 462: second direction shaft; 510: mode switching member; 511: buoyancy adjustment assembly; 5111: buoyancy cavity; 5112: buoyancy cavity pump; 5113: air inlet; 5114: connection duct; 710: filtering assembly; 711: filtering box; 7111a: first side surface; 7111b: second side surface; 7111c: third side surface; 7111d: fourth side surface; 7111e: fifth side surface; 714: first cavity; 715: flow guiding opening; 716: filtering box water inlet portion; 7161: filtering box opening for water surface cleaning; 7162: filtering box opening for underwater cleaning; 717: filtering box roller brush assembly; 718: filtering box opening cover plate for water surface cleaning; 719: filtering box opening cover plate for underwater cleaning; 720: cover part; 720a: first end; 720b: second end; 721: adjustment part mounting portion; 722: accommodating channel; 723: pivoting portion; 724: lap portion; 725: inner side surface; 730a, 730b: adjustment part; 731: moving part; 740: mounting bracket; 741: grill hole; 742: accommodating cavity; 743: pivoting portion mounting groove; 744: mounting portion; 745: mounting buckle; 770: first filtering assembly; 780: second filtering assembly; 790: valve part; 30: liquid surface; 40: target region; 401: target bottom wall; 402: target side wall; 50: electronic device; 51: memory; 52: processor; 60: computer-readable storage medium; 601: program instruction.

DETAILED DESCRIPTION

The following clearly and completely describes the technical solutions in embodiments of the present disclosure with reference to the accompanying drawings in embodiments of the present disclosure. Apparently, the described embodiments are merely some but not all of embodiments of the present disclosure. All other embodiments obtained by a person of ordinary skill in the art based on embodiments of the present disclosure without creative efforts shall fall within the protection scope of the present disclosure.

Figure 2:
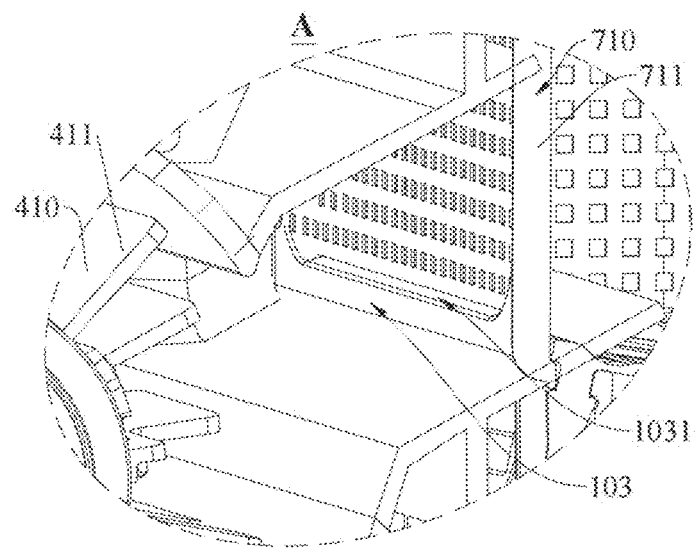
FIG. 2 is a schematic enlarged diagram of a portion A shown in FIG. 1.
Figure 3:
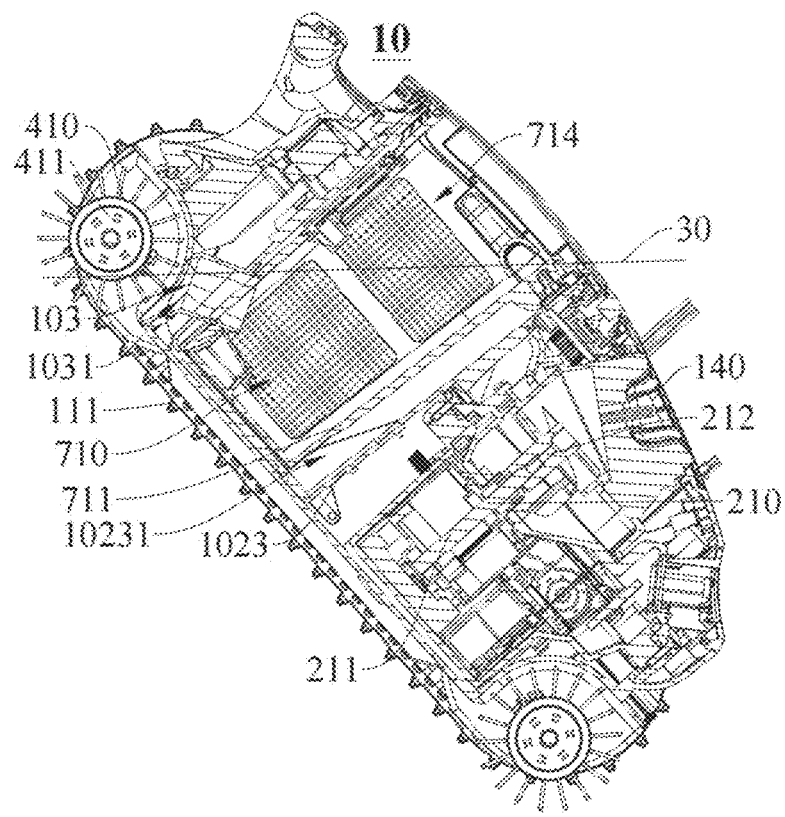
FIG. 3 is a schematic cross-sectional diagram of a cleaning device from a second angle according to a first embodiment of the present disclosure.

FIG. 1 is a schematic cross-sectional diagram of a cleaning device from a first angle according to a first embodiment of the present disclosure. FIG. 2 is a schematic enlarged diagram of a portion A shown in FIG. 1. FIG. 3 is a schematic cross-sectional diagram of the cleaning device from a second angle according to the first embodiment of the present disclosure.

Figure 7:
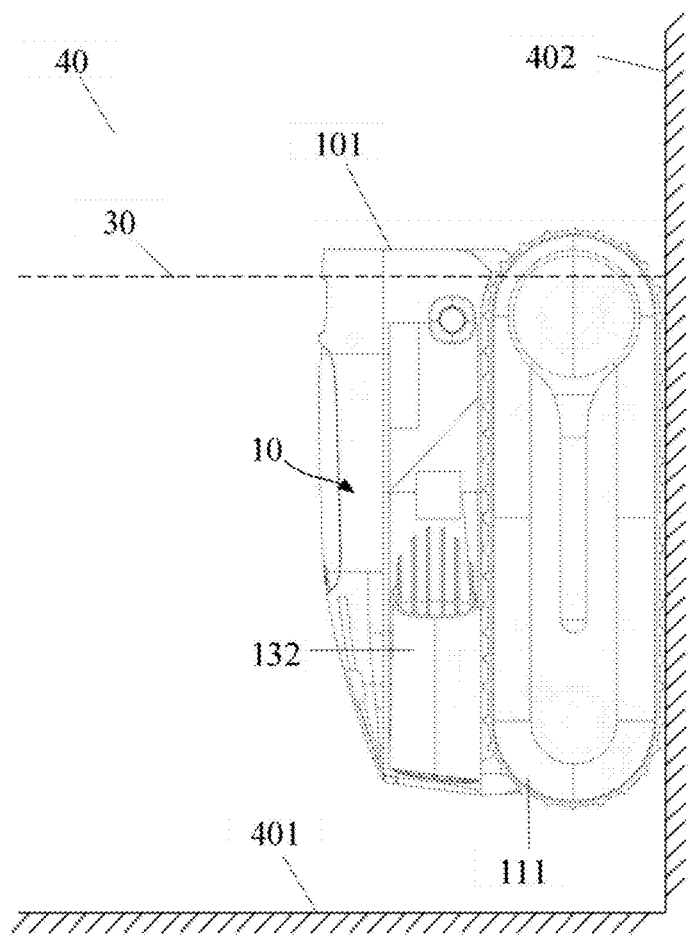
FIG. 7 is a schematic diagram of movement of a cleaning device on a side wall of a target region according to a second embodiment of the present disclosure.
Figure 8:
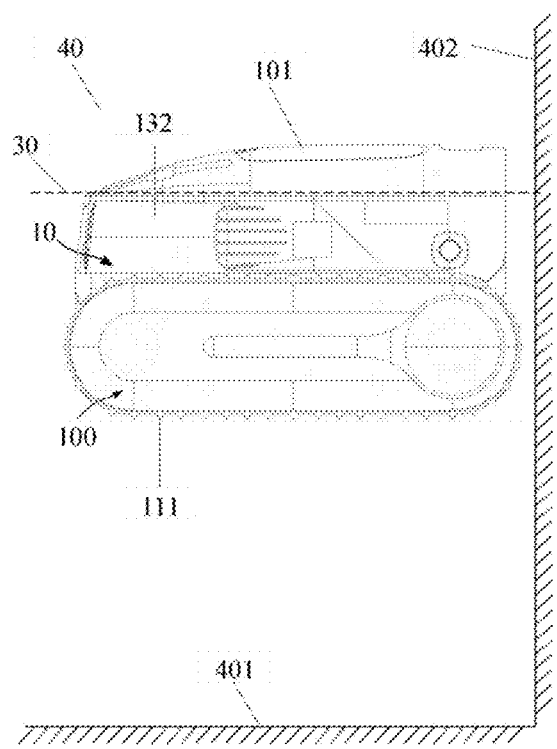
FIG. 8 is a schematic diagram of floating of a cleaning device on a liquid surface according to a second embodiment of the present disclosure.

Cleaning device 10 on the market cannot effectively adjust positions in a liquid environment and their depth in the liquid environment based on actual needs. As a result, the bottom of a swimming pool, wall surfaces of the swimming pool, and a water surface cannot be comprehensively cleaned. Consequently, application ranges and operating efficiencies of these cleaning robots are limited. The present disclosure provides a cleaning device 10. The cleaning device 10 is configured to clean stains and floating objects in a target region 40 (as illustrated in FIG. 7). The target region 40 may be a pool, a swimming pool, or the like. The cleaning device 10 may be a pool cleaning robot, a swimming pool cleaning robot, an underwater cleaning device, or the like. This is not limited herein. The cleaning device 10 of the present disclosure can be flexibly switched between a position on a liquid surface 30 and a position under the liquid surface 30, so that the cleaning device 10 can comprehensively clean the target region 40. This improves an operating efficiency of cleaning liquid in the target region 40 and an application range and reduces cleaning costs of the target region 40.

A cleaning device body 101 is configured to move within the target region 40 that contains liquid and be switched between the position on the liquid surface 30 and the position under the liquid surface 30. The target region 40 may be a region in which the cleaning device body 101 moves and the liquid is contained. The target region 40 may include a swimming pool. For example, the cleaning device body 101 may move in water in the swimming pool and be switched between a position on a water surface of the swimming pool and a position under the water surface of the swimming pool. In some embodiments, the target region 40 may be other regions. For example, the target region 40 may include an oil well, a sewer, and the like. The target region 40 may include a target bottom wall 401 and a target side wall 402. In some embodiments, the cleaning device body 101 may move on the target bottom wall 401 and the target side wall 402 of the target region 40. For example, the cleaning device body 101 may move on the target bottom wall 401 and the target side wall 402 of the swimming pool. For details about movement of the cleaning device body 101 on the target bottom wall 401 and the target side wall 402 of the target region 40, refer to the following description.

The cleaning device 10 includes the cleaning device body 101, a drive mechanism, a filtering mechanism, a liquid inlet portion 103, and a liquid outlet portion 104. The drive mechanism is disposed on the cleaning device body 101. The drive mechanism is configured to generate a certain suction force to guide a flow direction of liquid. The filtering mechanism is disposed on the cleaning device body 101 and is configured to collect stains and floating objects in the target region 40 and filter liquid. The liquid inlet portion 103 is configured for liquid to enter the cleaning device body 101. The liquid inlet portion 103 includes at least a first water inlet 1031. The first water inlet 1031 is provided on the cleaning device body 101. In other words, the liquid enters the cleaning device body 101 through the first water inlet 1031. The liquid outlet portion 104 is configured for the liquid inside the cleaning device body 101 to be drained from the cleaning device body 101. The liquid outlet portion 104 includes at least a first water outlet, 140. The first water outlet is provided on the cleaning device body 101. In other words, the liquid is drained from the cleaning device body 101 through the first water outlet. The filtering mechanism includes at least a first inlet and an outlet. The first inlet communicates with the first water inlet 1031. The outlet communicates with the first water outlet. The first water inlet 1031, the filtering mechanism, the drive mechanism, and the first water outlet sequentially communicate with each other to form a first water flow path. Under guidance of the drive mechanism, the liquid enters the cleaning device body 101 through the first water inlet 1031, flows towards the first inlet, the filtering mechanism, the outlet, and the drive mechanism, and then is drained from the cleaning device body 101 through the first water outlet. In an actual process, the liquid may flow reversely. In other words, the liquid sequentially flows towards the first water outlet, the drive mechanism, the filtering mechanism, and the first water inlet 1031. This is not limited herein.

Figure 4:
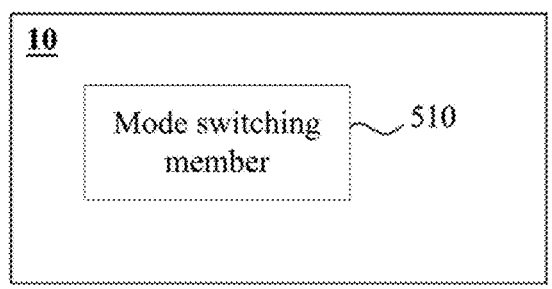
FIG. 4 is a schematic diagram of modules of a cleaning device according to a second embodiment of the present disclosure.
Figure 5:
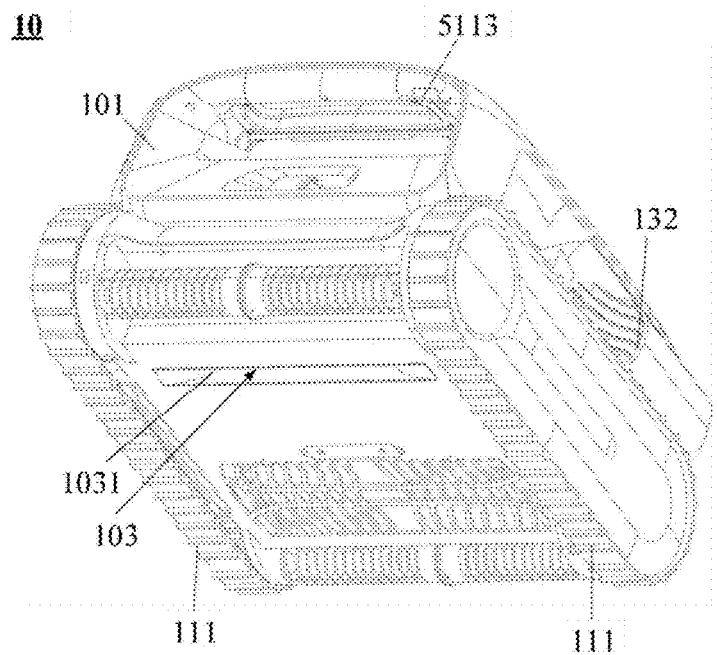
FIG. 5 is a schematic diagram of a structure of a cleaning device according to a second embodiment of the present disclosure.

FIG. 4 is a schematic diagram of modules of the cleaning device according to a second embodiment of the present disclosure. FIG. 5 is a schematic diagram of a structure of the cleaning device according to the second embodiment of the present disclosure. With reference to FIG. 1 to FIG. 3, the cleaning device body 101 includes a mode switching member 510. The mode switching member 510 is configured for the cleaning device 10 to be switched between the position on the liquid surface 30 and the position under the liquid surface 30. The mode switching member 510 may move along a vertical direction of the target region 40, so that the cleaning device 10 can be switched between the position on the liquid surface 30 and the position under the liquid surface 30. When the cleaning device 10 is located under the liquid surface 30, the cleaning device 10 is fully submerged. When the cleaning device 10 is located at the liquid surface 30, at least a part of the cleaning device 10 is located at the liquid surface 30. Therefore, by providing the first water inlet 1031 on the cleaning device body 101 and under the action of the mode switching member 510, the cleaning device 10 can be adjusted to perform at least two operating conditions: underwater cleaning and water surface cleaning, thereby meeting various use requirements.

Figure 10:
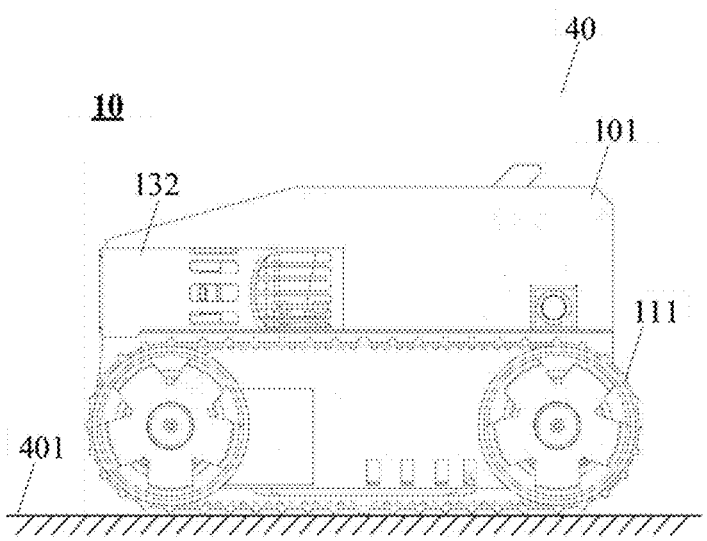
FIG. 10 is a schematic diagram of movement of a cleaning device on a bottom wall of a target region according to a third embodiment of the present disclosure.
Figure 11:
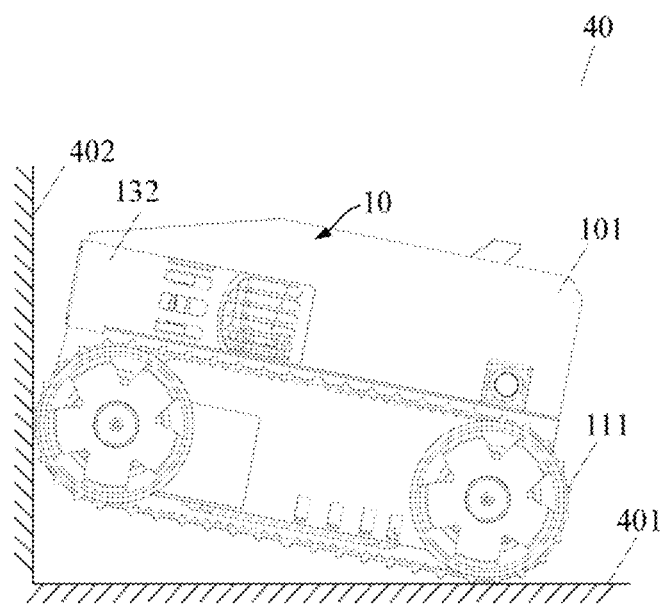
FIG. 11 is a schematic diagram of movement of a cleaning device on a bottom wall and a side wall of a target region according to a third embodiment of the present disclosure.
Figure 12:
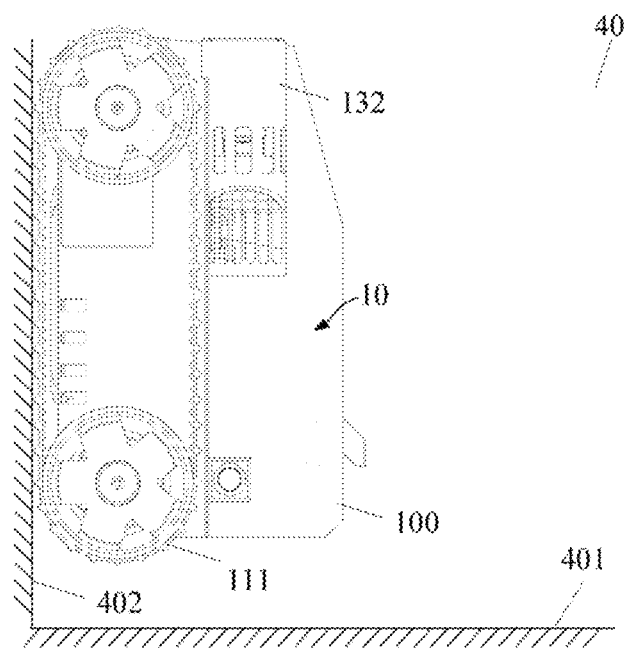
FIG. 12 is a schematic diagram of movement of a cleaning device on a side wall of a target region according to a third embodiment of the present disclosure.

With reference to FIG. 7, FIG. 8, FIG. 10, FIG. 11, and FIG. 12, a first motion state is defined as a state in which the cleaning device 10 moves on the bottom wall 401, or an angle between the bottom wall 401 and an overall direction of the cleaning device 10 is less than 90° and the cleaning device 10 is away from the liquid surface 30. As shown in FIG. 10, that the cleaning device 10 is away from the liquid surface 30 may be understood as that the cleaning device 10 cleans the bottom of the pool or performs an action underwater. A second motion state is defined as a state in which the cleaning device 10 moves on the side wall 402, or the overall direction of the cleaning device 10 is substantially parallel to the side wall 402, as shown in FIG. 7 and FIG. 12. A third motion state is defined as a state in which the cleaning device 10 moves on the liquid surface 30, or the cleaning device 10 is at least partially exposed at the liquid surface 30, or the cleaning device 10 is entirely located under the liquid surface 30 and close to the liquid surface 30. That the cleaning device 10 is close to the liquid surface 30 may be understood as that a distance between the cleaning device 10 and the liquid surface 30 is less than a threshold and the cleaning device 10 can perform water surface cleaning. The overall direction of the cleaning device 10 is defined as a direction of a plane in which a movement propulsion mechanism 100 of the cleaning device 10, for example, a track 111 or a wheel 112, is in contact with a to-be-cleaned surface.

Therefore, under the action of the mode switching member 510, the cleaning device 10 can be switched between the position on the liquid surface 30 and the position under the liquid surface 30, so that the cleaning device 10 is switched between the first motion state and the third motion state. The cleaning device can perform underwater cleaning in the first motion state. The cleaning device can perform water surface cleaning in the third motion state. Therefore, the cleaning device 10 can be adjusted to perform at least two operating conditions: underwater cleaning and water surface cleaning, thereby meeting various use requirements.

In some embodiments, the cleaning device 10 further has the second motion state. The cleaning device can clean a pool wall or a waterline in the second motion state. Switching of the cleaning device 10 between the first motion state and the third motion state may include or exclude switching of the second motion state. In other words, the cleaning device may have the first motion state and the third motion state, or the cleaning device may have the first motion state, the second motion state, and the third motion state. The second motion state may be selected based on an actual requirement. This is not limited herein.

In some embodiments, the liquid inlet portion includes the first water inlet 1031. The first water inlet 1031 is located at a lower front part of the cleaning device body 101. The first water inlet 1031 is configured to perform both underwater cleaning and water surface cleaning. When the cleaning device 10 performs underwater cleaning, the first water inlet 1031 is located under the liquid surface 30 and can suck garbage under the liquid surface 30. When the cleaning device 10 performs water surface cleaning, the first water inlet 1031 is at least partially exposed at the liquid surface 30 and can suck garbage floating at the liquid surface 30. In other words, the cleaning device body 101 can implement underwater cleaning and water surface cleaning through the first water inlet 1031 and by adjusting an attitude of the cleaning device 10 in the target region 40, so that a cleaning efficiency is improved. Liquid sequentially flows through the first water inlet 1031, the first inlet, the filtering mechanism, the outlet, the drive mechanism, and the liquid outlet portion. In the above embodiment, when the cleaning device 10 performs underwater cleaning, the attitude of the cleaning device 10 is in a normal state. When the cleaning device 10 performs water surface cleaning, a front part of the cleaning device 10 is lifted upward to be exposed at the liquid surface 30, so that the first water inlet 1031 is at least partially exposed at the liquid surface 30. When the cleaning device cleans the bottom of the pool and the water surface, attitudes of the cleaning device are substantially the same.

In other embodiments, the liquid inlet portion 1031 includes the first water inlet 1031. The first water inlet 1031 is located at the bottom of the cleaning device body 101. The first water inlet 1031 is configured to perform both underwater cleaning and water surface cleaning. When the cleaning device 10 performs underwater cleaning, the first water inlet 1031 is located under the liquid surface 30 and faces a to-be-cleaned surface. When the cleaning device 10 performs water surface cleaning, the first water inlet 1031 is located under the liquid surface 30 but is close to the liquid surface 30 and faces the liquid surface 30. In other words, the cleaning device body 101 can implement underwater cleaning and water surface cleaning through the first water inlet 1031 and by adjusting the attitude of the cleaning device 10 in the target region 40, so that a cleaning efficiency is improved. Liquid sequentially flows through the first water inlet 1031, the first inlet, the filtering mechanism, the outlet, the drive mechanism, and the liquid outlet portion. In the above embodiment, when the cleaning device 10 performs underwater cleaning, the attitude of the cleaning device 10 is in a normal state. When the cleaning device 10 performs water surface cleaning, the cleaning device 10 can be flipped, that is, the bottom of the cleaning device 10 faces upward. When the bottom of the cleaning device 10 faces upward, the filtering mechanism may be in a closed state, so that a risk of leaking garbage from the filtering mechanism is reduced.

In some embodiments, the liquid inlet portion 103 includes the first water inlet 1031 and a second water inlet 1032. The first water inlet 1031 is provided at the bottom of the cleaning device body 101. When the cleaning device 10 cleans the bottom or the wall of the pool, the first water inlet 1031 is close to the bottom or the wall of the pool to suck water into the cleaning device 10. The liquid inlet portion 103 includes the second water inlet 1032. In other words, liquid enters the cleaning device body 101 through the second water inlet 1032. The second water inlet 1032 is provided at a side surface of a front part of the cleaning device body 101. When the cleaning device 10 performs water surface cleaning, the second water inlet 1032 is at least partially exposed at the liquid surface 30 and can suck garbage floating at the liquid surface 30. The cleaning device 10 can implement water surface cleaning through the second water inlet 1032. In addition, the first water inlet 1031 and the second water inlet 1032 may operate cooperatively to improve the cleaning efficiency of the cleaning device 10. When the cleaning device cleans the bottom of the pool and the water surface, attitudes of the cleaning device are substantially the same.

In some embodiments, the liquid inlet portion 103 includes the first water inlet 1031 and the second water inlet 1032. The first water inlet 1031 is provided at the bottom of the cleaning device body 101. The second water inlet 1032 is provided on a top part or a side part of the cleaning device body 101. The first water inlet 1031 is configured to clean the bottom or the wall of the pool. The second water inlet 1032 is configured to perform water surface cleaning. When the second water inlet 1032 is provided at the top part of the cleaning device body 101, the cleaning device 10 floats up to be close to the liquid surface 30, and the attitude of the cleaning device 10 is the same as that existing when the cleaning device moves on the bottom of the pool. The second water inlet 1032 is opened and is located close to and under the liquid surface under the action of the drive mechanism, such as a main water pump, so that trash on the liquid surface enters the cleaning device 10 through the second water inlet 1032. When the second water inlet 1032 is provided on the side part of the cleaning device body 101, the attitude of the cleaning device 10 may be adjusted in a process in which the cleaning device 10 floats up to be close to the liquid surface 30 until the second water inlet 1032 faces the liquid surface 30 and is located under and close to the liquid surface 30.

In some embodiments, the liquid inlet portion 103 includes the first water inlet 1031 and the second water inlet 1032. In addition to being provided at the lower front part of the cleaning device body 101, the first water inlet 1031 may alternatively be provided at a lower rear part of the cleaning device body 101 or a side surface of the cleaning device body 101. It should be noted that a position of the liquid inlet portion 103 is related to a position of the filtering mechanism. When the filtering mechanism is disposed at the front part of the cleaning device 10, the liquid inlet portion 103 is provided at the front part of the cleaning device 10. When the filtering mechanism is disposed at the rear part of the cleaning device 10, the liquid inlet portion 103 is provided at the rear part of the cleaning device 10.

In some embodiments, the filtering mechanism includes a filtering assembly 710. The filtering assembly 710 has a filtering function. The filtering assembly 710 includes the first inlet. The first water inlet 1031 and the second water inlet 1032 both communicate with the first inlet of the filtering assembly 710. Under the action of the drive mechanism, at least a part of liquid sequentially flows through the first water inlet 1031, the first inlet, the filtering assembly 710, the drive mechanism, and the liquid outlet portion 104. At least a part of the liquid sequentially flows through the second water inlet 1032, the first inlet, the filtering assembly 710, the drive mechanism, and the liquid outlet portion 104. The first water inlet 1031 and the second water inlet 1032 both communicate with the first inlet to improve the cleaning efficiency of the cleaning device 10. The second water inlet 1032 and the first inlet may communicate with each other through a duct or the like.

The filtering mechanism may include one, two, three or more filtering assemblies 710. A quantity of filtering assemblies 710 may be determined based on an actual requirement. When there are two, three, or more filtering assemblies 710, adjacent filtering assemblies 710 may be connected to each other in series or in parallel, which may be determined based on various use requirements of the cleaning device 10. This is not limited herein.

In some embodiments, the filtering mechanism includes one filtering assembly 710. The filtering assembly 710 includes the first inlet and a second inlet. The first water inlet 1031 communicates with the first inlet of the filtering assembly 710. The second inlet and the first inlet are located on different surfaces of the filtering mechanism. In other words, at least a part of the liquid sequentially flows through the first water inlet 1031, the first inlet, the filtering assembly 710, the drive mechanism, and the liquid outlet portion 104. The second water inlet 1032 communicates with the second inlet of the filtering assembly 710. In other words, at least a part of the liquid sequentially flows through the second water inlet 1032, the second inlet, the filtering assembly 710, the drive mechanism, and the liquid outlet portion 104. The first water inlet 1031 communicates with the first inlet, and the second water inlet 1032 communicates with the second inlet, so that liquid flow paths are increased. In this way, cleaning requirements of at least two operating conditions: underwater cleaning and water surface cleaning are met, thereby meeting various use requirements.

In some embodiments, the filtering mechanism includes two filtering assemblies 710. The two filtering assemblies 710 include a first filtering assembly 770 and a second filtering assembly 780. The first filtering assembly 770 is provided with the first inlet. The second filtering assembly 780 is provided with a second inlet. The first water inlet 1031 communicates with the first inlet of the first filtering assembly 770. In other words, at least a part of the liquid sequentially flows through the first water inlet 1031, the first inlet, the first filtering assembly 770, the drive mechanism, and the liquid outlet portion 104. The second water inlet 1032 communicates with the second inlet of the second filtering assembly 780. In other words, at least a part of the liquid sequentially flows through the second water inlet 1032, the second inlet, the second filtering assembly 780, the drive mechanism, and the liquid outlet portion 104. The two filtering assemblies 710 are configured to implement different liquid flow paths to improve the cleaning efficiency of the cleaning device 10.

Figure 17:
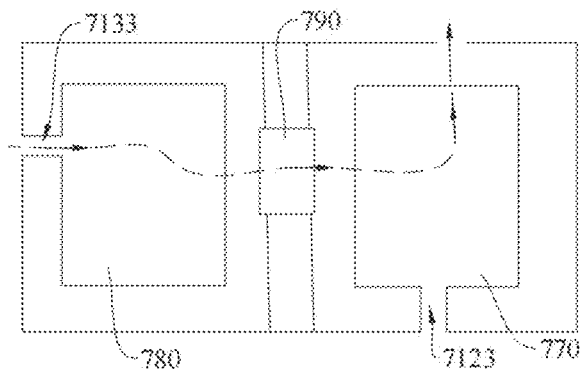
FIG. 17 is a first brief diagram of a filtering mechanism of a cleaning device according to the present disclosure.
Figure 18:
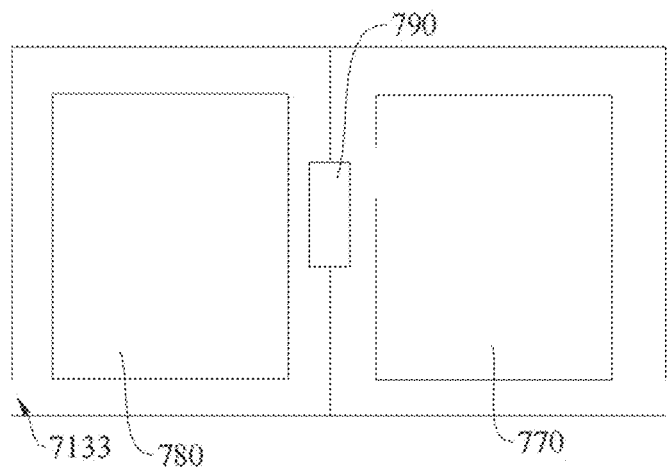
FIG. 18 is a second brief diagram of a filtering mechanism of a cleaning device according to the present disclosure.
Figure 19:
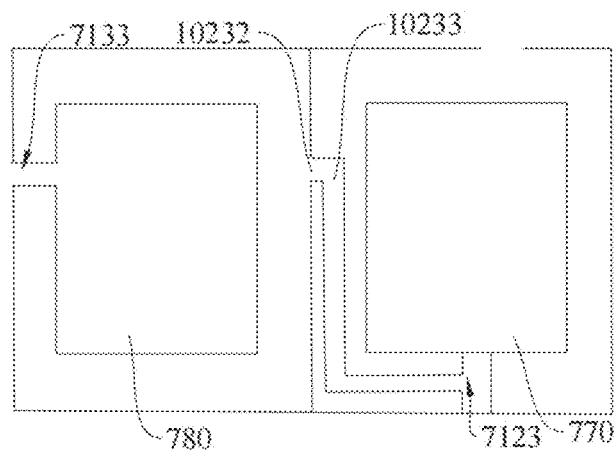
FIG. 19 is a third brief diagram of a filtering mechanism of a cleaning device according to the present disclosure.

FIG. 17 is a first brief diagram of the filtering mechanism of the cleaning device according to the present disclosure. FIG. 18 is a second brief diagram of the filtering mechanism of the cleaning device according to the present disclosure. FIG. 19 is a third brief diagram of the filtering mechanism of the cleaning device according to the present disclosure. In some embodiments, the liquid inlet portion 103 includes the first water inlet 1031 and the second water inlet 1032. The filtering mechanism includes the first filtering assembly 770 and the second filtering assembly 780. The second filtering assembly 780 is sleeved inside the first filtering assembly 770. The first water inlet 1031 communicates with the first inlet 7123 of the first filtering assembly 770. The first water inlet 1031 is configured for the liquid to enter the first filtering assembly 770 through the first inlet 7123. The second water inlet 1032 communicates with the second inlet 7133 of the second filtering assembly 780. The second water inlet 1032 is configured for the liquid to enter the second filtering assemble 780 through the second inlet 7133. When the cleaning device 10 performs underwater cleaning, the liquid sequentially flows through the first water inlet 1031, the first inlet 7123, the first filtering assembly 770, and a main water pump 210, so that the cleaning device 10 implements underwater cleaning. When the cleaning device 10 performs water surface cleaning, the liquid sequentially flows through the second water inlet 1032, the second inlet 7133, the second filtering assembly 780, the first filtering assembly 770, and the main water pump 210, so that the cleaning device 10 implements water surface cleaning. When the cleaning device 10 performs water surface cleaning, the liquid flows through double layers of filtering boxes, so that the cleaning efficiency of the cleaning device 10 in water surface cleaning is improved.

By connecting the two filtering assemblies 710 in series, the first water inlet 1031 communicates with the first inlet 7123 of the first filtering assembly 770, and the second water inlet 1032 communicates with the second inlet 7133 of the second filtering assembly 780, so that the cleaning device 10 can perform underwater cleaning and water surface cleaning. This expands usage scenarios of the cleaning device 10 and improves user experience. Structures of the first filtering assembly 770 and the second filtering assembly 780 may be substantially the same or different. This is not limited herein.

When the cleaning device 10 performs underwater cleaning, the second water inlet 1032 or the second inlet 7133 may be closed to prevent the second water inlet 1032, the second filtering assembly 780, and the main water pump 210 from diverting liquid and to ensure a liquid sucking effect at the first water inlet 1031 and the first inlet 7123. In an actual process, when a power of the main water pump 210 is sufficiently high, the second water inlet 1032 or the second inlet 7133 may alternatively not be closed. Similarly, when the cleaning device 10 performs water surface cleaning, the first water inlet 1031 or the first inlet 7123 may be closed to prevent the first water inlet 1031, the first filtering assembly 770, and the main water pump 210 from diverting liquid and to ensure the liquid sucking effect at the second water inlet 1032 and the second inlet 7133. In an actual process, when the power of the main water pump 210 is sufficiently high, the first water inlet 1031 or the first inlet 7123 may alternatively not be closed.

In some embodiments, the cleaning device body 101 includes a first sub-filtering box cavity, a second sub-filtering box cavity, and the liquid inlet portion 103. The first sub-filtering box cavity and the second sub-filtering box cavity are disposed side by side. In other words, the first sub-filtering box cavity and the second sub-filtering box cavity are independent of each other. The liquid inlet portion 103 is configured for the liquid to enter the cleaning device body 101. The liquid inlet portion 103 includes the first water inlet 1031 and the second water inlet 1032. The filtering mechanism includes the first filtering assembly 770 and the second filtering assembly 780. The first filtering assembly 770 is disposed in the first sub-filtering box cavity. The second filtering assembly 780 is disposed in the second sub-filtering box cavity. The first water inlet 1031 communicates with the first inlet 7123 of the first filtering assembly 770. The first water inlet 1031 is configured for the liquid to enter the first filtering assembly 770 through the first inlet 7123. The second water inlet 1032 communicates with the second inlet 7133 of the second filtering assembly 780. The second inlet is configured for the liquid to enter the second filtering assembly 780 through the second inlet 7133. The main water pump 210 communicates with the first sub-filtering box cavity and the second sub-filtering box cavity.

When the cleaning device 10 performs underwater cleaning, under the action of the main water pump 210, the liquid sequentially flows through the first water inlet 1031, the first inlet 7123, the first filtering assembly 770, and the main water pump 210. When the cleaning device 10 performs water surface cleaning, under the action of the main water pump 210, the liquid sequentially flows through the second water inlet 1032, the second inlet 7133, the second filtering assembly 780, and the main water pump 210. By connecting the two filtering assemblies 710 in parallel, two water flow paths are independently controlled and do not affect each other. Corresponding closed structures are disposed on the two water flow paths, so that the two water flow paths are independent of each other. The closed structure may be disposed at a position that needs to be closed, such as a junction of the first sub-filtering box cavity and the second sub-filtering box cavity. This is not limited herein. There may be one or two main water pumps 210. When there is one main water pump 210, the first filtering assembly 770 and the second filtering assembly 780 share the main water pump 210. When there are two main water pumps 210, one main water pump 210 communicates with the first filtering assembly 770, and the other main water pump 210 communicates with the second filtering assembly 780.

In some embodiments, as shown in FIG. 19, the first sub-filtering box cavity and the second sub-filtering box cavity are isolated from each other. The main water pump 210 acts on the first sub-filtering box cavity. The second sub-filtering box cavity is provided with a filtering box cavity opening 10232. The filtering box cavity opening 10232 communicates, through a filtering box cavity duct 10233, with the first inlet 7123 of the first filtering assembly 770 disposed in the first sub-filtering box cavity, so that during water surface cleaning, the liquid sequentially flows through the second filtering assembly 780 and the first filtering assembly 770, to implement a good water surface cleaning effect.

In some embodiments, the cleaning device body 101 includes the first sub-filtering box cavity, the second sub-filtering box cavity, and the liquid inlet portion 103. The first sub-filtering box cavity and the second sub-filtering box cavity are disposed side by side. In other words, the first sub-filtering box cavity and the second sub-filtering box cavity are independent of each other. The liquid inlet portion 103 is configured for the liquid to enter the cleaning device body 101. The liquid inlet portion 103 includes the first water inlet 1031 and the second water inlet 1032. The filtering mechanism includes the first filtering assembly 770, the second filtering assembly 780, and a valve part 790. The first filtering assembly 770 is disposed in the first sub-filtering box cavity. The second filtering assembly 780 is disposed in the second sub-filtering box cavity. The valve part 790 may communicate with the first sub-filtering box cavity and the second sub-filtering box cavity in an open-close manner. When the valve 790 is opened, the first sub-filtering box cavity communicates with the second sub-filtering box cavity. When the valve part 790 is closed, the first sub-filtering box cavity dis-communicates with the second sub-filtering box cavity.

Specifically, when the cleaning device 10 performs underwater cleaning, the valve part 790 is closed. The liquid sequentially flows through the first water inlet 1031, the first inlet 7123 of the first filtering assembly 770, the first filtering assembly 770, the first sub-filtering box cavity, and the main water pump 210, and is drained from the cleaning device 10, so that the cleaning device 10 implements underwater cleaning. When the cleaning device 10 performs water surface cleaning, the valve part 790 is opened. The liquid sequentially flows through the second water inlet 1032, the second inlet 7133 of the second filtering assembly 780, the second filtering assembly 780, a space between the second filtering assembly 780 and the second sub-filtering box cavity, the valve part 790, the first filtering assembly 770, and the main water pump 210, and is drained from the cleaning device 10, so that the cleaning device 10 implements water surface cleaning. In this way, the two water flow paths are independently controlled and do not affect each other. In addition, when the cleaning device 10 performs water surface cleaning, the second filtering assembly 780 and the first filtering assembly 770 are disposed to increase the water flow path, thereby improving the cleaning efficiency of the cleaning device 10 in water surface cleaning. A specific structure of the valve part 790 is not limited herein, provided that the valve part 790 can be opened and closed. Certainly, in other embodiments, the filtering mechanism may not include the valve part 790, and the first filtering assembly 770 and the second filtering assembly 780 directly communicate with each other through a duct or the like. A structure, for example, a cover plate, may be disposed at the second inlet of the second filtering assembly 780, and the cover plate may close the second inlet in an open-close manner.

The first filtering assembly 770 and second filtering assembly 780 may extend along a moving direction of the cleaning device 10. In other words, the first filtering assembly 770 and the second filtering assembly 780 are disposed one behind the other. Alternatively, the first filtering assembly 770 and the second filtering assembly 780 are disposed along a direction perpendicular to the moving direction of the cleaning device 10. In other words, the first filtering assembly 770 and the second filtering assembly are disposed side by side. Alternatively, the first filtering assembly 770 and the second filtering assembly 780 are disposed vertically. Certainly, the first filtering assembly 770 and the second filtering assembly 780 may be disposed side by side in another manner. This is not limited herein.

Figure 20:
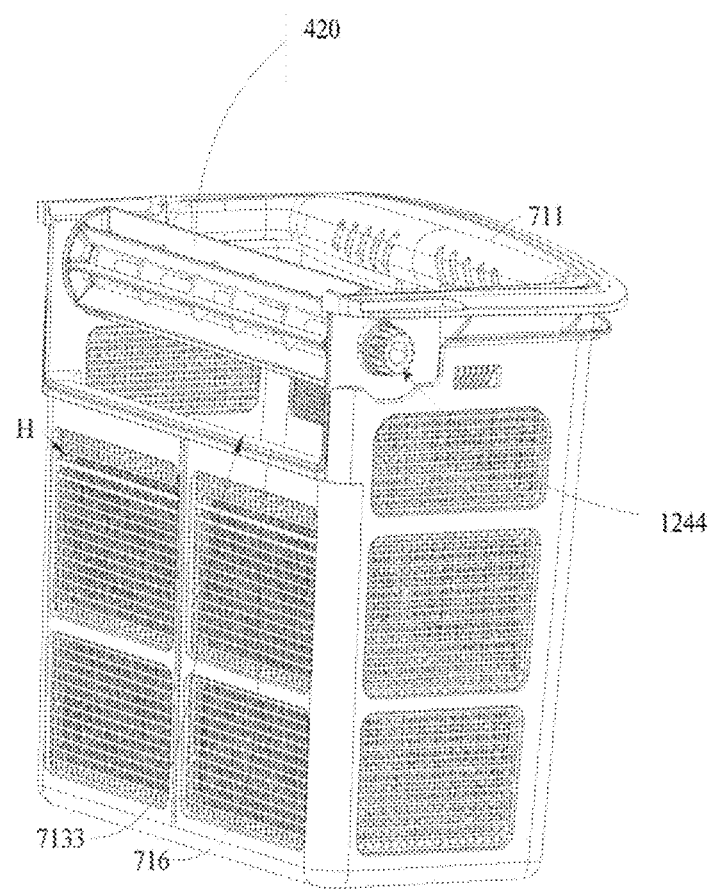
FIG. 20 is a schematic diagram of a structure of a filtering assembly of a cleaning device according to the present disclosure.
Figure 21:
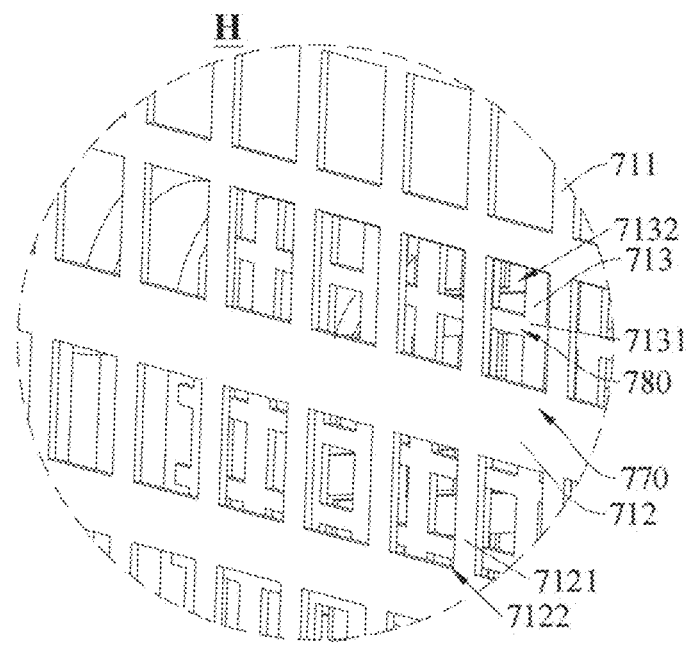
FIG. 21 is a schematic enlarged diagram of a portion H shown in FIG. 9.
Figure 22:
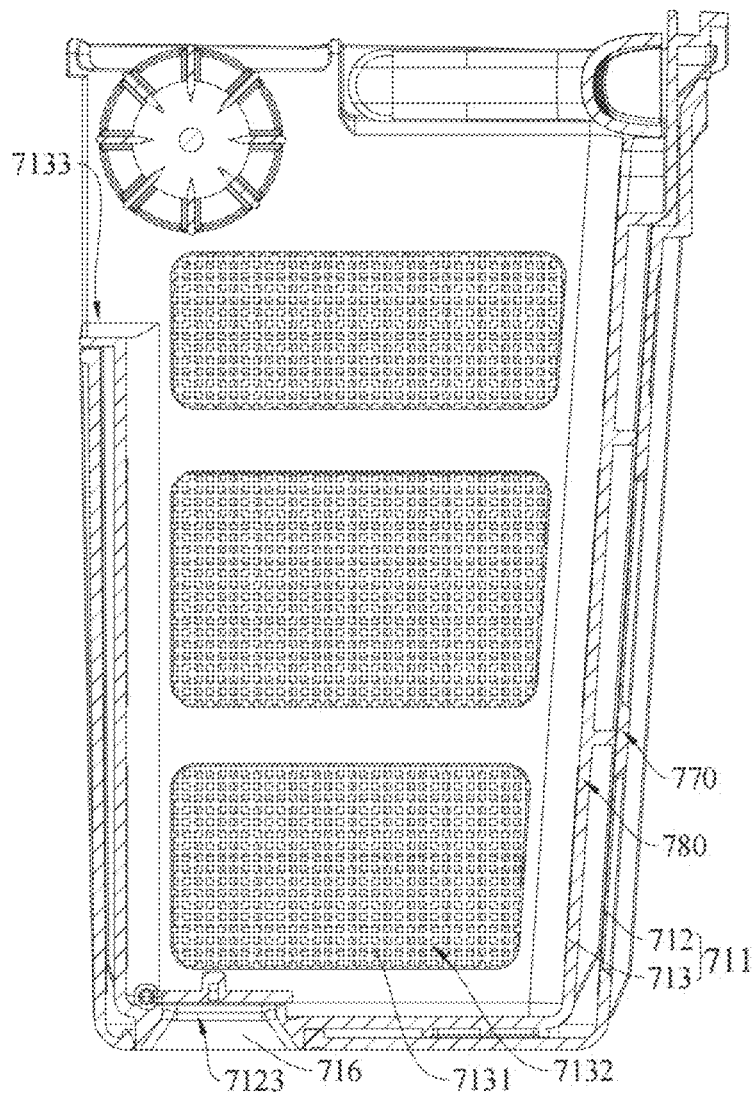
FIG. 22 is a schematic cross-sectional diagram of a filtering assembly of a cleaning device according to the present disclosure.

FIG. 20 is a schematic diagram of a structure of the filtering assembly of the cleaning device according to the present disclosure. FIG. 21 is a schematic enlarged diagram of a portion H shown in FIG. 20. FIG. 22 is a schematic cross-sectional diagram of the filtering assembly of the cleaning device according to the present disclosure. A filtering box 711 in the filtering mechanism plays a crucial role in performing filtering. Therefore, a larger quantity of filtering mesh holes of a first filtering layer disposed on a side wall of the filtering box 711 indicates a better filtering effect of the filtering box 711. However, when the quantity of filtering mesh holes of the first filtering layer increases, the filtering box 711 is clogged more easily, and it is difficult to clean the first filtering layer. Therefore, the present disclosure provides double layers or multiple layers of filtering boxes 711. For example, corresponding filtering meshes of the double layers of filtering boxes 711 are disposed in a staggered manner. This can improve a filtering effect of the filtering mechanism and reduce corresponding quantities of filtering mesh holes, thereby conveniently cleaning the filtering layer.

Figure 23:
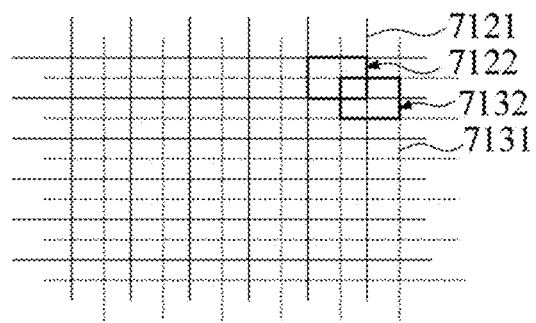
FIG. 23 is a first schematic diagram of structures of a first sub-filtering layer and a second sub-filtering layer of a cleaning device according to the present disclosure.
Figure 24:
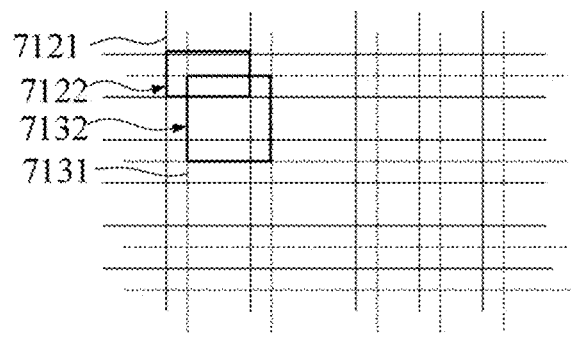
FIG. 24 is a second schematic diagram of structures of a first sub-filtering layer and a second sub-filtering layer of a cleaning device according to the present disclosure.
Figure 25:
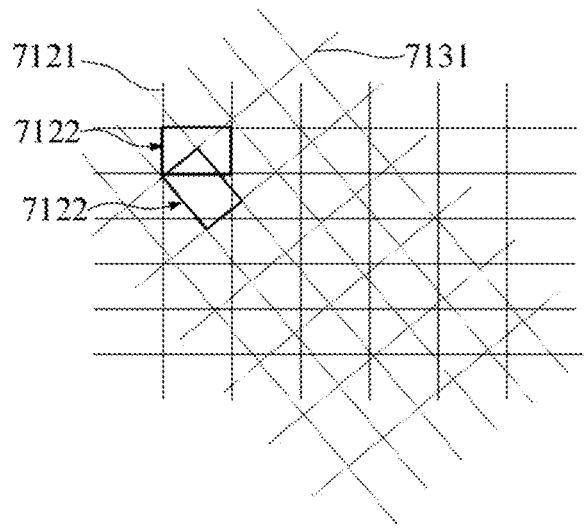
FIG. 25 is a third schematic diagram of structures of a first sub-filtering layer and a second sub-filtering layer of a cleaning device according to the present disclosure.

FIG. 23 is a first schematic diagram of structures of a first sub-filtering layer and a second sub-filtering layer of the cleaning device according to the present disclosure. FIG. 24 is a second schematic diagram of the structures of the first sub-filtering layer and the second sub-filtering layer of the cleaning device according to the present disclosure. FIG. 25 is a third schematic diagram of structures of the first sub-filtering layer and the second sub-filtering layer of the cleaning device according to the present disclosure. In some embodiments, with reference to FIG. 20, FIG. 21, and FIG. 22, the filtering box 711 includes a first sub-filtering box 712 and a second sub-filtering box 713. A first sub-filtering layer 7121 is disposed on a side wall of the first sub-filtering box 712. The first sub-filtering layer 7121 performs a filtering function. The first sub-filtering layer 7121 includes a certain quantity of first filtering mesh holes 7122. A second sub-filtering layer 7131 is disposed on a side wall of the second sub-filtering box 713. The second sub-filtering layer 7131 includes a certain quantity of second filtering mesh holes 7132. A material of the first sub-filtering layer 7121 may be the same as or different from that of the second sub-filtering layer 7131. This is not limited herein. The second sub-filtering box 713 is sleeved inside the first sub-filtering box 712. The first filtering mesh holes 7122 of the first sub-filtering layer 7121 and the second filtering mesh holes 7132 of the second sub-filtering layer 7131 are at least partially disposed in a staggered manner.

In the present disclosure, the first sub-filtering box 712 is stacked on the second sub-filtering box 713, and the first filtering mesh holes 7122 and the second filtering mesh holes 7132 are at least partially disposed in a staggered manner. When a gap between the first sub-filtering box 712 and the second sub-filtering box 713 is small, the two staggered sub-filtering layers with a small quantity of filtering mesh holes form a filtering effect equivalent to that implemented by a large quantity of filtering mesh holes. Compared to the conventional technology in which only one filtering box 711 is configured to perform filtering, the present disclosure implements the same filtering effect through two filtering layers as that implemented by a large quantity of filtering mesh holes. The filtering box 711 is disassembled into the first sub-filtering box 712 and the second sub-filtering box 713, so that it is easier to clean the first sub-filtering box 712 with a small quantity of filtering mesh holes and the second sub-filtering box 713 with a small quantity of filtering mesh holes.

In some embodiments, the first filtering mesh holes 7122 and the second filtering mesh holes 7132 are movably or rotationally staggered, so that the first filtering mesh holes 7122 and the second filtering mesh holes 7132 are at least partially disposed in a staggered manner. That the first filtering mesh holes 7122 and the second filtering mesh holes 7132 are movably staggered means that the first filtering mesh holes 7122 and the second filtering mesh holes 7132 may be staggered along a straight-line direction, for example, a horizontal direction or a vertical direction. A quantity of first filtering mesh holes 7122 may be equal to or different from that of the second filtering mesh holes 7132.

In some embodiments, the first filtering mesh holes 7122 and the second filtering mesh holes 7132 are rotationally staggered, so that the first filtering mesh holes 7122 and the second filtering mesh holes 7132 are at least partially disposed in a staggered manner. Rotationally staggering means that the first sub-filtering layer 7121 rotates, the second sub-filtering layer 7131 rotates, or both the first sub-filtering layer 7121 and the second sub-filtering layer 7131 rotate, so that the first filtering mesh holes 7122 and the second filtering mesh holes 7132 are at least partially disposed in a staggered manner. A quantity of first filtering mesh holes 7122 may be equal to or different from that of second filtering mesh holes 7132.

In some embodiments, a size of the first filtering mesh hole 7122 may be different from that of the second filtering mesh hole 7132. For example, the size of the first filtering mesh hole 7122 is larger or smaller than that of the second filtering mesh hole 7132, so that the first filtering mesh holes 7122 and the second filtering mesh holes 7132 are at least partially disposed in a staggered manner. A quantity of the first filtering mesh holes 7122 is different from that of the second filtering mesh holes 7132. Certainly, the first filtering mesh holes 7122 and the second filtering mesh holes 7132 may be disposed in a staggered manner in another manner. This is not limited herein.

In a process of sleeving the second sub-filtering box 713 on the first sub-filtering box 712, the first sub-filtering layer 7121 in the first sub-filtering box 712 and the second sub-filtering layer 7131 in the second sub-filtering box 713 may be attached to each other, or a small gap is formed between the first sub-filtering layer 7121 and the second sub-filtering layer 7131. The gap is less than or equal to a size of a filtering mesh hole. The filtering mesh hole may be the first filtering mesh hole 7122 or the second filtering mesh hole 7132. The size of the filtering mesh hole may be a diameter, a length, or a width of the filtering mesh hole. This is not limited herein.

In some embodiments, when the filtering mechanism includes one filtering assembly 710, the filtering assembly 710 may include one layer of, two layers of, or multiple layers of filtering boxes 711. When the filtering mechanism includes the first filtering assembly 770 and the second filtering assembly 780, the first filtering assembly 770 may include one layer of, two layers of, or multiple layers of filtering boxes 711, and the second filtering assembly 780 may include one layer of, two layers of, or multiple layers of filtering boxes 711. When the filtering mechanism includes both the first filtering assembly 770 and the second filtering assembly 780, and when the first filtering assembly 770 and the second filtering assembly 780 are disposed side by side, the size of the filtering mesh hole of the first filtering assembly 770 is smaller than the size of the filtering mesh hole of the second filtering assembly 780. In this way, the first filtering assembly 770 is more suitable to clean underwater garbage, and the second filtering assembly 780 is more suitable to clean water surface garbage. The filtering mesh holes of the two layers or multiple layers of filtering boxes 711 are at least partially disposed in a staggered manner to improve the cleaning efficiency of the filtering mechanism.

In some embodiments, the mode switching member 510 may adjust an action force received by the cleaning device 10 in a vertical direction, so that the cleaning device 10 can move along the vertical direction, and the cleaning device 10 can be switched between the position on the liquid surface 30 and the position under the liquid surface 30. The vertical direction may be a vertical direction of the target region 40, for example, a vertical direction of the swimming pool, namely, a direction of gravity. A horizontal direction may be a horizontal direction of the target region 40, for example, a horizontal direction of the swimming pool, namely, a direction perpendicular to the direction of gravity. By disposing the mode switching member 510, the cleaning device 10 can be switched between the position on the liquid surface 30 and the position under the liquid surface 30, so that the position of the cleaning device can be adjusted based on various liquid environments and requirements, and the cleaning device can more flexibly perform corresponding operations at various positions in the liquid.

In some embodiments, the action force received by the cleaning device 10 in the vertical direction may include a buoyancy force applied to the cleaning device 10 in the vertical direction. When the action force includes the buoyancy force applied to the cleaning device 10 in the vertical direction, the mode switching member 510 may include a buoyancy adjustment assembly 511. The buoyancy adjustment assembly 511 is configured to adjust a magnitude of the buoyancy force applied to the cleaning device 10 in the vertical direction.

In some embodiments, the buoyancy adjustment assembly 511 may include a buoyancy cavity 5111 and a buoyancy adjustment part. The buoyancy cavity 5111 is configured to accommodate liquid and/or gas. The buoyancy cavity 5111 may be, but is not limited to, an inflatable buoyancy cavity, a liquid-containing buoyancy cavity, a partitioned buoyancy cavity, or the like. A volume of the buoyancy cavity 5111 may be preset. The buoyancy cavity 5111 may be made of a flexible material and/or a rigid material. The flexible material may include, but is not limited to, polyvinyl alcohol resin, polyethylene glycol terephthalate, rubber, and the like. The rigid material may include, but is not limited to, glass, ceramic, phenolic plastic, polyurethane plastic, epoxy plastic, unsaturated polyester plastic, and the like. For example, the buoyancy cavity 5111 may be of a two-layer structure: an inner layer and an outer layer. The inner layer may be made of the flexible material and is configured to accommodate liquid and/or gas. The outer layer is a rigid protective housing and may be configured to provide protection and stability for the inner layer.

In some embodiments, the buoyancy cavity 5111 may be provided at any position on the cleaning device 10. For example, the buoyancy cavity 5111 may be provided at a front end and/or a rear end and/or a middle position of the cleaning device 10.

In some embodiments, the cleaning device 10 may include one buoyancy cavity 5111. When there is only one buoyancy cavity 5111 in the cleaning device 10, the buoyancy cavity 5111 may be provided at a central position of the cleaning device 10 to ensure that the cleaning device 10 can remain stable when a volume of the liquid and/or the gas in the buoyancy cavity 5111 changes.

Figure 6:
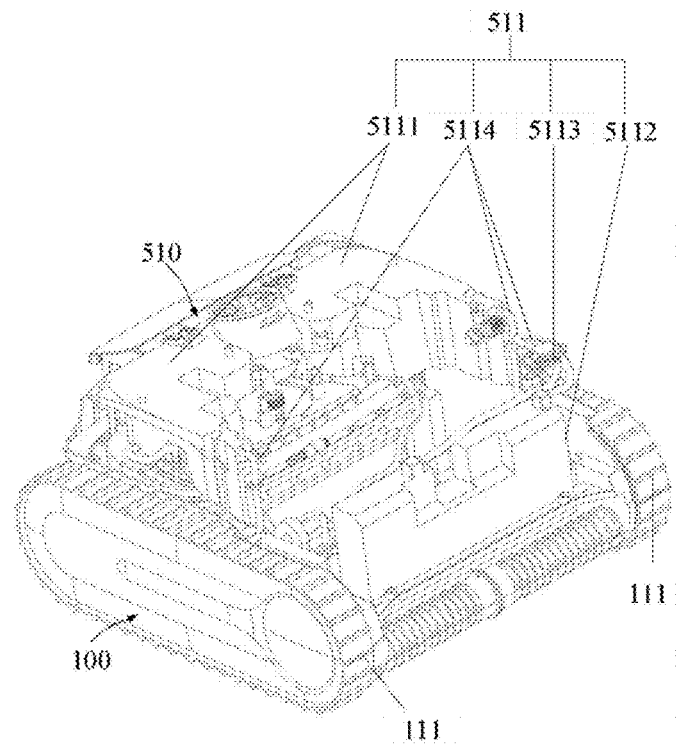
FIG. 6 is a partial schematic diagram of a cleaning device according to a second embodiment of the present disclosure.

FIG. 6 is a partial schematic diagram of the cleaning device according to a second embodiment of the present disclosure. With reference to FIG. 4 and FIG. 5, in some embodiments, the cleaning device 10 may include a plurality of buoyancy cavities 5111. As shown in FIG. 6, the cleaning device 10 may have two buoyancy cavities 5111, and the two buoyancy cavities 5111 may be symmetrically disposed in the cleaning device 10. It may be understood that symmetrically disposing the two buoyancy cavities 5111 allows the cleaning device 10 to remain stable when the buoyancy cavities 5111 provide buoyancy forces for the cleaning device 10. This prevents the cleaning device 10 from tilting and flipping due to an uneven buoyancy force applied to the cleaning device under or at the liquid surface 30.

It should be noted that sizes and positions of the buoyancy cavities 5111 can be adjusted based on weights and positions of various components of the cleaning device 10 to ensure that the cleaning device 10 can be in a preset state when volumes of liquid and/or gas in the buoyancy cavities 5111 change.

The buoyancy adjustment part may be configured to adjust the volume of the gas in the buoyancy cavity 5111. The cleaning device 10 may adjust the volume of the gas in the buoyancy cavity 5111 by using the buoyancy adjustment part to change the magnitude of the buoyancy force applied to the cleaning device 10 in the vertical direction. For example, when the buoyancy cavity 5111 made of the flexible material is in a deflated state, air may be injected into the buoyancy cavity 5111 through an air inlet 5113 by using the buoyancy adjustment part to increase the volume of the gas in the buoyancy cavity 5111 and the magnitude of the buoyancy force applied to the cleaning device 10 in the vertical direction. It may be understood that the upward buoyancy force applied to the cleaning device 10 in the vertical direction is positively correlated with the volume of the gas in the buoyancy cavity 5111.

The gas in the buoyancy cavity 5111 comes from various sources. For a first source of the gas, the gas is obtained directly from the outside. For example, the cleaning device 10 moves along the target side wall 402 of the target region 40 to the liquid surface 30 to obtain external gas. For example, the external gas enters the buoyancy cavity 5111 through the air inlet 5113 to change the volume of the gas in the buoyancy cavity 5111.

For a second source of the gas, the gas is obtained indirectly from the outside. In other words, the cleaning device 10 is provided with a protruding duct (not shown in the figure). The protruding duct communicates with the air inlet 5113. An end of the protruding duct is away from the air inlet 5113, and the end extends out of the water surface to directly drain or suck gas to change the volume of the gas in the buoyancy cavity 5111. In this way, the cleaning device 10 is prevented from climbing the wall from the target region 40 to the liquid surface 30 before changing the volume of the gas in the buoyancy cavity 5111.

For a third source of the gas, a gas generation assembly (not shown) is disposed inside the cleaning device 10. The gas generation assembly can generate gas to change the volume of the gas in the buoyancy cavity 5111. In this way, the cleaning device 10 is prevented from climbing the wall from the target region 40 to the liquid surface 30 before changing the volume of the gas in the buoyancy cavity 5111. This improves convenience. The gas generation assembly may generate gas through a chemical reaction, electrolysis, water boiling, and the like to increase or reduce the volume of the gas in the buoyancy cavity 5111.

In addition to draining the gas from the buoyancy cavity 5111 through the air inlet 5113, the gas can alternatively be compressed by a compression cylinder (not shown in the figure) to reduce the volume of the gas in the buoyancy cavity 5111, so that the cleaning device 10 can be submerged. In an actual process, the buoyancy adjustment assembly 511 may not include the air inlet 5113. The volume of the gas may be changed inside the buoyancy adjustment assembly 511, such as increasing the volume of the gas in the buoyancy cavity 5111 by the gas generation assembly or reducing the volume of the gas in the buoyancy cavity 5111 by the compression cylinder. In other embodiments, the volume of the gas may be increased or reduced in another manner. This is not limited herein.

The buoyancy adjustment part may be further configured to adjust a volume of the liquid in the buoyancy cavity 5111. The cleaning device 10 may adjust the volume of the liquid in the buoyancy cavity 5111 by using the buoyancy adjustment part to change a magnitude of a buoyancy force applied to the cleaning device 10 in the liquid. For example, when the buoyancy cavity 5111 made of the rigid material contains liquid, the liquid may be extracted from the buoyancy cavity 5111 by using the buoyancy adjustment part to increase the magnitude of the buoyancy force applied to the cleaning device 10 in the vertical direction. It may be understood that the upward buoyancy force applied to the cleaning device 10 in the vertical direction is negatively correlated with the volume of the liquid in the buoyancy cavity 5111. The liquid in the buoyancy cavity 5111 may be drained through the air inlet 5113 or another inlet or outlet. The air inlet 5113 may or may not communicate with gas. When the air inlet 5113 does not communicate with the gas, a one-way valve may be disposed at the air inlet 5113. The one-way valve can prevent external water of the cleaning device body 101 from entering the buoyancy cavity 5111 through the air inlet 5113. The air inlet 5113 may alternatively communicate with the gas. For example, the air inlet 5113 may communicate with gas on the liquid surface 30. Alternatively, the air inlet 5113 may communicate with a gas tank or a gas generation apparatus. The gas tank is filled with gas. The gas generation apparatus may automatically generate gas. The gas enters the buoyancy cavity through the air inlet 5113 to change a pressure inside the buoyancy cavity 5111, so that the pressure of the buoyancy cavity 5111 is in a stable state, thereby facilitating draining of the liquid from the buoyancy cavity 5111. The buoyancy adjustment part may be any structure that can adjust the gas and/or the liquid in the buoyancy cavity 5111. As shown in FIG. 6, the buoyancy adjustment part may include a buoyancy cavity pump 5112. The buoyancy cavity pump 5112 can drive the buoyancy cavity 5111 to drain the liquid therefrom. The buoyancy cavity pump 5112 may be, but is not limited to, a pneumatic pump, a hydraulic pump, or an electric pump. In an operating state, the buoyancy cavity pump 5112 can adjust the liquid and/or the gas in the buoyancy cavity 5111. In a non-operating state, the buoyancy cavity pump 5112 can prevent any external liquid and/or gas of the cleaning device 10 from entering the buoyancy cavity 5111, so that the buoyancy cavity 5111 is not affected by the external liquid and/or gas. The buoyancy adjustment part may alternatively be another structure. For example, the buoyancy adjustment part may be a piston assembly disposed inside the buoyancy cavity 5111. The piston assembly moves inside the buoyancy cavity 5111 to adjust the volume of the gas and/or liquid in the buoyancy cavity 5111.

In some embodiments, the buoyancy adjustment assembly 511 may further include the air inlet 5113. The air inlet 5113 is configured for gas to enter the buoyancy cavity 5111. In some embodiments, the air inlet 5113 may further be configured for the gas to leave the buoyancy cavity 5111 or for liquid to enter or leave the buoyancy cavity 5111. In some embodiments, the buoyancy adjustment assembly 511 may further include another inlet and outlet for the gas to leave or for the liquid to enter or leave the buoyancy cavity 5111. The air inlet 5113 is directly provided on the buoyancy cavity 5111 or independent of the buoyancy cavity 5111. The air inlet 5113 may be provided on a housing of the cleaning device 10 to communicate with the outside (such as external liquid or air) for gas and/or liquid exchanging. As shown in FIG. 5, the air inlet 5113 may be provided at the top of a front tail part of the cleaning device 10, so that the air inlet 5113 can more quickly communicate with the external air above the liquid surface 30 during floating of the cleaning device 10.

In some embodiments, the buoyancy adjustment assembly 511 may further include a connection duct 5114. The connection duct 5114 is configured to transport the gas or the liquid. The connection duct 5114 may be connected to one or more of the buoyancy cavity 5111, the buoyancy adjustment part, and the air inlet 5113. As shown in FIG. 6, the buoyancy adjustment part 511 may include two buoyancy cavities 5111, the buoyancy cavity pump 5112, the air inlet 5113, and the connection duct 5114. The buoyancy cavities 5111 may be connected to the buoyancy cavity pump 5112 through the connection duct 5114. The buoyancy cavity pump 5112 may be connected to the air inlet 5113 through the connection duct 5114. In the non-operating state, the buoyancy cavity pump 5112 has the same function as the one-way valve and can prevent the external liquid and/or gas from entering the buoyancy cavity 5111 through the air inlet 5113. In some other embodiments, when the buoyancy adjustment part is a centrifugal pump or the like, the one-way valve is disposed at the connection duct 5114 to prevent the external liquid and/or gas from entering the buoyancy cavity 5111 through the air inlet 5113.

As shown in FIG. 5 and FIG. 6, when the cleaning device 10 needs to be switched from the position under the liquid surface 30 to the position on the liquid surface 30, the cleaning device 10 may move to a position close to the liquid surface 30 and determine when to control the buoyancy cavity pump 5112 to inject gas into the buoyancy cavity 5111. For details about a moment at which the cleaning device 10 needs to be switched from the position under the liquid surface 30 to the position on the liquid surface 30, refer to FIG. 17 and related descriptions. As shown in FIG. 7, when the cleaning device 10 needs to be switched from the position under the liquid surface 30 to the position on the liquid surface 30, the cleaning device 10 may be tightly attached to and move on the target side wall 402 of the target region 40 to be close to the liquid surface 30 and determine when to control the buoyancy adjustment part to increase the volume of the gas in the buoyancy cavity 5111. For details about content that the cleaning device 10 is tightly attached to and moves on the target side wall 402 of the target region 40, refer to the following description. In some embodiments, when the cleaning device 10 needs to be switched from the position under the liquid surface 30 to the position on the liquid surface 30, the cleaning device 10 may be driven by a first driving force generated by a first propeller 131, to move to be close to the liquid surface 30, and determine when to control the buoyancy adjustment part to increase the volume of the gas in the buoyancy cavity 5111. For details about the first propeller 131 and the first driving force, refer to the following description.

In some embodiments, the cleaning device 10 may include a first sensor (not shown in the figure). The first sensor may be configured to determine a position of the cleaning device 10 in real time. The position may be a vertical position (or referred to as a depth) of the cleaning device 10 in the liquid. For example, the first sensor may be disposed at a central position of the cleaning device 10, and the position may be a depth of the central position of the cleaning device 10 in the liquid. The first sensor may be, but is not limited to, a pressure sensor, an ultrasonic sensor, or an optical sensor. The first sensor and the mode switching member 510 may further control the cleaning device 10 to move at a predetermined depth. For example, the cleaning device 10 performs underwater cleaning at the predetermined depth or moves at the predetermined depth towards a charging apparatus disposed at the wall of the pool.

In some embodiments, the cleaning device 10 may further include a processor 52 (not shown in the figure). The processor 52 may be a micro-controller, an embedded processor 52, an application-specific integrated circuit (ASIC), or the like. The processor 52 may obtain various pieces of data information of the cleaning device 10 and analyze the obtained data information to control various components of the cleaning device 10. When the cleaning device 10 needs to be switched from the position under the liquid surface 30 to the position on the liquid surface 30, the processor 52 may obtain the position of the cleaning device 10 in real time from the first sensor. When the position of the cleaning device 10 meets a preset condition, the processor 52 may control the buoyancy adjustment part to increase the volume of the gas in the buoyancy cavity 5111. The preset condition may be that the position of the cleaning device 10 is higher than a preset height. When a depth of the liquid in the target region 40 is fixed, the processor 52 may determine whether the position of the cleaning device 10 meets the preset condition to determine whether the air inlet 5113 of the cleaning device 10 is above the liquid surface 30. When the position of the cleaning device 10 shown in FIG. 7 meets the preset condition, the processor 52 may determine that the air inlet 5113 of the cleaning device 10 is above the liquid surface 30, the processor 52 may control the buoyancy cavity pump 5112 to drain the liquid from the buoyancy cavity 5111, and air may enter the buoyancy cavity 5111 through the air inlet 5113, to increase the volume of the gas in the buoyancy cavity 5111 and increase the buoyancy force applied to the cleaning device 10. When the buoyancy force applied to the cleaning device 10 in the vertical direction is greater than gravity of the cleaning device 10, the cleaning device 10 shown in FIG. 7 is switched to the cleaning device 10 shown in FIG. 8.

In some embodiments, the cleaning device 10 may further include a second sensor (not shown in the figure). The second sensor may be configured to detect in real time whether the air inlet 5113 of the buoyancy cavity 5111 is exposed to the air. For example, the second sensor may be an ultrasonic sensor. The second sensor may be disposed at the air inlet 5113 of the buoyancy cavity 5111.

In some embodiments, the second sensor may alternatively be disposed at other positions on the cleaning device 10 and obtain, through position conversion, a detection result of whether the air inlet 5113 is exposed to the air.

In some embodiments, when the cleaning device 10 needs to be switched from the position under the liquid surface 30 to the position on the liquid surface 30, the processor 52 may obtain the detection result of whether the air inlet 5113 of the buoyancy cavity 5111 is exposed to the air. When the detection result indicates that the air inlet 5113 is exposed to the air, the buoyancy adjustment part is controlled to increase the volume of the gas in the buoyancy cavity 5111 to switch the cleaning device 10 from the position under the liquid surface 30 to the position on the liquid surface 30. For details about content that the processor 52 controls the buoyancy adjustment part to increase the volume of the gas in the buoyancy cavity 5111 to switch the cleaning device 10 from the position under the liquid surface 30 to the position on the liquid surface 30, refer to the above description.

When the cleaning device 10 needs to be switched from the position on the liquid surface 30 to the position under the liquid surface 30, the processor 52 may control the buoyancy adjustment part to reduce the volume of the gas in the buoyancy cavity 5111. For details about a moment at which the cleaning device 10 needs to be switched from the position on the liquid surface 30 to the position under the liquid surface 30, refer to FIG. 17 and related descriptions. As shown in FIG. 5 and FIG. 6, the buoyancy cavity pump 5111 may drain the gas from the buoyancy cavity 5111 through the connection duct 5114 to reduce the volume of the gas in the buoyancy cavity 5111 to reduce the buoyancy force, to switch the cleaning device 10 from the position on the liquid surface 30 to the position under the liquid surface 30. The buoyancy adjustment assembly 511 is disposed to adjust the magnitude of the buoyancy force applied to the cleaning device 10 in the vertical direction to flexibly switch the cleaning device 10 between the position on the liquid surface 30 and the position under the liquid surface 30. This improves the operating efficiency and reliability of the cleaning device 10 in the liquid environment. The first sensor or the second sensor is disposed, so that the cleaning device 10 can automatically determine an environment in which the air inlet 5113 is located. This improves the use efficiency of the cleaning device 10.

In some embodiments, switching of the cleaning device 10 between the position on the liquid surface 30 and the position under the liquid surface 30 includes operating from the first motion state to the third motion state and operating from the third motion state to the first motion state. It may be understood that switching of the cleaning device 10 between the first motion state and the third motion state may be implemented by using the mode switching member 510, the first sensor, and the second sensor that are disposed in the cleaning device 10.

When the buoyancy cavity 5111 adjusts the buoyancy force by using gas, and the air inlet 5113 or an air outlet of the buoyancy cavity 5111 is located above the liquid surface, the buoyancy cavity pump 5112 is started to adjust the volume of the gas in the buoyancy cavity 5111. In this case, the cleaning device 10 may be from the first motion state to the second motion state until the air inlet 5113 is exposed at the water surface. Then, the attitude of the cleaning device 10 is adjusted to be in the third motion state. In this way, the cleaning device 10 is switched from the position under the liquid surface to the position on the liquid surface. After the cleaning device 10 completes water surface cleaning, the filtering box 711 is cleaned at the water surface, or the cleaning device 10 is charged at the water surface, the cleaning device 10 needs to be switched from the third motion state to the first motion state to continue cleaning the bottom of the pool. In this case, the buoyancy cavity pump 5112 may be started or the volume of the gas in the buoyancy cavity 5111 may be adjusted when the cleaning device 10 is in the third motion state, to reduce the buoyancy force. The cleaning device 10 is switched from the third motion state to the first motion state under the action of gravity thereof. In addition, an attitude sensor disposed on the cleaning device 10 may cooperate with a controller to control the attitude of the cleaning device 10 to be stable during state switching.

When the buoyancy cavity 5111 adjusts the buoyancy force by using liquid, the buoyancy cavity 5111 may be a rigid cavity having a confined space, and water is injected into or drained from the buoyancy cavity 5111 by using the buoyancy adjustment part. When water is injected into the buoyancy cavity 5111 by using the buoyancy adjustment part, the gas in the buoyancy cavity 5111 is drained, thereby facilitating submerging of the cleaning device 10. When water is drained from the buoyancy cavity 5111 by using the buoyancy adjustment part, the liquid is drained from the buoyancy cavity 5111 to reduce the overall gravity of the cleaning device 10, thereby facilitating floating of the cleaning device 10. The cleaning device 10 may be switched from the first motion state to the third motion state by draining the water from the buoyancy cavity 5111 and by using another upward force. In this case, the cleaning device 10 does not need to be in the second motion state. The cleaning device 10 may be switched from the third motion state to the first motion state by injecting water into the buoyancy cavity 5111 and by using another downward force.

When the buoyancy cavity 5111 adjusts the buoyancy force by using gas, the volume of the gas in the buoyancy cavity 5111 is set to be a gas volume threshold, so that a balanced force is applied to the cleaning device 10 in the vertical direction. In this way, when the cleaning device 10 cleans the wall of the pool, the cleaning device 10 can be attached to the wall of the pool in the vertical direction and better clean the wall of the pool. When the cleaning device 10 is in the third motion state, there is a first volume of the gas in the buoyancy cavity 5111. When the cleaning device 10 is in the first motion state, there is a second volume of the gas in the buoyancy cavity 5111. The gas volume threshold is a value between the second gas volume and the first gas volume.

Similarly, when the buoyancy cavity 5111 adjusts the buoyancy force by using liquid, the volume of the liquid in the buoyancy cavity 5111 is set to be a liquid volume threshold, so that a balanced force is applied to the cleaning device 10 in the vertical direction. When the cleaning device 10 cleans the wall of the pool, the cleaning device 10 can be attached to the wall of the pool in the vertical direction and better clean the wall of the pool. When the cleaning device 10 is in the third motion state, there is a first volume of liquid in the buoyancy cavity 5111. When the cleaning device 10 is in the first motion state, there is a second volume of liquid in the buoyancy cavity 5111. The liquid volume threshold is a value between the second liquid volume and the first liquid volume.

In some embodiments, the mode switching member 510 further includes a propulsion assembly. The propulsion assembly can be configured to adjust a first driving force applied to the cleaning device 100 in the vertical direction. The propulsion assembly may be any structure that can provide the first driving force. For example, the propulsion assembly may be a screw propeller. The screw propeller may be vertically disposed on the cleaning device 10. The screw propeller rotates, so that the first driving force in the vertical direction can be applied to the cleaning device 10. The first driving force in the vertical direction may be upward or downward. Under the action of the first driving force, the cleaning device 10 may move upward or downward along the vertical direction, or may suspend at a certain position in the liquid.

Figure 9:
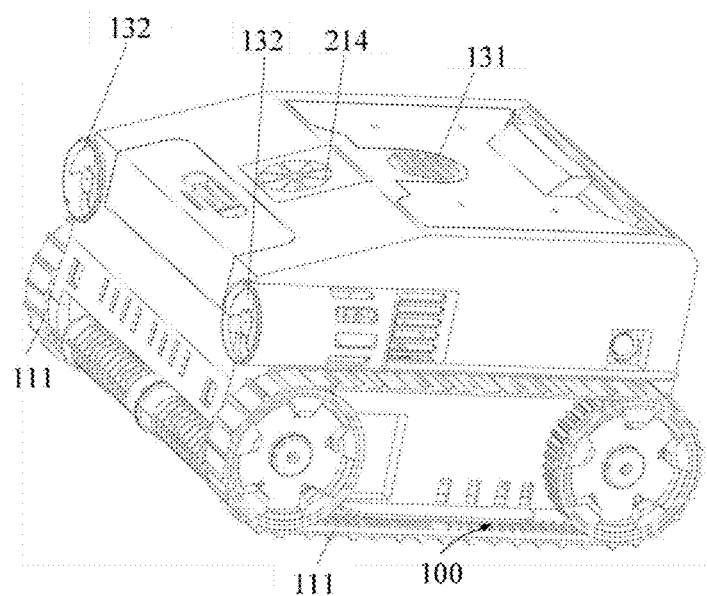
FIG. 9 is a schematic diagram of a structure of a cleaning device according to a second embodiment of the present disclosure.

In some embodiments, as shown in FIG. 9, the propulsion assembly may include a first propeller 131. The first propeller 131 can be configured to push the liquid to move along a first preset direction. The first preset direction may be a direction in which the first propeller 131 drains the liquid. When the first propeller 131 pushes the liquid to move along the first preset direction, a reaction force in a direction opposite to the first preset direction may be applied to the cleaning device 10. The reaction force may include the first driving force. It should be understood that because the cleaning device 10 needs to obtain the first driving force in the vertical direction, the first preset direction at least tilts in the vertical direction to ensure that the obtained reaction force has a component force in the vertical direction, namely, the first driving force. Therefore, an angle between the first preset direction and the vertical direction may be in a range of [0°, 90°).

A magnitude of the first driving force may be positively correlated with a speed at which the liquid moves along the first preset direction. A higher speed at which the liquid moves along the first preset direction indicates a larger reaction force applied to the cleaning device 10 in the direction opposite to the first preset direction and indicates a larger first driving force in the vertical direction.

Figure 13:
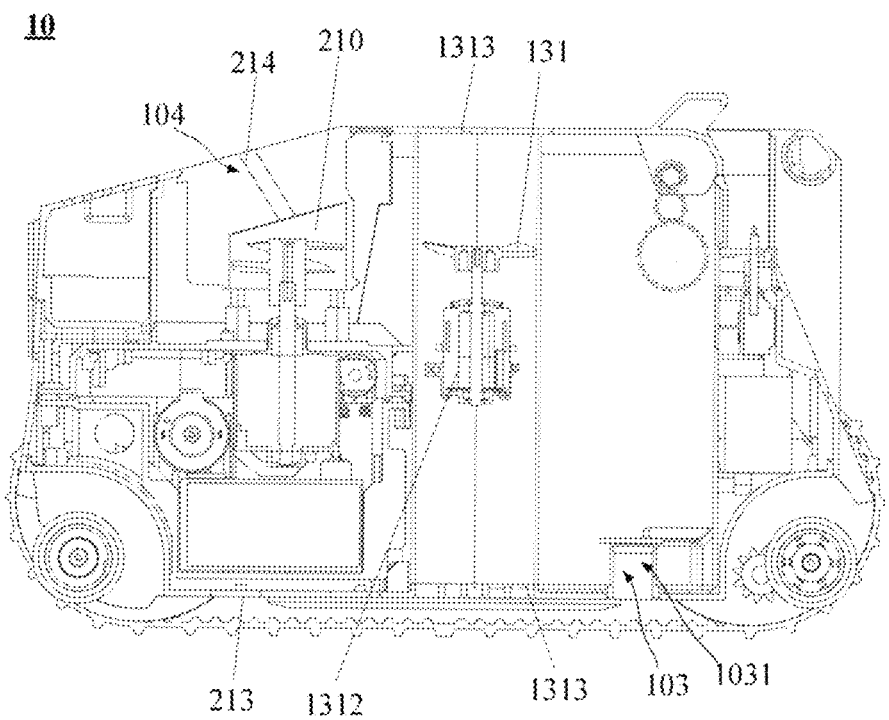
FIG. 13 is a first schematic cross-sectional diagram of a cleaning device according to a third embodiment of the present disclosure.

The magnitude of the first driving force may be negatively correlated with the angle between the first preset direction and the vertical direction. When the liquid moves at the same speed along the first preset direction, a larger angle between the first preset direction and the vertical direction indicates a smaller first driving force applied to the cleaning device 10 in the vertical direction. As shown in FIG. 13, when the angle between the first preset direction and the vertical direction is 0°, the reaction force applied to the cleaning device 10 can be fully converted into the first driving force in the vertical direction.

The cleaning device 10 includes one or more first propellers 131. The first propeller 131 may be disposed at various positions on the cleaning device 10. As shown in FIG. 9 and FIG. 13, the first propeller 131 may be vertically disposed at a central position of the cleaning device 10 to ensure balance of the cleaning device 10 during moving. The first propeller 131 may include a first propeller impeller 1311 and a first propeller motor 1312. The first propeller impeller 1311 may rotate to drive the liquid to move along the first preset direction. When the liquid moves along the first preset direction, the first driving force is applied to the cleaning device 10 in the vertical direction. The first propeller motor 1312 may provide power for the first propeller impeller 1311. As shown in FIG. 13, the first propeller 131 in the cleaning device 10 may include two first propeller openings 1313. One first propeller opening 1313 of the first propeller 131 may be located at the top of the cleaning device 10, and the other first propeller opening 1313 of the first propeller 131 may be located at the bottom of the cleaning device 10. The first propeller impeller 1311 may be driven by the first propeller motor 1312 to suck liquid through one of the two first propeller openings 1313 and drain liquid through the other one of the two first propeller openings 1313. In this way, the cleaning device 10 obtains the first driving force in the vertical direction. When the cleaning device 10 is located in the liquid, the cleaning device 10 may adjust a rotation direction (such as forward rotation or reverse rotation) of the first propeller impeller 1311 to adjust the first preset direction to adjust the direction of the first driving force. In this way, the cleaning device 10 is switched between the position on the liquid surface 30 and the position under the liquid surface 30. The first propeller 131 is disposed, so that the cleaning device 10 can be quickly and conveniently switched between the position on the liquid surface 30 and the position under the liquid surface 30.

In some embodiments, the cleaning device 10 may further move along a horizontal direction of the target region 40. As shown in FIG. 5 and FIG. 9, the cleaning device 10 may further include a second propeller 132. The second propeller 132 can push the liquid to move along a second preset direction to generate a second driving force in the horizontal direction. The cleaning device 10 can move along the horizontal direction under the action of the second driving force. The second preset direction may be a direction in which the second propeller 132 drains the liquid. Similar to the first propeller 131, because the cleaning device 10 needs to obtain the second driving force in the horizontal direction, the second preset direction at least tilts in the horizontal direction to ensure that the obtained reaction force has a component force in the horizontal direction, namely, the second driving force. Therefore, an angle between the second preset direction and the horizontal direction may be in a range of (−90°, 0°].

Similar to the first propeller 131, a magnitude of the second driving force may be positively correlated with a speed at which the liquid moves along the second preset direction. A higher speed at which the liquid moves along the second preset direction indicates a larger reaction force applied to the cleaning device 10 in a direction opposite to the second preset direction and indicates a larger second driving force in the horizontal direction. The magnitude of the second driving force may be negatively correlated with the angle between the second preset direction and the horizontal direction. When the liquid moves at the same speed along the second preset direction, a larger angle between the second preset direction and the horizontal direction indicates a smaller second driving force applied to the cleaning device 10 in the horizontal direction. As shown in FIG. 13, when the angle between the second preset direction and the horizontal direction is 0°, the reaction force applied to the cleaning device 10 can be fully converted into the second driving force in the horizontal direction.

Similar to the first propeller 131, the second propeller 132 may also include a second propeller impeller (not shown in the figure) and a second propeller motor (not shown in the figure). For details about the second propeller impeller and the second propeller motor, refer to the above description. From the above description, in terms of an overall direction of the cleaning device 10, the first preset direction is substantially perpendicular to the overall direction of the cleaning device 10, that is, perpendicular to a direction of a plane in which the cleaning device 10 is in contact with the to-be-cleaned surface. The second preset direction is substantially parallel to the overall direction of the cleaning device 10, that is, parallel to the direction of the plane in which the cleaning device 10 is in contact with the to-be-cleaned surface, and is consistent with the moving direction of the cleaning device 10. The cleaning device 10 may include one or more second propellers 132. The second propeller 132 may be disposed at the bottom of the cleaning device 10. For example, when the cleaning device 10 includes only one second propeller 132, the second propeller 132 may be horizontally disposed at a center position of the bottom of the cleaning device 10 to ensure balance of the cleaning device 10.

In some embodiments, the second propeller 132 may alternatively be disposed on a side of the cleaning device 10. It should be noted that when the second propeller 132 is disposed on the side of the cleaning device 10, the second propeller 132 should be at least partially located under a floating position of the cleaning device 10 on the liquid surface 30 to ensure that when the cleaning device 10 floats on the liquid surface 30, the second propeller impeller of the second propeller 132 can rotate to push the liquid to move along the second preset direction to provide the cleaning device 10 with the second driving force in the horizontal direction.

In some embodiments, when the second propeller 132 is disposed on the side of the cleaning device 10, the second propeller 132 may be completely located under the floating position of the cleaning device 10 on the liquid surface 30.

In some embodiments, at least one second propeller 132 may be disposed on each of a left side and a right side of the cleaning device 10. As shown in FIG. 9, one second propeller 132 may be disposed on each of the left side and the right side of the cleaning device 10. When the cleaning device 10 moves in the liquid, the cleaning device 10 may adjust a power of the second propeller motor of the second propeller 132 on the left side and a power of the second propeller motor of the second propeller 132 on the right side to adjust speeds at which the liquid is pushed by the second propellers 132 on the left side and the right side to flow along the second preset direction, so that the cleaning device 10 can make a turn. For example, when the speed at which the liquid is pushed by the second propeller 132 on the left side to flow along the second preset direction is greater than the speed at which the liquid is pushed by the second propeller 132 on the right side to flow along the second preset direction, the cleaning device 10 may turn to the right under the action of the second propeller 132 on the left side. The second propellers 132 are disposed, so that the cleaning device 10 can be switched between positions in the horizontal direction. For example, the cleaning device 10 moves straight or makes a turn in the horizontal direction to expand functions of the cleaning device 10, so that the cleaning device 10 is applicable to more usage scenarios.

Figure 26:
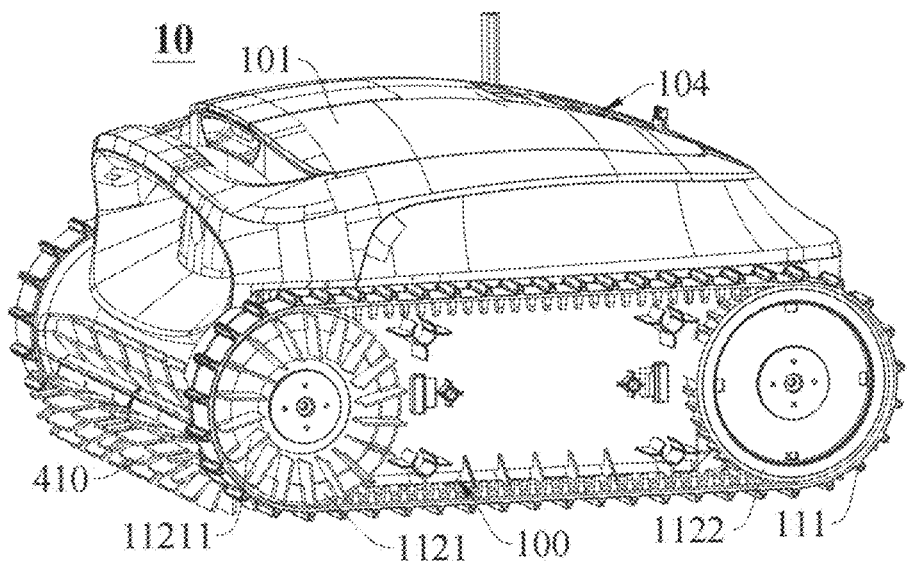
FIG. 26 is a first schematic diagram of a structure of a cleaning device according to the present disclosure.
Figure 27:
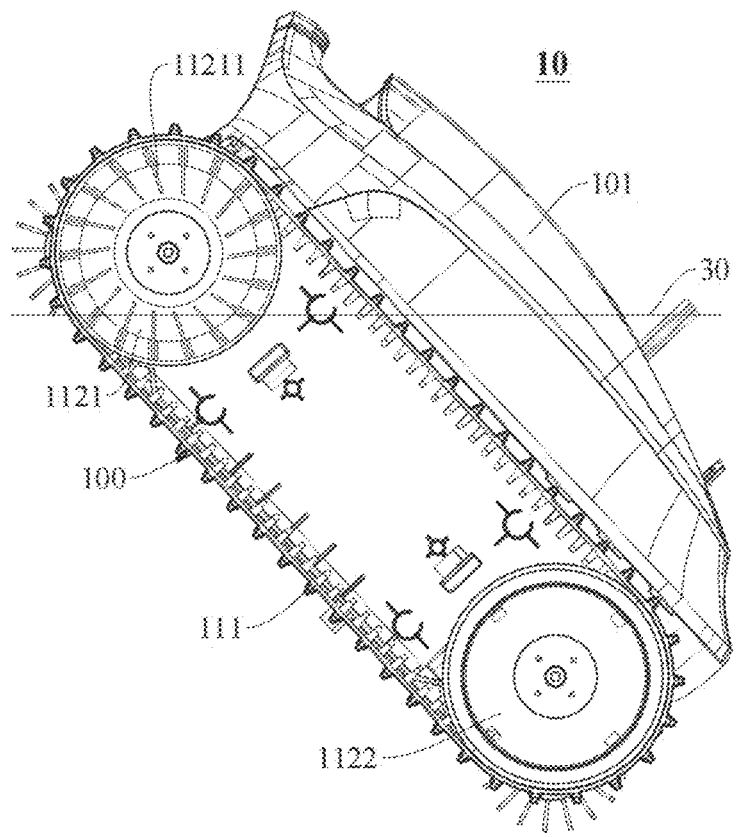
FIG. 27 is a second schematic diagram of a structure of a cleaning device according to the present disclosure.

FIG. 26 is a first schematic diagram of a structure of the cleaning device according to the present disclosure. FIG. 27 is a second schematic diagram of a structure of the cleaning device according to the present disclosure. In some embodiments, the movement propulsion mechanism 100 includes a first wheel 1121 and a second wheel 1122. There are two first wheels 1121 and two second wheels. The two first wheels 1121 are disposed at a front end of the bottom of the cleaning device body 101. The two second wheels 1122 are disposed at a rear end of the bottom of the cleaning device body 101. Drive paddles 11211 are disposed on an outer side surface of the first wheel 1121. The drive paddles 11211 are detachably or fixedly connected to the outer side surface of the first wheel 1121. When the cleaning device 10 moves on the liquid surface 30, the drive paddles 11211 are at least partially located under the liquid surface 30 for adjusting the second driving force applied to the cleaning device 10 in the horizontal direction. In other words, when the cleaning device 10 moves on the liquid surface 30, the drive paddles 11211 are at least partially exposed at the liquid surface 30, and the drive paddles 11211 are at least partially located under the liquid surface 30. The first wheel 1121 rotates to drive the drive paddles 11211 to rotate. Some drive paddles 11211 located under the liquid surface 30 generate a certain action force with the liquid for adjusting the second driving force applied to the cleaning device 10 in the horizontal direction, so that the cleaning device 10 moves forward along a second direction. When the cleaning device 10 moves on the target bottom wall 401, the drive paddles 11211 are completely submerged, and a forward action force applied to the cleaning device 10 in the second direction and a backward action force applied to the cleaning device 10 in the second direction cancel each other out, so that movement of the cleaning device 10 on the target bottom wall 401 is not affected.

The drive paddles 11211 are disposed on the first wheel 1121 to provide the second driving force in the second direction for the cleaning device 10 to push the cleaning device 10 to move forward and backward in the second direction. Because an action of the drive paddles 11211 is the same as that of the second propeller 132, to some extent, the drive paddles 11211 may replace the second propeller 132. This reduces a quantity of components, costs, and a weight of the device.

In some embodiments, there are a plurality of drive paddles 11211. The plurality of drive paddles 11211 are disposed along a radial direction of the first wheel 1121. There may be, but is not limited to, three, four, five, six, or more drive paddles 11211.

In some embodiments, the two first wheels 1121 are disposed at the front end of the bottom of the cleaning device body 101. The two second wheels 1122 are disposed at the rear end of the bottom of the cleaning device body 101. The first wheels 1121 and the second wheels 1122 can drive the cleaning device 10 to move in the horizontal direction. When the cleaning device 10 is located on the target bottom wall 401 of the target region 40, the first wheels 1121 and the second wheels 1122 can operate to drive the cleaning device 10 to move on the target bottom wall 401 and the target side wall 402 and move from the target bottom wall 401 to the target side wall 402. In some embodiments, the movement propulsion mechanism 100 includes a track 111. The first wheel 1121 and the second wheel 1122 are connected to each other through the track 111. In other words, the first wheel 1121 and the second wheel 1122 rotate as the track 111 rotates. The track 111 can operate to drive the cleaning device 10 to move. The track 111 can drive the cleaning device 10 to move in the horizontal direction. As shown in FIG. 10, when the cleaning device 10 is located on the target bottom wall 401 of the target region 40, the track 111 can operate to drive the cleaning device 10 to move on the target bottom wall 401. The track 111 can further drive the cleaning device 10 to move in the vertical direction. As shown in FIG. 7 and FIG. 12, when the cleaning device 10 is tightly attached to the target side wall 402 of the target region 40, the track 111 can operate to drive the cleaning device 10 to move on the target side wall 402. For details about how the cleaning device 10 is tightly attached to and moves on the target side wall 402 of the target region 40, refer to the following description.

In some embodiments, the track 111 enables the cleaning device 10 to move from the target bottom wall 401 to the target side wall 402. As shown in FIG. 11, when the track 111 moves to an intersection between the target bottom wall 401 and the target side wall 402, a part of the track 111 moves on the target side wall 402, and the other part of the track 111 moves on the target bottom wall 401. The part of the track 111 on the target side wall 402 can drive the cleaning device 10 to move upward until the cleaning device moves from the target bottom wall 401 to the target side wall 402. After the cleaning device 10 moves from the target bottom wall 401 to the target side wall 402, the cleaning device 10 may be driven by the track 111 to move on the target side wall 402. The cleaning device 10 can move on the target side wall 402 under the action of the second driving force provided by the second propeller 132 after the second propeller 132 performs steering. The cleaning device 10 can move on the target side wall 402 under the action of a third driving force provided by the main water pump 210. For details about the main water pump 210 and the third driving force provided by the main water pump 210, refer to the following description. The track 111 is disposed, so that the cleaning device 10 can move at various positions in the liquid, and the cleaning device 10 can move from the target bottom wall 401 to the target side wall 402. In some embodiments, the cleaning device 10 may further include the main water pump 210. The main water pump 210 may be configured to drive the cleaning device 10 to suck the liquid from the liquid inlet portion 103 and drain the liquid from the liquid outlet portion 104. The liquid inlet portion 103 may include one or more inlets for liquid to enter the cleaning device 10, such as the first water inlet 1031 and the second water inlet 1032. The liquid inlet portion 103 includes a main pump water inlet 213. As shown in FIG. 9, FIG. 13, FIG. 14, and FIG. 15, the main pump water inlet 213 of the cleaning device 10 may serve as an inlet for liquid to enter the cleaning device 10. The main pump water inlet 213 may be the first water inlet 1031 or the second water inlet 1032. The liquid outlet portion 104 includes one or more outlets for liquid to be drained from the cleaning device 10 into the target region 40. The liquid outlet portion 104 includes a main pump water outlet 214. The main pump water outlet 214 may be the first water outlet. As shown in FIG. 9, FIG. 13, FIG. 14, and FIG. 15, the main pump water outlet 214 of the cleaning device 10 may serve as an outlet for the liquid in the cleaning device 10 to be drained from the cleaning device 10 into the target region 40.

Similar to the first propeller 131, the main water pump 210 may also include a structure similar to the first propeller impeller 1311 and the first propeller motor 1312. A main water pump impeller 212 may be driven by the main water pump motor 211 to rotate to suck the liquid from the target region 40 through the liquid inlet portion 103 and drain the liquid from the cleaning device 10 to the target region 40 through the liquid outlet portion 104.

In some embodiments, the cleaning device 10 may adjust a rotation direction of the main water pump impeller 212 of the main water pump 210 to switch functions of the main pump water inlet 213 and the main pump water outlet 214. For example, when the impeller of the main water pump 210 rotates reversely, the main pump water inlet 213 may be configured to drain liquid, and the main pump water outlet 214 may be configured to suck liquid.

In some embodiments, when the cleaning device 10 is located on the target side wall 402, the liquid outlet portion 104 (such as the main pump water outlet 214) may at least face towards the target region 40 and be parallel to the horizontal direction or tilt downward in the vertical direction to ensure that, when the main water pump 210 operates, and the liquid is drained through the main pump water outlet 214, the third driving force can be applied to the cleaning device 10 to drive the cleaning device 10 to be tightly attached to the side wall 402. The third driving force may be a reaction force applied to the cleaning device 10 when the main water pump 210 drains the liquid through the main pump water outlet 214. When the main pump water outlet 214 faces the target region 40 and is parallel to the horizontal direction, the third driving force applied to the cleaning device 10 is perpendicular to the target side wall 402, so that the cleaning device 10 can be tightly attached to the target side wall 402.

In some embodiments, when the cleaning device 10 needs to move on the target side wall 402, the main pump water outlet 214 may face towards the target region 40. When the main pump water outlet 214 tilts downward along the vertical direction, the third driving force applied to the cleaning device 10 has a horizontal component force facing towards the target side wall 402, so that the cleaning device 10 can be tightly attached to the target side wall 402. In addition, the third driving force further has an upward component force in the vertical direction, so that the cleaning device 10 can move upward along the target side wall 402. When the cleaning device 10 is located on the target bottom wall 401, the third driving force obtained by the main water pump 210 by draining liquid through the main pump water outlet 214 further has a component force in the horizontal direction, so that the cleaning device 10 can move on the target bottom wall 401.

In some embodiments, the main pump water inlet 213 may be provided at the bottom of the cleaning device 10. When the cleaning device 10 needs to move on the target side wall 402, the main water pump 210 may suck the liquid through the main pump water inlet 213 to obtain a fourth driving force to drive the cleaning device 10 to be tightly attached to the target side wall 402. The fourth driving force may be a suction force generated by the main water pump 210 sucking the liquid through the main pump water inlet 213. The suction force may drive the cleaning device 10 to be tightly attached to the target side wall 402.

In some embodiments, when the cleaning device 10 needs to move on the target side wall 402, the main water pump 210 of the cleaning device 10 may drive the cleaning device 10 to be tightly attached to the target side wall 402. At least one of the track 111, the second propeller 132, and the main water pump 210 of the cleaning device 10 may provide an upward driving force in the vertical direction to drive the cleaning device 10 to move upward on the target side wall 402. At least one of the track 111 and the second propeller 132 of the cleaning device 10 may provide a downward driving force in the vertical direction to drive the cleaning device 10 to move downward on the target side wall 402.

The main water pump 210 is disposed, so that the cleaning device 10 can be tightly attached to the target side wall 402 to limit a position of the cleaning device 10. In this way, the cleaning device 10 can conveniently move on the target side wall 402, and the cleaning device 10 can be switched from the position under the liquid surface 30 to the position on the liquid surface 30.

In some embodiments, the cleaning device 10 includes the main pump water inlet 213 and the main pump water outlet 214. The main pump water inlet 213 and the main pump water outlet 214 are rotatably provided on the cleaning device body 101, so that liquid at the main pump water inlet 213 and the main pump water outlet 214 can flow at any angle to change a flow direction of the liquid in real time. In this way, the cleaning device 10 can obtain propulsion forces in various directions.

In some embodiments, the cleaning device 10 includes one or two groups of first power water inlet portions (not shown in the figure) and first power water outlet portions (not shown in the figure). There may be one or two groups of the first power water inlet portions and the first power water outlet portions, and a quantity of groups may be determined based on arrangement of the first propeller 131 and the second propeller 132. When the cleaning device 10 includes the first propeller 131 or the second propeller 132, the cleaning device 10 includes one group of the first power water inlet portion and the first power water outlet portion. When the cleaning device 10 includes both the first propeller 131 and the second propeller 132, two groups of the first power water inlet portions and the first power water outlet portions are included.

One group of the first power water inlet portion and the first power water outlet portion are disposed on the cleaning device 10. The first propeller 131 communicates with the first power water inlet portion and the first power water outlet portion. When the first propeller 131 operates, liquid is sucked through one of the first power water inlet portion and the first power water outlet portion and is drained through the other one of the first power water inlet portion and the first power water outlet portion. In this way, the cleaning device 10 obtains the first driving force in the vertical direction. The group of the first power water inlet portion and the first power water outlet portion extends along the vertical direction. Specifically, when the first propeller 131 is the first propeller 131, the first power water inlet portion is the first propeller opening 1313, and the second power water outlet portion is another first propeller opening 1313.

In some embodiments, the other group of the first power water inlet portion and the first power water outlet portion are disposed on the cleaning device 10. The second propeller 132 communicates with the other group of the first power water inlet portion and the first power water outlet portion. When the second propeller 132 operates, liquid is sucked through one of the first power water inlet portion and the first power water outlet portion of the other group and is drained through the other one of the first power water inlet portion and the first power water outlet portion of the other group. In this way, the cleaning device 10 obtains the second driving force in the horizontal direction. The other group of the first power water inlet portion and the first power water outlet portion extends along the horizontal direction.

The cleaning device 10 may include, but is not limited to, the first propeller 131, a first drum fan, and a first water pump. The cleaning device 10 may further include, but is not limited to, the second propeller 132, a second drum fan, and a second water pump. The propeller, the drum fan, and the water pump communicate with the first power water inlet portion and the first power water outlet portion. The propeller, the drum fan, and the water pump rotate forwardly or reversely, so that the cleaning device 10 can move up and down in the vertical direction and move forward and backward in the horizontal direction. In this way, the cleaning device 10 can be switched between the position on the liquid surface 30 and the position under the liquid surface 30 and can be switched between moving forward and moving backward in the liquid.

In some embodiments, the cleaning device 10 includes one or two groups of second power water inlet portions (not shown in the figure) and second power water outlet portions (not shown in the figure). The second power water inlet portion and the second power water outlet portion are rotatably disposed on the cleaning device 10. In other words, arrangement of the second power water inlet portion and the second power water outlet portion is different from arrangement of the first power water outlet portion, that is, angles of the second power water inlet portion and the second power water outlet portion can be adjusted to change the flow direction of the liquid.

One group of first propellers 131 communicates with the second power water inlet portion and the second power water outlet portion. When the first propeller 131 operates, liquid is sucked through one of the second power water inlet portion and the second power water outlet portion and is drained through the other one of the second power water inlet portion and the second power water outlet portion. Because the second power water inlet portion and the second power water outlet portion are rotatably disposed on the cleaning device 10, the cleaning device 10 obtains propulsion forces in various directions. The propulsion forces include the first driving force in the vertical direction.

In some embodiments, the second propeller 132 communicates with the second power water inlet portion and the second power water outlet portion. When the second propeller 132 operates, liquid is sucked through one of the second power water inlet portion and the second power water outlet portion of the other group and is drained through the other one of the second power water inlet portion and the second power water outlet portion of the other group. Because the second power water inlet portion and the second power water outlet portion are rotatably disposed on the cleaning device 10, the cleaning device 10 obtains propulsion forces in various directions. The propulsion forces include the second driving force in the horizontal direction.

The second power water inlet portion can rotate relative to the cleaning device 10 through cooperation between one power motor and one power transmission mechanism. The second power water outlet portion can rotate relative to the cleaning device 10 through cooperation between the other power motor and the other power transmission mechanism.

In some embodiments, the first power water inlet portion and the first power water outlet portion are disposed on the cleaning device 10 to provide propulsion forces in various directions by adjusting a direction of a water spray duct (not shown in the figure). When the first propeller 131 includes the water pump, the water pump communicates with the first power water outlet portion through the water spray duct. The water spray duct may extend towards various angles. When the liquid enters or exits the water spray duct, propulsion forces in various directions may be provided. When the first power water inlet portion, the first power water outlet portion, and the first propeller 131 communicate with each other, the propulsion forces may include the first driving force in the vertical direction. When the first power water inlet portion, the first power water outlet portion, and the second propeller 132 communicate with each other, the propulsion forces include the second driving force in the horizontal direction.

Certainly, in other embodiments, a first guiding structure (not shown in the figure) is disposed on a path in which the first power water inlet portion, the first propeller 131, and the first power water outlet portion are disposed. The flow direction of the liquid is changed by the first guiding structure to provide propulsion forces in various directions. Similarly, a second guiding structure (not shown in the figure) is disposed on a path in which the first power water inlet portion, the second propeller 132, and the first power water outlet portion are disposed. The flow direction of the liquid is changed by the second guiding structure to provide propulsion forces in various directions. Specific structures of the first guiding structure and the second guiding structure are not limited herein, provided that the first guiding structure and the second guiding structure can change the flow direction of the liquid.

It should be noted that the above description of the cleaning device 10 and various members thereof is merely for ease of description and does not limit the present disclosure to the scope of the cited embodiments. It may be understood that a person skilled in the art, with understanding of the principle of the device, may make any combination of the various members or form a sub-member to be connected to other members without departing from the principle.

Figure 15:
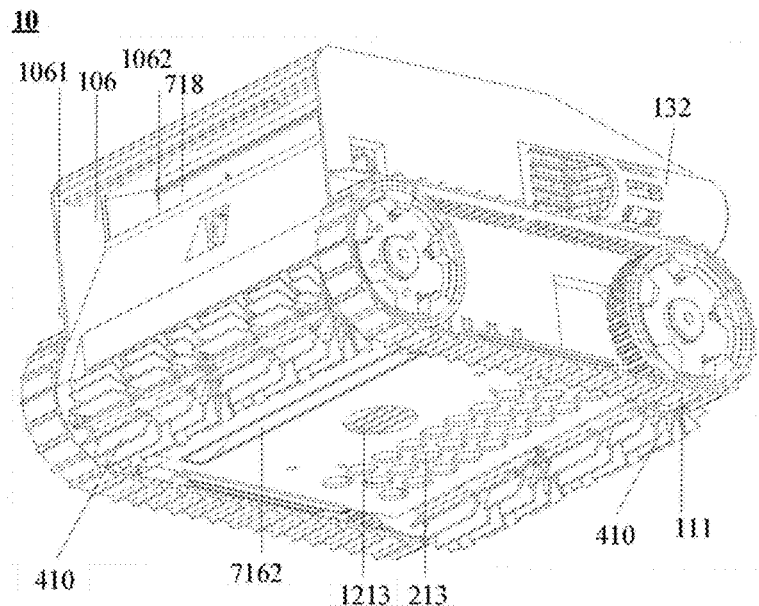
FIG. 15 is a schematic diagram of a structure of a cleaning device according to a fourth embodiment of the present disclosure.

FIG. 15 is a schematic diagram of a structure of the cleaning device according to a fourth embodiment of the present disclosure. The cleaning device 10 may include a control member (not shown in the figure). The control member of the cleaning device 10 controls the cleaning device 10 to be switched between positions on the water surface or under the water surface of the swimming pool, to implement water surface cleaning or underwater cleaning.

Figure 16:
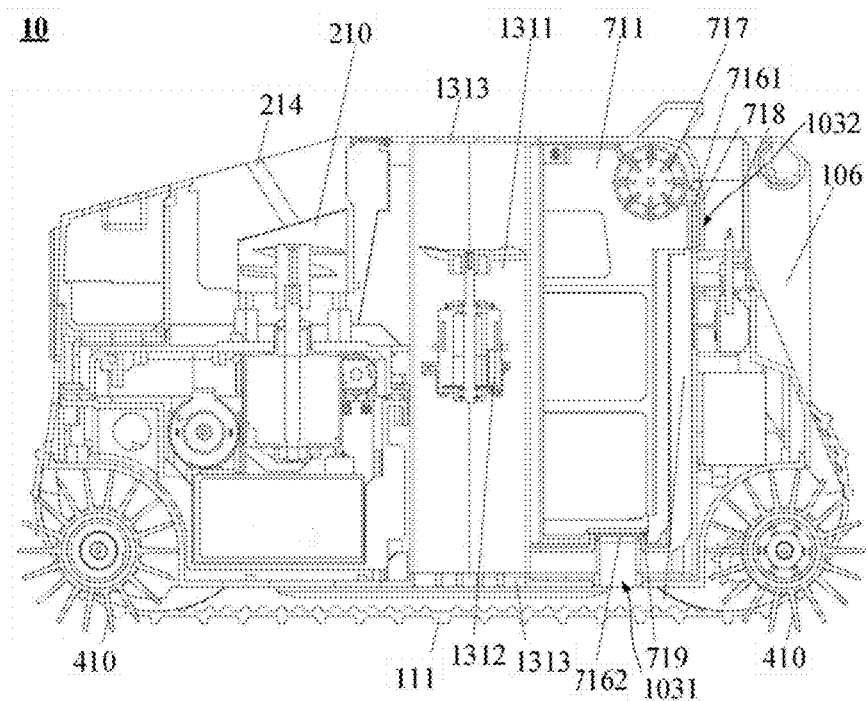
FIG. 16 is a schematic cross-sectional diagram of a cleaning device according to a fourth embodiment of the present disclosure.

In some embodiments, the filtering mechanism includes the filtering box 711. The filtering box 711 may be configured to perform water surface cleaning and underwater cleaning on the swimming pool. As shown in FIG. 15 and FIG. 16, the filtering box 711 may include a filtering box water inlet portion 716. The filtering box water inlet portion 716 communicates with the liquid inlet portion 103. The filtering box water inlet portion 716 is an inlet for garbage or other debris in the swimming pool to enter the cleaning device 10.

In some embodiments, the filtering box water inlet portion 716 includes a filtering box opening for water surface cleaning 7161. The filtering box opening for water surface cleaning 7161 may be an inlet for garbage or debris on the water surface of the swimming pool to enter the filtering box 711. The filtering box opening for water surface cleaning 7161 may be provided on a side (such as a front side) or at the top or the bottom of the cleaning device 10 and is aligned with a floating position of the cleaning device 10 on the water surface. In this way, garbage or other debris on the water surface of the swimming pool can enter the filtering box 711 with the liquid through the filtering box opening for water surface cleaning 7161. For example, when the filtering box opening for water surface cleaning 7161 is located on the side or the bottom of the cleaning device 10, the floating position of the cleaning device 10 on the water surface may be a midline position or a ⅓ position on the filtering box opening for water surface cleaning 7161. In this case, the cleaning device 10 is in a normal attitude. When the filtering box opening for water surface cleaning 7161 is located at the top or the bottom or a side surface of the cleaning device 10, the floating position of the cleaning device 10 on the water surface may be a position at which the filtering box opening for water surface cleaning 7161 is close to the water surface. In this case, the cleaning device 10 is in an inverted attitude.

In some embodiments, the filtering box water inlet portion 716 may further include a filtering box opening for underwater cleaning 7162. The filtering box opening for underwater cleaning 7162 may be an inlet for garbage or debris in the water in the swimming pool to enter the filtering box 711. The filtering box opening for underwater cleaning 7162 may be provided under the floating position of the cleaning device 10 on the water surface. For example, the filtering box opening for underwater cleaning 7162 may be provided at the bottom of the cleaning device 10. For another example, the filtering box opening for underwater cleaning 7162 may be provided on a side of the cleaning device 10 under the floating position on the water surface. The filtering box opening for water surface cleaning 7161 and the filtering box opening for underwater cleaning 7162 are provided, so that the cleaning device 10 can perform water surface cleaning and underwater cleaning. This expands usage scenarios of the cleaning device 10 and improves user experience.

Figure 14:
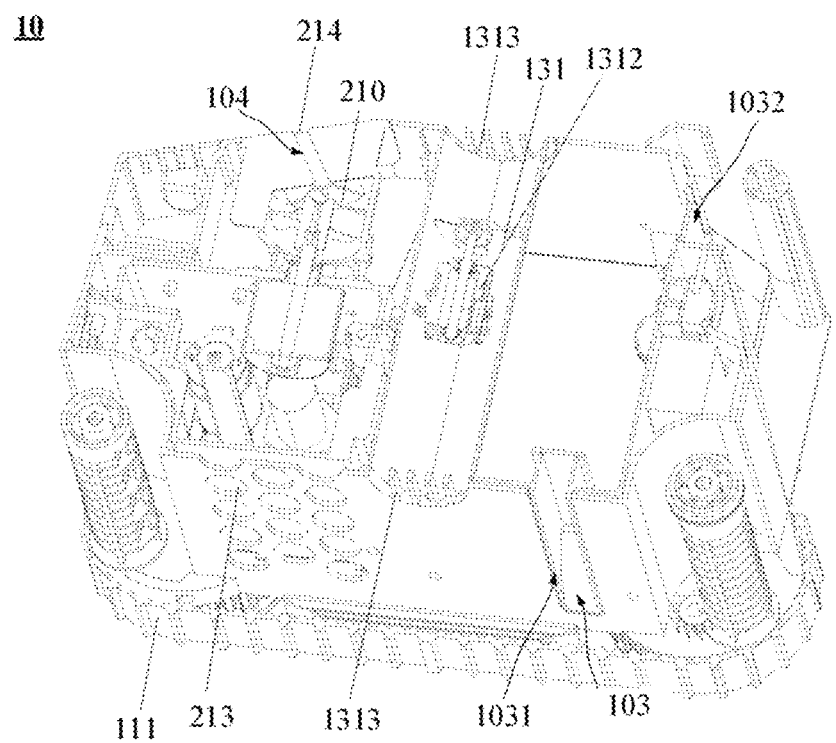
FIG. 14 is a second schematic cross-sectional diagram of a cleaning device according to a third embodiment of the present disclosure.

In some embodiments, the filtering box 711 may further include a filtering box roller brush assembly 717. The filtering box 711 may include one or more filtering box roller brush assemblies 717. The filtering box roller brush assembly 717 may be configured to draw garbage or other debris on the water surface into the filtering box 711 during water surface cleaning, to improve water surface cleaning efficiency. The filtering box roller brush assembly 717 may be disposed in the filtering box opening for water surface cleaning 7161. As shown in FIG. 14, the filtering box roller brush assembly 717 may be disposed inside the filtering box opening for water surface cleaning 7161.

In some embodiments, the filtering box roller brush assembly 717 may alternatively be disposed outside the filtering box opening for water surface cleaning 7161 or on the filtering box opening for water surface cleaning 7161.

In some embodiments, the filtering box 717 further includes at least one drive gear for driving the filtering box roller brush assembly 717 to rotate.

In some embodiments, the filtering box 711 may further include an adjustment part for water surface cleaning (not shown in the figure) and an adjustment part for underwater cleaning (not shown in the figure). The adjustment part for water surface cleaning is configured to adjust an open state and a closed state of the filtering box opening for water surface cleaning 7161. The adjustment part for underwater cleaning is configured to adjust an open state and a closed state of the filtering box opening for underwater cleaning 7162. The control member may adjust the adjustment part for water surface cleaning and/or the adjustment part for underwater cleaning to correspondingly control the filtering box opening for water surface cleaning 7161 and/or the filtering box opening for underwater cleaning 7162 to be opened or closed.

When the cleaning device 10 performs underwater cleaning, both the adjustment part for water surface cleaning and the adjustment part for underwater cleaning are in the open state, that is, the adjustment part for water surface cleaning opens the filtering box opening for water surface cleaning 7161, and the adjustment part for underwater cleaning opens the filtering box opening for underwater cleaning 7162. Both the filtering box opening for water surface cleaning 7161 and the filtering box opening for underwater cleaning 7162 are opened to suck more liquid to improve the cleaning efficiency. Alternatively, the adjustment part for water surface cleaning is in the closed state, and the adjustment part for underwater cleaning is in the open state, that is, the adjustment part for water surface cleaning closes the filtering box opening for water surface cleaning 7161, and the adjustment part for underwater cleaning opens the filtering box opening for underwater cleaning 7162. The filtering box opening for water surface cleaning 7161 is closed, and the filtering box opening for underwater cleaning 7162 is opened, so that a suction power of the filtering box opening for underwater cleaning 7162 of the cleaning device 10 can be increased to prevent the filtering box opening for water surface cleaning 7161 from diverting liquid. This improves underwater cleaning efficiency of the cleaning device 10.

When the cleaning device 10 performs water surface cleaning, both the adjustment part for water surface cleaning and the adjustment part for underwater cleaning are in the open state, that is, the adjustment part for water surface cleaning opens the filtering box opening for water surface cleaning 7161, and the adjustment part for underwater cleaning opens the filtering box opening for underwater cleaning 7162. Both the filtering box opening for water surface cleaning 7161 and the filtering box opening for underwater cleaning 7162 are opened, so that stability of the attitude of the cleaning device 10 at the water surface is facilitated. Alternatively, the adjustment part for water surface cleaning is in the open state, and the adjustment part for underwater cleaning is in the closed state, that is, the adjustment part for water surface cleaning opens the filtering box opening for water surface cleaning 7161, and the adjustment part for underwater cleaning closes the filtering box opening for underwater cleaning 7162. The filtering box opening for water surface cleaning 7161 is opened, and the filtering box opening for underwater cleaning 7162 is closed, so that a suction power of the filtering box opening for water surface cleaning 7161 can be increased to prevent the filtering box opening for underwater cleaning 7162 from diverting liquid. This improves underwater cleaning efficiency of the cleaning device 10. In the normal attitude or the inverted attitude, the cleaning device 10 can adjust the open state and the closed state of the filtering box opening for water surface cleaning 7161 by using the adjustment part for water surface cleaning, and/or the open state and the closed state of the filtering box opening for underwater cleaning 7162 by using the adjustment part for underwater cleaning.

In some embodiments, the filtering box 711 may further include a filtering box opening cover plate for water surface cleaning 718 and a filtering box opening cover plate for underwater cleaning 719. The adjustment part for water surface cleaning may include the filtering box opening cover plate for water surface cleaning 718. The adjustment part for underwater cleaning may include the filtering box opening cover plate for underwater cleaning 719. The filtering box opening cover plate for water surface cleaning 718 is configured to adjust the open state and the closed state of the filtering box opening for water surface cleaning 7161. When the filtering box opening for water surface cleaning 7161 is in the open state, liquid at the water surface of the swimming pool can enter the filtering box 711 through the filtering box opening for water surface cleaning 7161. When the filtering box opening for water surface cleaning 7161 is in the closed state, the liquid at the water surface of the swimming pool cannot enter the filtering box 711 through the filtering box opening for water surface cleaning 7161. The filtering box opening cover plate for water surface cleaning 718 is disposed at the filtering box opening cover plate for water surface cleaning 718. As shown in FIG. 16, the filtering box opening cover plate for water surface cleaning 718 may be disposed in the filtering box opening for water surface cleaning 7161. The filtering box opening cover plate for water surface cleaning 718 may alternatively be disposed inside or outside the filtering box opening for water surface cleaning 7161.

Similar to the filtering box opening cover plate for water surface cleaning 718, the filtering box opening cover plate for underwater cleaning 719 is configured to adjust the open state and the closed state of the filtering box opening for underwater cleaning 7162. The filtering box opening cover plate for underwater cleaning 719 is disposed in the filtering box opening for underwater cleaning 7162 or inside or outside the filtering box opening for underwater cleaning 7162.

The filtering box opening cover plate for water surface cleaning 718 and the filtering box opening cover plate for underwater cleaning 719 may be movable parts. The control member may adjust the filtering box opening cover plate for water surface cleaning 718 and/or the filtering box opening cover plate for underwater cleaning 719 to correspondingly open or close the filtering box water inlet portion 716. For example, the filtering box opening cover plate for water surface cleaning 718 may be a rotatable part, and the control member can control the filtering box opening cover plate for water surface cleaning 718 to rotate to switch the filtering box opening for water surface cleaning 7161 from the closed state to the open state.

In some embodiments, when the cleaning device 10 needs to perform underwater cleaning, the control member can enable, by using the filtering box opening cover plate for water surface cleaning 718, the filtering box opening for water surface cleaning 7161 to remain in the closed state, and enable, by using the filtering box opening cover plate for underwater cleaning 719, the filtering box opening for underwater cleaning 7162 to remain in the open state, to prevent the filtering box opening for water surface cleaning 7161 from diverting liquid and ensure the suction power of the filtering box opening for underwater cleaning 7162. This can improve the underwater cleaning efficiency of the cleaning device 10. In other embodiments, the filtering box opening for water surface cleaning 7161 may be also in the open state.

Similarly, when the cleaning device 10 needs to perform water surface cleaning, the control member may enable, by using the filtering box opening cover plate for underwater cleaning 719, the filtering box opening for underwater cleaning 7162 to remain in the closed state, and enable, by using the filtering box opening cover plate for water surface cleaning 718, the filtering box opening for water surface cleaning 7161 to remain in the open state, to prevent the filtering box opening for underwater cleaning 7162 from diverting liquid and ensure the suction power of the filtering box opening for water surface cleaning 7161. This can improve the water surface cleaning efficiency of the cleaning device 10. In other embodiments, the filtering box opening for underwater cleaning 7162 may be also in the open state.

In some embodiments, the adjustment part for water surface cleaning may alternatively be an adjustment valve for water surface cleaning. The adjustment part for underwater cleaning may alternatively be an adjustment valve for underwater cleaning. Opening of the adjustment valve for water surface cleaning and the adjustment valve for underwater cleaning may be determined based on an operating parameter of the main water pump 210, such as an operating power of the main water pump 210. The adjustment valve for water surface cleaning and the adjustment valve for underwater cleaning can be opened only after a certain pressure threshold is met. When the operating power of the main water pump 210 is greater than a pressure threshold of the adjustment valve for water surface cleaning, the adjustment valve for water surface cleaning opens the filtering box opening for water surface cleaning 7161. When the operating power of the main water pump 210 is less than the pressure threshold of the adjustment valve for water surface cleaning, the adjustment valve for water surface cleaning closes the filtering box opening for water surface cleaning 7161. When the operating power of the main water pump 210 is greater than a pressure threshold of the adjustment valve for underwater cleaning, the adjustment valve for underwater cleaning opens the filtering box opening for underwater cleaning 7162. When the operating power of the main water pump 210 is less than the pressure threshold of the adjustment valve for underwater cleaning, the adjustment valve for underwater cleaning closes the filtering box opening for underwater cleaning 7162. The adjustment valve for water surface cleaning and the adjustment valve for underwater cleaning may be, but are not limited to, a duckbill valve. This is not limited herein.

In some embodiments, the filtering box 711 may further include other structures. For example, the filtering box 711 may further include a filtering layer. The filtering layer may be configured to filter the liquid entering the filtering box 711.

The control member may be configured to control the cleaning device 10 to perform water surface cleaning or underwater cleaning for the swimming pool. In some embodiments, the control member may obtain a target task for cleaning a target swimming pool, wherein the target task includes water surface cleaning and underwater cleaning; determine an adjustment parameter of a moving mechanism based on the target task and a current position of the cleaning device 10; and control, based on the adjustment parameter, the moving mechanism to drive the cleaning device 10 to move to a target position to perform the target task. For more details of the above embodiments, refer to FIG. 28 and related descriptions thereof.

The cleaning device 10 may comprehensively clean the bottom of the pool, perform underwater cleaning, and perform water surface cleaning to ensure comprehensive cleaning of the pool.

In some embodiments, the cleaning device 10 may further include a garbage guiding member 106. The garbage guiding member 106 may drive garbage at the liquid surface 30 of the swimming pool to enter the filtering box opening for water surface cleaning 7161. As shown in FIG. 15 and FIG. 16, the garbage guiding member 106 may be disposed outside the filtering box opening for water surface cleaning 7161, and the interior of the garbage guiding member 106 is hollow. A first port 1061 of the garbage guiding member 106 is away from the filtering box opening for water surface cleaning 7161, and a size of the first port 1061 is greater than a size of the filtering box opening for water surface cleaning 7161. A size of a second port 1062 connected to the filtering box opening for water surface cleaning 7161 is not less than the size of the filtering box opening for water surface cleaning 7161. The garbage guiding member 106 may include, but is not limited to, a truncated cone or a trapezoid structure with the interior thereof being hollow.

In some embodiments, the size of the first port 1061 may be in proportion to the size of the filtering box opening for water surface cleaning 7161. For example, a ratio of the size of the first port 1061 to the size of the filtering box opening for water surface cleaning 7161 may be not greater than 10:1, to prevent excessive garbage or debris from entering the filtering box opening for water surface cleaning 7161 at the same time, so that the filtering box opening for water surface cleaning 7161 is prevented from being clogged. The garbage guiding member 106 is disposed, so that garbage at a wide water surface can be gathered together and enter the filtering box opening for water surface cleaning 7161. This avoids the following case: The water surface cleaning efficiency of the cleaning device 10 is reduced due to the excessively small filtering box opening for water surface cleaning 7161.

As shown in FIG. 15 and FIG. 16, the cleaning device 10 may further include a roller brush for underwater cleaning 411. The roller brush for underwater cleaning 411 may be configured to clean the target bottom wall 401 and the target side wall 402 of the swimming pool. The cleaning device 10 may include one or more roller brushes for underwater cleaning 411. The roller brush for underwater cleaning 411 may be disposed at the bottom of and/or on the side of the cleaning device 10. As shown in FIG. 15, a front end and a rear end of the bottom of the cleaning device 10 are both provided with one roller brush for underwater cleaning 411. When the cleaning device 10 moves on the bottom of the swimming pool, the roller brush for underwater cleaning 411 can clean the bottom of the swimming pool (such as cleaning debris or algae). When the cleaning device 10 moves on the wall of the swimming pool, the roller brush for underwater cleaning 411 may further clean the wall of the swimming pool.

It should be noted that the above description of the cleaning device 10 and various members thereof is merely for ease of description and does not limit the present disclosure to the scope of the cited embodiments. It may be understood that a person skilled in the art, with understanding of the principle of the device, may make any combination of the various members or form a sub-member to be connected to other members without departing from the principle.

Figure 28:
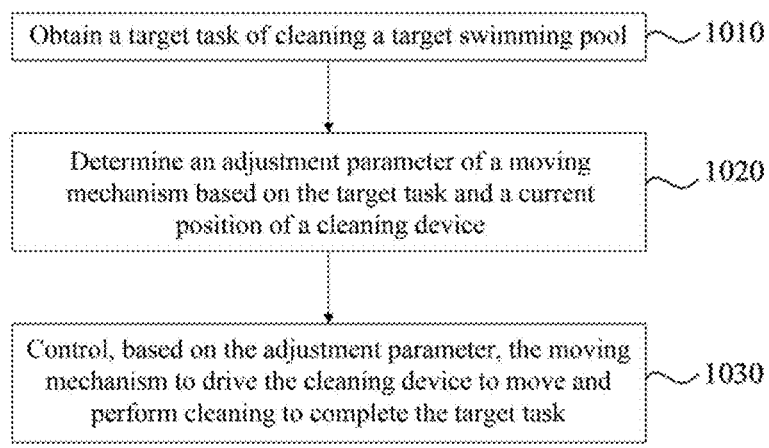
FIG. 28 is a schematic flow chart of a liquid cleaning control method according to the present disclosure.

FIG. 28 is a schematic flow chart of a liquid cleaning control method according to the present disclosure. The method 1000 may be applied to the cleaning device 10 and executed by the control member. As shown in FIG. 28, the method 1000 may include the following steps.

Step 1010: Obtain a target task of cleaning a target swimming pool.

The target swimming pool may be a to-be-cleaned swimming pool. The target task may be a task of cleaning the target swimming pool. The target task may include water surface cleaning and/or underwater cleaning. The water surface cleaning may mean cleaning a water surface of the target swimming pool. The underwater cleaning may mean cleaning an underwater part of the target swimming pool (such as water in the swimming pool and a wall of the swimming pool). In some embodiments, the target task may further include a specific to-be-cleaned part. For example, the underwater cleaning may further include, but is not limited to, cleaning the water, cleaning the bottom of the pool, cleaning each wall of the pool, and the like.

The control member may obtain the target task in various manners. For example, the control member may obtain the target task input by a user. For another example, the control member may be configured to perform the target task periodically, such as perform water surface cleaning once every three days and perform underwater cleaning once every two days. For another example, the cleaning device 10 may further include a detection member. The detection member may detect water quality of the target swimming pool to obtain water quality data of the target swimming pool. The control member may obtain the water quality data and determine the target task based on the water quality data. The water quality data may be data reflecting a water quality condition of the target swimming pool. The water quality data includes, but is not limited to, a picture of the water surface of the target swimming pool, a picture of the water in the target swimming pool, and a picture of each pool wall. The control member may input the water quality data into a task determining model, and an output of the task determining model may include the target task. The task determining model may analyze the water quality data of the target swimming pool to determine cleanliness (such as clarity, algae distribution, and debris) of various regions (such as the water surface, water in the swimming pool, and each pool wall) to determine a corresponding target task. The task determining model may be a convolutional neural network model, a graph neural network, or any machine learning model that implements the above functions. The task determining model may be obtained by performing training based on a plurality of groups of training samples with labels. The training samples may include sample water quality data of a sample swimming pool, and the labels may include a sample task. The sample task may be obtained by manually labeling the sample water quality data.

Step 1020: Determine an adjustment parameter of a moving mechanism based on the target task and a current position of the cleaning device 10.

The control member may obtain the current position of the cleaning device 10. For more details about obtaining the current position of the cleaning device 10, refer to the above description of the first sensor.

The adjustment parameter may include information of a route from the current position to a position, in the target swimming pool, at which the target task needs to be performed and route information required to complete the target task.

The control member may determine, based on the target task, a starting position, in the target swimming pool, at which the target task needs to be performed; determine, based on the starting position and the current position, the information of the route of the cleaning device 10 from the current position to the position, in the target swimming pool, at which the target task needs to be performed; and determine, based on the target task for the target swimming pool, the route information required to complete the target task, to determine the adjustment parameter of the moving mechanism.

Step 1030: Control, based on the adjustment parameter, the moving mechanism to drive the cleaning device 10 to move and perform cleaning to complete the target task.

The control member may control, based on the information of the route from the current position to the position, in the target swimming pool, at which the target task needs to be performed in the adjustment parameter, the moving mechanism to drive the cleaning device 10 to move from the current position to the starting position at which the target task needs to be performed, and turn on, based on the route information required to complete the target task in the adjustment parameter, the filtering box 711 and the roller brush for underwater cleaning 411 of the cleaning device 10 to perform cleaning to complete the target task. After completing the target task, the cleaning device 10 may stay at an end position, return to the starting position before moving, or move to a preset default position.

According to the liquid cleaning control method, the cleaning device 10 can be controlled to clean all parts of the swimming pool. This improves efficiency of cleaning the swimming pool and ensures comprehensive cleaning of the swimming pool.

It should be noted that the foregoing description of the method 1000 is merely for description and does not limit the scope of the present disclosure. For a person of ordinary skill in the art, various modifications and changes can be made to the method 1000 under the guidance of the present disclosure. The modifications and changes still fall within the scope of the present disclosure.

Some embodiments of the present disclosure further provide a computer-readable storage medium 60. The storage medium can store computer instructions. When the computer instructions are executed by a processor 52, the liquid cleaning control method is implemented.

In some embodiments, the cleaning device 10 includes a movement propulsion mechanism 100 and a cleaning system. The movement propulsion mechanism 100 includes a transmission assembly 120. The transmission assembly 120 includes a movement drive part 121, a first driven part 123, and a second driven part 124. The cleaning system includes a first cleaning part 410 and a second cleaning part 420. The first cleaning part 410 is configured to draw garbage under the liquid surface 30 into the filtering mechanism. The second cleaning part 420 is configured to draw garbage at the liquid surface 30 into the filtering mechanism. The movement drive part 121 is disposed inside the cleaning device body 101. An output end of the movement drive part 121 is adapted to be drivably connected to the wheels 112, so that the movement drive part 121 can drive the wheels 112 to rotate. The first driven part 123 is disposed on the cleaning device body 101. The first driven part 123 is drivably connected to the wheels 112. An output end of the first driven part 123 is adapted to be connected to the first cleaning part 410. The wheels 112 drive the first driven part 123 to rotate, so that the first driven part 123 drives the first cleaning part 410 to rotate. The second driven part 124 is disposed on the cleaning device body 101. The second driven part 124 is drivably connected to the wheels 112. An output end of the second driven part 124 is adapted to be connected to the second cleaning part 420. The wheels 112 drive the second driven part 124 to rotate, so that the second driven part 124 drives the second cleaning part 420 to rotate. For example, the first cleaning part 410 in this embodiment is the roller brush for underwater cleaning 411, and the second cleaning part 420 is the roller brush for water surface cleaning 421.

The movement drive part 121, the first driven part 123, and the second driven part 124 are disposed, so that only one movement drive part 121 is needed to drive the wheels 112, the first cleaning part 410, and the second cleaning part 420, leading to a simple driving structure and low manufacturing costs. The wheels 112 are driven by the movement drive part 121 to rotate, so that the wheels move forward or backward. During rotation, the wheels can drive the first driven part 123 and the second driven part 124 to rotate, so that the first driven part 123 and the second driven part 124 respectively drive the first cleaning part 410 and the second cleaning part 420 to rotate, and various cleaning parts can operate. In this way, cleaning functions of the cleaning device 10 are diversified. For example, when the first cleaning part 410 is the roller brush for underwater cleaning 411, and the second cleaning part 420 is the roller brush for water surface cleaning 421, the transmission assembly 120 drives the wheels 112 to rotate to drive the roller brush for underwater cleaning 411 and the roller brush for water surface cleaning 421 to rotate, so that cleaning functions of the cleaning device 10 are diversified. Optionally, the roller brush for underwater cleaning 411 and the roller brush for water surface cleaning 421 rotate in a same direction. In some embodiments, the wheels 112 include a first wheel 1121, a second wheel 1122, and a track 111. The first wheel 1121 is in transmission connection to the second wheel 1122 through the track 111. The output end of the movement drive part 121 is drivably connected to the first wheel 1121. Specifically, two first wheels 1121 and two second wheels 1122 are disposed in this embodiment. The two first wheels 1121 are disposed at the front end of the cleaning device body 101, and the two second wheels 1122 are arranged at the rear end of the cleaning device body 101.

For example, the movement drive part 121 in this embodiment includes a movement drive motor. The transmission assembly 120 further includes a first gear 122. An output end of the movement drive motor is connected to the first gear 122. The first gear 122 is engaged with the first wheel 1121, so that the first gear 122 can drive the first wheel 1121 to rotate. Alternatively, the movement drive part 121 may be any other component that can provide kinetic energy. This is not limited herein.

Figure 29:
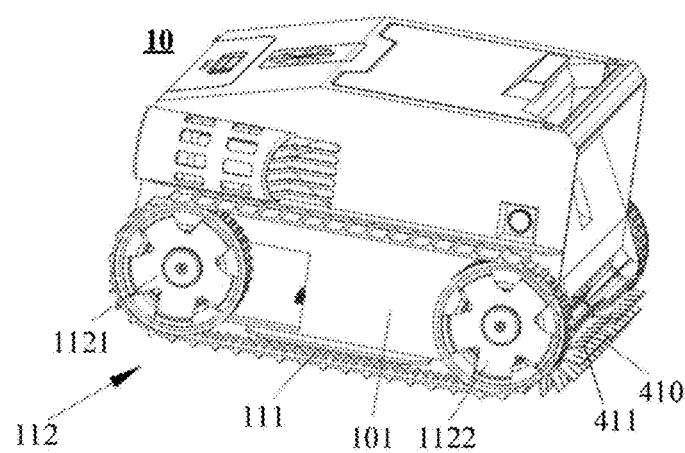
FIG. 29 is a schematic diagram of a structure of a cleaning device according to a fifth embodiment of the present disclosure.
Figure 30:
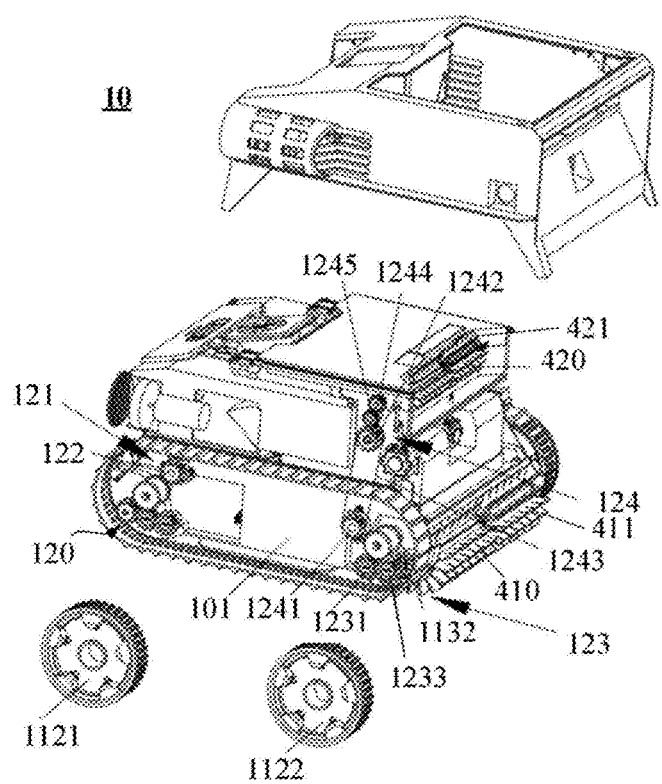
FIG. 30 is a schematic exploded diagram of a cleaning device according to a fifth embodiment of the present disclosure.

FIG. 29 is a schematic diagram of a structure of the cleaning device according to a fifth embodiment of the present disclosure. FIG. 30 is a schematic exploded diagram of the cleaning device according to the fifth embodiment of the present disclosure. In some embodiments, the second driven part 124 includes a second gear 1241, a third gear 1242, a fourth gear 1244, a fifth gear 1245, a first rotating plate, and a second rotating plate. The second gear 1241 is connected to the first rotating plate. The third gear 1242 is connected to the second rotating plate. The first rotating plate is in transmission connection to the second rotating plate through a transmission belt 1243. The second gear 1241 is engaged with the second wheel 1122. The fourth gear 1244 is engaged with the third gear 1242. The fourth gear 1244 is connected to the second cleaning part 420. The fifth gear 1245 is disposed between the third gear 1242 and the fourth gear 1244 and is engaged with both the third gear 1242 and the fourth gear 1244.

Specifically, during operation, after the movement drive part 121 is started, the movement drive part 121 drives the first gear 122 to rotate. Because the first gear 122 is engaged with the first wheel 1121, the first gear 122 can drive the first wheel 1121 to rotate. Under the action of the track 111, the first wheel 1121 can drive the second wheel 1122 to rotate, the second wheel 1122 drives the second gear 1241 to rotate, and the second gear 1241 drives the first rotating plate to rotate. In this way, the first rotating plate drives, through the transmission belt 1243, the second rotating plate to rotate, the second rotating plate drives the third gear 1242 to rotate, the third gear 1242 drives the fifth gear 1245 to rotate, the fifth gear 1245 drives the fourth gear 1244 to rotate, and the fourth gear 1244 drives the second cleaning part 420 to rotate. When the second cleaning part 420 is the roller brush for water surface cleaning 421, garbage on the water surface can be cleaned and stored.

In some optional embodiments, the second cleaning part 420 is connected to the fourth gear 1244 through a connecting shaft. In this embodiment, the second driven part 124 is disposed on only one side of the cleaning device body 101. This helps simplify the structure of the cleaning device 10, reduce costs, and reduce the weight of the device.

In some optional embodiments, the fourth gear 1244 and the second cleaning part 420 are removed from the second driven part 124 as a whole. This helps remove and clean the second cleaning part 420. The fourth gear 1244 may be disposed on the filtering box 711. As shown in FIG. 20, when the fourth gear 1244 is disposed on the filtering box 711, the second cleaning part 420 is the filtering box roller brush assembly 717, and the fourth gear 1244 is the drive gear. Alternatively, the fourth gear 1244 may be disposed on a filtering box cover. When the filtering box 711 is detached, the second cleaning part 420 and the fourth gear 1244 are also detached with the filtering box 711, so that the filtering box 711 and the second cleaning part 420 can be cleaned at the same time. This helps detach and clean the second cleaning part 420. Further, in this embodiment, the second gear 1241 is coaxially disposed with the first rotating plate, the third gear 1242 is coaxially disposed with the second rotating plate, and the second rotating plate is disposed right above the first rotating plate. This can shorten the transmission belt 1243 as much as possible, reduce costs, and improve reliability and stability of the second driven part 124.

Still refer to FIG. 29 and FIG. 30. In some embodiments, the first driven part 123 includes a sixth gear 1231, a seventh gear 1232, and an eighth gear 1233. The sixth gear 1231 is engaged with the seventh gear 1232. The sixth gear 1231 is engaged with the second wheel 1122. The seventh gear 1232 is connected to the first cleaning part 410. The eighth gear 1233 is disposed between the sixth gear 1231 and the seventh gear 1232 and is engaged with both the sixth gear 1231 and the seventh gear 1232.

Specifically, during operation, after the movement drive part 121 is started, the movement drive part 121 drives the first gear 122 to rotate. Because the first gear 122 is engaged with the first wheel 1121, the first gear 122 can drive the first wheel 1121 to rotate. Under the action of the track 111, the first wheel 1121 drives, through the track 111, the second wheel 1122 to rotate, the second wheel 1122 drives the sixth gear 1231 to rotate, the sixth gear 1231 drives the eighth gear 1233 to rotate, and the eighth gear 1233 drives the seventh gear 1232 to rotate, so that the seventh gear 1232 can drive the first cleaning part 410 to rotate. When the first cleaning part 410 is the roller brush for underwater cleaning 411, a surface of the pool can be cleaned. The surface of the pool may be the bottom surface of the pool or a wall surface of the pool.

Further, as shown in FIG. 30, the first cleaning part 410 is connected to the seventh gear 1232 through a connecting shaft, and the seventh gear 1232 may be detachably connected to the cleaning device body 101 through a bolt. This facilitates later replacement of the first cleaning part 410. The sixth gear 1231, the seventh gear 1232, and the eighth gear 1233 are disposed, so that when it is ensured that the first cleaning part 410 operates normally, the first cleaning part 410 can be detached. This avoids a problem in the conventional technology that the first cleaning part 410 is directly fixedly connected to the second wheel 1122 and cannot be detached, improves flexible application of the cleaning device 10 in this embodiment, and reduces costs.

According to the cleaning device 10 in this embodiment, one movement drive part 121 is configured to drive various cleaning parts, leading to diverse cleaning functions, the simple structure, low manufacturing costs, and the light weight. This helps carry and transport the cleaning device 10 and improve the operating efficiency. Specifically, the first cleaning part 410 may be the roller brush for underwater cleaning 411, and the second cleaning part 420 may be the roller brush for water surface cleaning 421. The transmission assembly 120 of the cleaning device 10 drives the wheels 112 to rotate to drive the roller brush for underwater cleaning 411 and the roller brush for water surface cleaning 421 to rotate, so that the cleaning functions of the cleaning device 10 are diversified.

In addition, different cleaning parts may also be driven by different drive parts respectively to independently control each cleaning part. In some embodiments, the cleaning device 10 further includes a power mechanism. The power mechanism is in transmission connection to the drive gear. The power mechanism includes at least a movement drive part 121, a first power drive part, and a second power drive part.

In an embodiment, the movement drive part 121 is configured to drive the wheel 112 and the first cleaning part 410 to rotate, and the fourth gear 1244 is driven by the first power drive part. In another embodiment, the movement drive part 121 is configured to drive the wheel 112 and the fourth gear 1244 to rotate, and the first cleaning part 410 is driven by the second power drive part. In another embodiment, the movement drive part 121 is configured to drive the wheel 112 to rotate, the fourth gear 1244 is driven by the first power drive part, and the first cleaning part 410 is driven by the second power drive part. A specific quantity of drive parts can be selected based on an actual driving requirement.

Further, the cleaning device 10 in this embodiment includes two transmission assemblies 120, two first wheels 1121, and two second wheels 1122. Each transmission assembly 120 includes at least one first driven part 123, at least one movement drive part 121, and at least one second driven part 124.

In a specific implementation, each transmission assembly 120 includes one first driven part 123, so that the cleaning device 10 includes two first driven parts 123. The two first driven parts 123 are respectively disposed on two sides of the cleaning device body 101 and are respectively disposed at positions corresponding to two second wheels 1122. In this embodiment, the cleaning device 10 includes two first cleaning parts 410. In other words, each of two seventh gears 1232 drives one first cleaning part 410 independently, to improve the cleaning efficiency. The first cleaning part 410 may be a floor cleaning roller brush, so that the cleaning device 10 can clean the surface of the pool. The surface of the pool may be the bottom surface of the pool or the wall surface of the pool.

In a specific implementation, each transmission assembly 120 includes one movement drive part 121, so that the cleaning device 10 includes two movement drive parts 121. Each of the two movement drive parts 121 is drivably connected to one first wheel 1121, so that the cleaning device 10 can make a turn. The first wheel 1121 may be a front wheel of the cleaning device 10, and the second wheel 1122 may be a rear wheel of the cleaning device 10. For example, when the cleaning device 10 needs to make a turn, one movement drive part 121 enables one first wheel 1121 to stop operating, decelerate, or operate reversely, and the other movement drive part 121 acceleratively drives the other first wheel 1121 to rotate, so that the cleaning device 10 can make a turn. In this embodiment, two movement drive parts 121 are disposed to respectively drive the two first wheels 1121 to rotate, so that more power is provided to the cleaning device 10, and the operating efficiency is improved.

In another embodiment, the cleaning device 10 includes two transmission assemblies 120, two first wheels 1121, and two second wheels 1122, and each transmission assembly 120 includes two first driven parts 123, so that the cleaning device 10 has four first driven parts 123. The four first driven parts 123 are respectively drivably connected to the two first wheels 1121 and the two second wheels 1122, so that the four first driven parts 123 respectively drive the four first cleaning parts 410. This improves the cleaning efficiency of the cleaning device 10.

In still another embodiment, the cleaning device 10 includes four transmission assemblies 120, two first wheels 1121, and two second wheels 1122, and each transmission assembly 120 includes one first driven part 123 and one movement drive part 121. The four movement drive parts 121 respectively drive the two first wheels 1121 and the two second wheels 1122, and the four first driven parts 123 are respectively drivably connected to the two first wheels 1121 and the two second wheels 1122, so that the four first driven parts 123 respectively drive four first cleaning parts 410. This improves the cleaning efficiency of the cleaning device 10.

Figure 31:
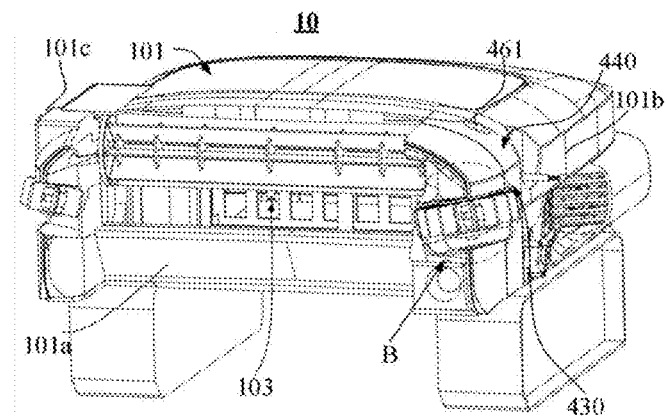
FIG. 31 is a schematic cross-sectional diagram of a cleaning device according to a sixth embodiment of the present disclosure.

FIG. 31 is a schematic cross-sectional diagram of the cleaning device according to a sixth embodiment of the present disclosure. The cleaning device 10 includes the cleaning device body 101, a cleaning member 430, and the movement drive assembly. The cleaning member 430 is disposed on the cleaning device body 101. The movement drive assembly (not shown in the figure) is disposed on the cleaning device body 101. The movement drive assembly is connected to the cleaning member 430 and is configured to drive the cleaning member 430 to move telescopically relative to the cleaning device body 101. The telescopic movement includes at least one of: an extension movement in a direction away from the cleaning device body 101 and a retraction movement in a direction close to the cleaning device body 101. At a first position, the cleaning member 430 excessively is retracted, and at a second position, the cleaning member 430 excessively extends. It may be understood that the cleaning member 430 may stop at the first position, the second position, or any position between the first position and the second position, to meet various application requirements. During the cleaning process, the cleaning device body 101 may move along the bottom wall of the pool, the side wall of the pool, the water surface of the pool, or suspend in the liquid in the pool.

The present disclosure is mainly applied in the field of robots. The cleaning device 10 in the present disclosure may drive, by using the movement drive assembly, the cleaning member 430 to move telescopically, so that the cleaning member 430 is more flexible and can comprehensively clean surfaces of the pool in different directions and at different distances or water in the pool. In this way, movements of the cleaning device 10 can be reduced to improve the cleaning efficiency. In addition, the movement drive assembly may further drive the cleaning member 430 to rotate. The rotation may be rotation of the cleaning member 430 at any angle around a position at which the cleaning member 430 is connected to the cleaning device body 101. The cleaning member 430 can be switched between an extended state and a retracted state through rotation.

Figure 32:
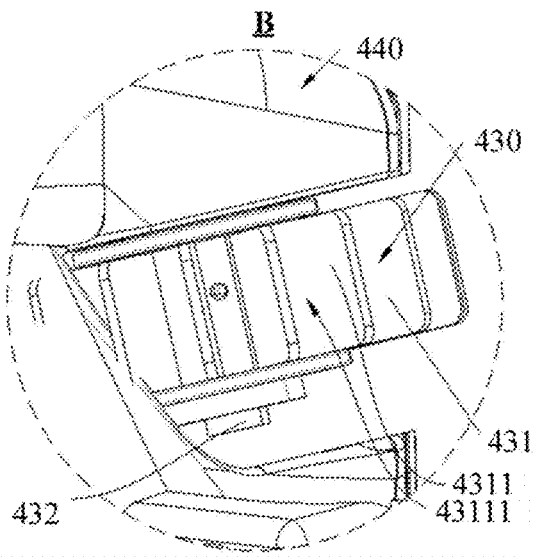
FIG. 32 is a schematic diagram of a structure of a portion B shown in FIG. 31.

FIG. 32 is a schematic diagram of a structure of a portion B in FIG. 31. The cleaning member 430 may include a rotary brush 431 and a rotation shaft 432. The rotary brush 431 is disposed around the rotation shaft 432. The rotation shaft 432 is rotatably connected to the cleaning device body 101 through the movement drive assembly. The rotary brush 431 has at least one cleaning surface 43111. The cleaning surface 43111 may be tilted and is configured to be in contact with and stir a water flow. Specifically, the rotary brush 431 includes a plurality of cleaning portions 4311. The cleaning portions 4311 are disposed around a periphery of the rotation shaft 432. The cleaning portions 4311 extend along an axial direction of the rotation shaft 432. The cleaning surface 43111 is formed on a side of the cleaning portion 4311. At least a part of the cleaning portion 4311 is made of a flexible material, such as rubber, elastic fabric, or bristles, and/or at least a part of the cleaning portion 4311 is made of a rigid material, such as steel wires. The rigid material can improve a cleaning capability of the cleaning member 430. In addition, the plurality of cleaning portions 4311 may be alternately made of various materials, such as made of rubber alternated with steel wires. The rotary brush 431 may be made of the same material as or different materials from the rotation shaft 432.

In some embodiments, when the cleaning member 430 is in the retracted state, the cleaning member 430 is entirely or at least partially located inside the cleaning device body 101. The retracted state is a state in which the movement drive assembly drives the cleaning member 430 to retract, or a state in which the movement drive assembly does not drive the cleaning member 430 to extend. For example, the retracted state is a state in which the movement drive assembly drives the cleaning member 430 to retract in the direction close to the cleaning device body 101. In this case, the cleaning member 430 is gradually retracted into the cleaning device body 101. When a part of the cleaning member 430 located inside the cleaning device body 101 reaches a first preset value, the cleaning member 430 stops retracting. The first preset value may be 50%, 60%, 85%, or 100%. For another example, the retracted state is a state in which the movement drive assembly does not drive the cleaning member 430 to extend, that is, the cleaning member 430 is in the retracted state. In this case, when the movement drive assembly drives the cleaning member 430 to move, the cleaning member 430 only extends.

In some other embodiments, when the cleaning member 430 is in the extended state, at least a part of the cleaning member 430 is located outside the cleaning device body 101. The extended state is a state in which the movement drive assembly drives the cleaning member 430 to extend, or a state in which the movement drive assembly does not drive the cleaning member 430 to retract. For example, the extended state is a state in which the movement drive assembly drives the cleaning member 430 to extend in the direction away from the cleaning device body 101. In this case, the cleaning member 430 gradually moves out of the cleaning device body 101. When the part of the cleaning member 430 located inside the cleaning device body 101 reaches a second preset value, the cleaning member 430 stops extending. The second preset value may be 50%, 60%, 85%, or the like. For another example, the extended state is a state in which the movement drive assembly does not drive the cleaning member 430 to retract, that is, the cleaning member 430 is in the extended state. In this case, when the movement drive assembly drives the cleaning member 430 to move, the cleaning member 430 is only retracted.

In some embodiments, the cleaning member 430 may be in the extended state or the retracted state. The cleaning member 430 may be in the retracted state when the cleaning member 430 is retracted in the direction close to the cleaning device body 101. The cleaning member 430 may be in the extended state when the cleaning member 430 extends in the direction away from the cleaning device body 101.

Figure 33:
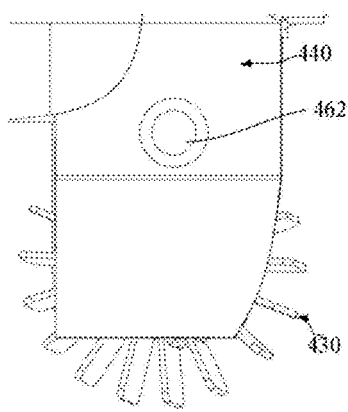
FIG. 33 is a schematic diagram of a structure of a connection portion of a cleaning device according to a sixth embodiment of the present disclosure.

FIG. 33 is a schematic diagram of a structure of a connection portion of the cleaning device according to the sixth embodiment of the present disclosure. In some embodiments, the cleaning member 430 is driven to rotate and move telescopically. The movement drive assembly may include a connection portion 440 and a first drive assembly (not shown in the figure). The cleaning member 430 is connected to the cleaning device body 101 through the connection portion 440. The first drive assembly is connected to the connection portion 440 and is configured to drive the cleaning member 430 to move telescopically relative to the cleaning device body 101.

Figure 34:
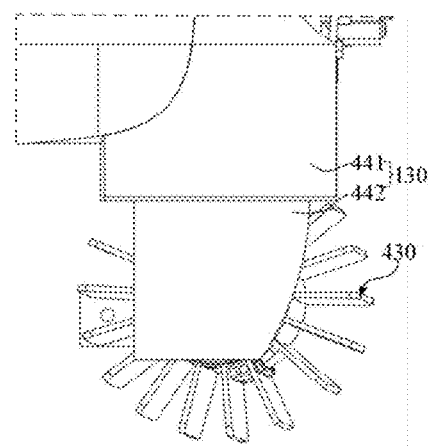
FIG. 34 is a schematic diagram of a structure of a connection portion of a cleaning device according to a seventh embodiment of the present disclosure.

FIG. 34 is a schematic diagram of a structure of the connection portion of the cleaning device according to a seventh embodiment of the present disclosure. In some embodiments, the connection portion 440 may be a telescopic structure as shown in FIG. 34. The connection portion 440 includes a fixed portion 441 and a telescopic portion 442. The fixed portion 441 is fixedly connected to the cleaning device body 101. One end of the telescopic portion 442 is connected to the fixed portion 441, and the other end of the telescopic portion 442 is connected to the cleaning member 430. The telescopic portion 442 may move telescopically relative to the fixed portion 441. The first drive assembly includes a first power source (not shown in the figure). The first power source is disposed at a joint between the fixed portion 441 and the telescopic portion 442. The first power source is configured to drive the connection portion 440 to move telescopically to drive the cleaning member 430 to move telescopically. It may be understood that the first power source may be a motor or an air cylinder. This is not specifically limited herein.

In some other embodiments, the cleaning member 430 is movably connected to the movement drive assembly. The first drive assembly includes a first transmission mechanism 450 and the first power source. An input end of the first transmission mechanism 450 is connected to the first power source, an output end of the first transmission mechanism 450 is connected to the cleaning member 430, and the first power source is configured to provide power to the first transmission mechanism 450, so that the first transmission mechanism 450 drives the cleaning member 430 to move telescopically relative to the cleaning device body 101 and the connection portion 440.

Figure 35:
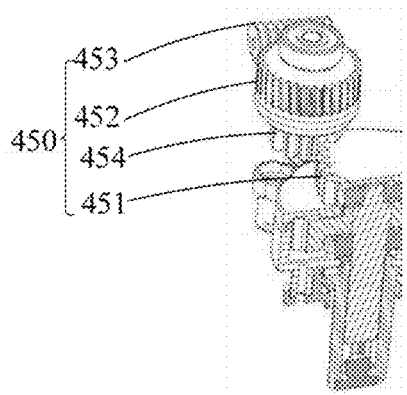
FIG. 35 is a schematic diagram of a structure of a first transmission mechanism of a cleaning device according to a sixth embodiment of the present disclosure.

FIG. 35 is a schematic diagram of a structure of the first transmission mechanism of the cleaning device according to the sixth embodiment of the present disclosure. Specifically, the first transmission mechanism 450 and the first power source may be disposed at an end of the connection portion 440, wherein the end is connected to the cleaning member 430, to control the cleaning member 430 to move telescopically. The first transmission mechanism 450 may include a worm gear transmission mechanism and a gear transmission mechanism. For example, as shown in FIG. 35, the first transmission mechanism 450 includes an oscillating gear 451, a worm gear 452, a worm 453, and a transmission gear 454. The worm 453 is fixedly connected to an output end of the first power source. The worm 453 is engaged with the worm gear 452. The worm gear 452 and the transmission gear 454 are fixedly connected to each other through a concentric shaft. The transmission gear 454 is engaged with the oscillating gear 451. The oscillating gear 451 serves as the output end of the first transmission mechanism 450 and is configured to drive a component connected to the output end of the first transmission mechanism 450 to move telescopically. It may be understood that the first transmission mechanism 450 may include a transmission mechanism other than the worm gear transmission mechanism and the gear transmission mechanism. This is not specifically limited herein. For example, the component connected to the output end of the first transmission mechanism 450 is the cleaning member 430, and the cleaning member 430 is eccentrically connected to the oscillating gear 451 through a rotation shaft. The oscillating gear 451 and the rotation shaft eccentrically oscillate to drive the cleaning member 430 to extend in the direction away from the cleaning device body 101, so that the cleaning member 430 at least partially extends out of the cleaning device body 101, or to drive the cleaning member 430 to retract in the direction close to the cleaning device body 101, so that the cleaning member 430 is at least partially retracted into the cleaning device body 101. It may be understood that the first transmission mechanism 450 may be a transmission structure other than the above transmission structure. This is not specifically limited herein.

In some other embodiments, a first end of the connection portion 440 is connected to the cleaning member 430. The first drive assembly includes the first transmission mechanism 450 and the first power source. The input end of the first transmission mechanism 450 is connected to the first power source, and the output end of the first transmission mechanism 450 is connected to a second end of the connection portion 440 or connected to a component disposed between the second end and the cleaning device body 101. The first power source is configured to provide power to the first transmission mechanism 450, so that the first transmission mechanism 450 drives the connection portion 440 and the cleaning member 430 to move telescopically relative to the cleaning device body 101. The first transmission mechanism 450 controls any component connected thereto to rotate or translate, so that the cleaning member 430 moves telescopically relative to the cleaning device body 101.

In some embodiments, the movement drive assembly includes at least one group of second drive assemblies, and each second drive assembly is configured to drive the cleaning member 430 to rotate relative to the cleaning device body 101.

The first drive assembly and the second drive assembly can simultaneously control the connection portion 440 to rotate and move telescopically. In this case, the component disposed between the second end and the cleaning device body 101 may be the second drive assembly. In one specific embodiment, each second drive assembly includes a second transmission mechanism and a second power source. The second power source is connected to an input end of the second transmission mechanism and is configured to provide power to the second transmission mechanism, so that the second transmission mechanism directly or indirectly drives the cleaning member 430 to rotate. It may be understood that the second power source may be a motor, an air cylinder, or the like. This is not limited herein.

In another specific embodiment, the first end of the connection portion 440 is connected to the cleaning member 430. The at least one group of second drive assemblies includes a first group of second drive assemblies. The first end of the connection portion 440 is connected to the cleaning member 430, and each second drive assembly in the first group of second drive assemblies is connected to the cleaning device body 101 and the second end of the connection portion 440 to drive the connection portion 440 to rotate around a first direction shaft 461, to further indirectly drive the cleaning member 430 to rotate around the first direction shaft 461. The first direction shaft 461 may be a linear rotation shaft 432, and the linear rotation shaft 432 may be disposed vertically, so that the connection portion 440 rotates in the horizontal direction as shown in FIG. 31, or the linear rotation shaft 432 may be disposed horizontally, so that the connection portion 440 rotates in the vertical direction. The first direction shaft 461 may alternatively be a spherical rotation shaft 432, so that the connection portion 440 can rotate at any angle. The first direction shaft 461 is not specifically limited herein.

In another specific embodiment, the at least one group of second drive assemblies includes a second group of second drive assemblies. Refer to FIG. 33. The first end of the connection portion 440 is connected to the cleaning member 430 through each second drive assembly in the second group of second drive assemblies. Each second drive assembly in the second group of second drive assemblies is configured to drive the connection portion 440 to rotate around a second direction shaft 462 to directly drive the cleaning member 430 to rotate around the second direction shaft 462. It may be understood that the second direction shaft 462 may be a linear rotation shaft 432, a spherical rotation shaft 432, or the like. This is not specifically limited herein.

In another specific embodiment, the cleaning member 430 is movably connected to the cleaning device body 101. The at least one group of second drive assemblies includes the first group of second drive assemblies and the second group of second drive assemblies. Refer to FIG. 31 and FIG. 33. The first end of the connection portion 440 is connected to the cleaning member 430, and each second drive assembly in the first group of second drive assemblies is connected to the cleaning device body 101 and the second end of the connection portion 440 to drive the connection portion 440 to rotate around the first direction shaft 461. One end of each second drive assembly in the second group of second drive assemblies is connected to the cleaning member 430, and the other end thereof is connected to the connection portion 440 to drive the connection portion 440 to rotate around the second direction shaft 462, to implement multi-stage rotation control on the cleaning member 430. This improves a cleaning range of the cleaning member 430.

For example, the first direction shaft 461 is the linear rotation shaft 432 and is vertically disposed, and the second direction shaft 462 is the linear rotation shaft 432 and is horizontally disposed. Therefore, when the cleaning member 430 performs cleaning, each second drive assembly in the first group of second drive assemblies may first drive the connection portion 440 to rotate around the first direction shaft 461 in the horizontal direction. After the cleaning member 430 rotates to a preset position, each second drive assembly in the second group of second drive assemblies may then drive the cleaning member 430 to rotate around the second direction shaft 462 in the vertical direction, to clean a to-be-cleaned object in the vertical direction. In addition, if the cleaning device 10 is trapped during performing cleaning, the cleaning member 430 and the connection portion 440 flexibly rotate and swing, so that the cleaning device 10 can escape from the trap more easily. Furthermore, the second drive assembly and the first drive assembly may be a same assembly.

It may be understood that when the first group of second drive assemblies and the second group of second drive assemblies are simultaneously configured to control the cleaning member 430 to rotate, the connection portion 440 is first controlled to rotate in the vertical direction, and then the cleaning member 430 is controlled to rotate in the horizontal direction, or the connection portion 440 is first controlled to rotate in the horizontal direction, and then the cleaning member 430 is controlled to rotate in the vertical direction. A scheme of multi-stage rotation control on the cleaning member 430 is not specifically limited herein.

In addition, the at least one group of second drive assemblies may include one, two, or more groups of second drive assemblies. A quantity of groups may be set based on an actual cleaning requirement. This is not specifically limited herein.

In addition, a third drive assembly (not shown in the figure) may be disposed in the movement drive assembly, so that the cleaning member 430 can conveniently clean the surface of the pool, a to-be-cleaned object, or the water in the pool. The third drive assembly is connected to the cleaning member 430 to drive, when the cleaning member 430 needs to operate, the cleaning member 430 to rotate around its own axis, to brush and clean the surface of the pool, the to-be-cleaned object, or the water in the pool.

In some embodiments, there are a plurality of cleaning members 430. At least one of the plurality of cleaning members 430 is configured to perform cleaning. For example, the cleaning device 10 may be provided with one cleaning member 430, two cleaning members 430, or a plurality of cleaning members 430. A quantity of cleaning members 430 may be set based on a specific cleaning situation. The cleaning members 430 may be disposed on only a front wall 101*a*, only a rear wall, only a side wall, or two opposite side walls of the cleaning device body 101 as shown in FIG. 31. This is not specifically limited herein. For another example, at least one cleaning member 430 is configured for the cleaning device 10 to escape from a trap. For example, when the cleaning device 10 is trapped by water plants at the bottom of the water, the cleaning member 430 may rotate and move telescopically to escape from the water plants, or the cleaning member 430 may be retracted into the cleaning device 10 to reduce a width of the cleaning device 10, so that the cleaning device 10 passes through easily.

There is a plurality of cleaning members 430, and the plurality of cleaning members 430 are disposed on at least one of a left side wall 101b, a right side wall 101c, and the bottom of the cleaning device body 101.

As shown in FIG. 31, the cleaning device body 101 is further provided with the liquid inlet portion 103. The at least one cleaning member 430 is configured to expand a cleaning range of the liquid inlet portion 103. The cleaning member 430 may be a side brush. The liquid inlet portion 103 is configured to draw water flows, stains, and the like into the cleaning device body 101. The side brush is disposed on the side wall or the bottom of the cleaning device body 101. When the cleaning device 10 moves along an edge of the pool, the side brush may scrub the surface of the pool. There is a cleaning material on the side brush. The side brush moves around its own axis or reciprocates to scrub a to-be-cleaned object. The stains may be garbage floating on the pool, scale or black stains accumulated in the pool, or the like. The cleaning range of the liquid inlet portion 103 is a range in which the liquid inlet portion 103 may affect the water flow and the stains when the liquid inlet portion 103 is in a state of sucking the water flow and the stains. As shown in FIG. 31, the liquid inlet portion 103 may be disposed on the front wall 101a of the cleaning device body 101. Along an opening direction of the liquid inlet portion 103, at least one cleaning member 430 is located in the front of the liquid inlet portion 103. For example, the at least one cleaning member 430 is disposed on the left side wall 101b and/or the right side wall 101c of the cleaning device body 101 and extends towards the front wall 101a. In addition, the cleaning member 430 tilts towards the liquid inlet portion 103, a tilt angle may be 1°, 5°, 8°, 15°, 25°, 30°, 33°, 60°, 75°, 80°, or the like. A self-rotation direction of the cleaning member 430 is a direction facing the liquid inlet portion 103, so that the cleaning member 430 can stir a water flow and stains outside the cleaning range of the liquid inlet portion 103 and guide the water flow and the stains to the liquid inlet portion 103.

Further, a filtering structure and an accommodating cavity 742 may be disposed in the cleaning device body 101. The filtering structure may separate the water flow from the stains, that is, filter out the stains. The accommodating cavity 742 may accommodate the stains filtered out by the filtering structure. In the cleaning device body 101, the accommodating cavity 742, the filtering structure, and the liquid inlet portion 103 may be disposed to cooperate with each other. The filtering structure filters the water flow sucked by the liquid inlet portion 103 to separate the stains from the water flow, so that the stains are left in the accommodating cavity 742, and the clean water flow is drained from the cleaning device body 101.

Figure 36:
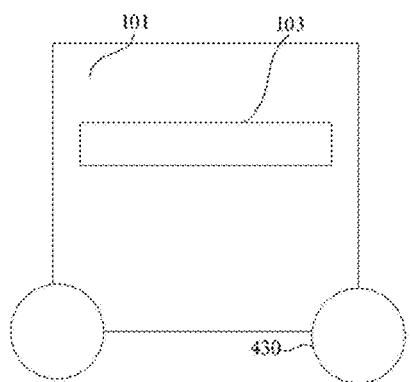
FIG. 36 is a schematic diagram of a structure of a cleaning device according to a seventh embodiment of the present disclosure.

FIG. 36 is a schematic diagram of a structure of the cleaning device according to the seventh embodiment of the present disclosure. In some embodiments, when the liquid inlet portion 103 is disposed on the front wall 101a of the cleaning device body 101, the cleaning member 430 may be disposed at the bottom of the cleaning device body 101. As shown in FIG. 36, the cleaning member 430 is disposed at the bottom of the cleaning device body 101 and can extend out of the bottom of the cleaning device body 101. In addition, the cleaning member 430 may be disposed to tilt towards a center of the liquid inlet portion 103 or be parallel to the liquid inlet portion 103 to guide a water flow and stains under the liquid inlet portion 103 to the liquid inlet portion 103. In addition, when the cleaning member 430 extends out of the cleaning device body 101, the cleaning member 430 can further scrub a target object in contact with the cleaning member 430.

In addition, when the liquid inlet portion 103 is disposed on the front wall 101a of the cleaning device body 101, the at least one cleaning member 430 may be disposed on a side of the cleaning device body 101, such as the left side wall 101b or the right side wall 101c. The at least one cleaning member 430 may alternatively be disposed on both the left side wall 101b and the right side wall 101c of the cleaning device body 101. In this case, an end of the connection portion 440 is away from the cleaning device body 101, and the end extends towards the bottom of the cleaning device body 101, so that the cleaning member 430 located at the end of the connection portion 440 and away from the cleaning device body 101 is close to the bottom of the cleaning device body 101, and the cleaning member 430 tilts towards the liquid inlet portion 103 disposed at the bottom of the cleaning device body 101. In this way, a water flow and stains outside a range of the bottom of the cleaning device body 101 can be guided to the liquid inlet portion 103.

In some other embodiments, the liquid inlet portion 103 is disposed at the bottom of the cleaning device body 101. To extend the cleaning range of the liquid inlet portion 103, the at least one cleaning member 430 may alternatively be disposed at the bottom of the cleaning device body 101 and in the front of the liquid inlet portion 103.

In addition, when the liquid inlet portion 103 is disposed at the bottom of the cleaning device body 101, the at least one cleaning member 430 is disposed on the left side wall 101b and/or the right side wall 101c of the cleaning device body 101. An end of the connection portion 440 is away from the cleaning device body 101, and the end extends towards the bottom of the cleaning device body 101, so that the cleaning member 430 located at the end of the connection portion 440 and away from the cleaning device body 101 is close to the bottom of the cleaning device body 101, and the cleaning member 430 tilts towards the liquid inlet portion 103 located at the bottom of the cleaning device body 101. In this way, a water flow and stains outside a range of the bottom of the cleaning device body 101 can be guided to the liquid inlet portion 103.

In some embodiments, the cleaning device 10 further includes at least one of a trigger data collection unit and an in-position sensor. The trigger data collection unit is configured to collect trigger data about a preset movement of the cleaning member 430. The in-position sensor is configured to collect reference data about whether the preset movement of the cleaning member 430 is in position. For example, the in-position sensor may be an acceleration detection sensor, a distance sensor, a position detection sensor, or the like.

In some embodiments, the cleaning device body 101 may float on the water surface. When the cleaning device body 101 floats on the water surface, the cleaning member 430 is at least partially located under the water surface. For example, the cleaning member 430 may be partially or completely disposed under the water surface.

In a specific embodiment, when the cleaning device body 101 floats on the water surface, a half of the cleaning member 430 is located on the water surface, and the other half is located under the water surface. In this way, the cleaning member 430 can conveniently clean the stains on the water surface. In addition, when the cleaning member 430 tilts, a part of the cleaning member 430 is located on the water surface, and the part does not stir a water flow when rotating, so that the stains are prevented from being pushed forward by the water flow and therefore can reach the vicinity of the liquid inlet portion 103, leading to a better cleaning effect of the cleaning device 10.

In another specific embodiment, when the cleaning device body 101 floats on the water surface, the cleaning member 430 is completely located under the water surface. In this way, because the cleaning member 430 is entirely located under the water surface, the cleaning member 430 is less likely to splash water when rotating, so that a shore of the pool is less likely to be wet.

In addition, when the cleaning device body 101 floats on the water surface, and the liquid inlet portion 103 is located on the front wall 101a of the cleaning device body 101, the liquid inlet portion 103 may be at least partially located under the water surface. In a specific embodiment, a half of the liquid inlet portion 103 is located on the water surface, and the other half is located under the water surface. In this way, stains located close to the water surface can directly enter the liquid inlet portion 103, and the stains can move to the liquid inlet portion 103 without overcoming a buoyancy force, leading to high cleaning efficiency.

In another specific embodiment, when the cleaning device body 101 floats on the water surface, and the liquid inlet portion 103 is located on the front wall 101a of the cleaning device body 101, the liquid inlet portion 103 is completely located under the water surface, or when the liquid inlet portion 103 is located at the bottom of the cleaning device body 101, the liquid inlet portion 103 is completely located under the water surface. In this way, the liquid inlet portion 103 is completely located under the water surface to be in contact with a larger flow of water, leading to high stain absorption efficiency.

In some embodiments, the cleaning member 430 has a starting position and a telescopic position. The cleaning device 10 further includes a reset assembly (not shown in the figure). The reset assembly is disposed on the cleaning device body 101. The reset assembly is connected to the cleaning member 430. The reset assembly is configured to provide a reset force for the cleaning member 430 to remain at the starting position. The cleaning member 430 can reach the telescopic position when the movement drive assembly drives the cleaning member 430 to move telescopically.

In a specific embodiment, when the cleaning member 430 is at the starting position, the cleaning member 430 is in the retracted state. When the cleaning member 430 is driven to reach the telescopic position, the cleaning member 430 is in the extended state. For example, the starting position of the cleaning member 430 is a retracted position, that is, the cleaning member 430 is a normally-retracted state. When the movement drive assembly drives the cleaning member 430 to move towards an extended position, the cleaning member 430 is switched from the normally-retracted state to the extended state. When the movement drive assembly no longer provides power for the cleaning member 430 in the extended state, the reset assembly provides the reset force for the cleaning member 430, so that the cleaning member 430 returns to the starting position again.

In another specific embodiment, when the cleaning member 430 is at the starting position, the cleaning member 430 is in the extended state. When the cleaning member 430 is driven to the telescopic position, the cleaning member 430 is in the retracted state. For example, the starting position of the cleaning member 430 is an extended position, that is, the cleaning component 430 is in a normally-extended state. When the movement drive assembly drives the cleaning member 430 to move towards a retracted position, the cleaning member 430 is switched from the normally-extended state to the retracted state. When the movement drive assembly no longer provides power for the cleaning member 430 in the retracted state, the reset assembly provides the reset force for the cleaning member 430, so that the cleaning member 430 returns to the starting position again.

Figure 37:
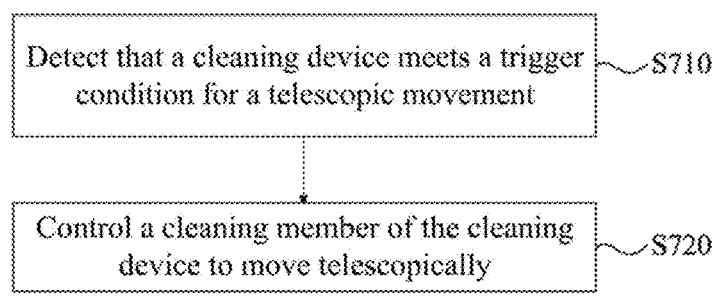
FIG. 37 is a schematic flow chart of a control method for a cleaning device according to an embodiment of the present disclosure.

FIG. 37 is a schematic flow chart of a control method of the cleaning device according to an embodiment of the present disclosure. The control method is used to control the cleaning device 10. Specifically, the method includes the following steps.

Step S710: Detect that the cleaning device 10 currently meets a trigger condition for a telescopic movement.

In some embodiments, the trigger condition for the telescopic movement includes at least one of the following:

(1) A distance between the cleaning device 10 and a target object is within a preset distance range. The target object includes at least one of: a wall and an obstacle.

Specifically, the trigger data collection unit includes a first trigger sensor. Therefore, it may be determined, based on first sensing data collected by the first trigger sensor of the cleaning device 10, that the distance between the cleaning device 10 and the target object is within the preset distance range. For example, a distance sensor on the cleaning device 10 is used to detect a forward moving direction of the cleaning device 10 or any surrounding object. If the target object is detected, and the distance between the cleaning device 10 and the target object is within the preset distance range, the movement drive assembly of the cleaning device 10 may be used to control the cleaning member 430 to move telescopically and rotate to clean the target object.

(2) The cleaning device 10 is in a trapped state. When the cleaning device 10 is detected to be in the trapped state, the cleaning member 430 may be controlled to move telescopically to reduce a range occupied by the cleaning device 10, so that the cleaning device 10 passes through easily. Situations in which the cleaning device 10 is detected to be in the trapped state may include, but is not limited to, the following situations:

2-1. It is determined, based on second sensing data collected by a second trigger sensor of the cleaning device 10, that there is a preset deviation between an actual rotation angle of the cleaning device 10 and a preset rotation angle. The second trigger sensor is included in the trigger data collection unit.

In some embodiments, the preset rotation angle may be obtained by analyzing a received operation instruction by the cleaning device 10, and the second trigger sensor may be a gyroscope sensor. The gyroscope sensor may detect the actual rotation angle of the cleaning device 10 after the cleaning device 10 receives the operation instruction and send the detected actual rotation angle to a central processing unit 52 of the cleaning device 10 to compare the detected actual rotation angle with the preset rotation angle. If a deviation exists between the detected actual rotation angle and the preset rotation angle and exceeds the preset deviation, the central processing unit 52 determines that the cleaning device 10 is currently trapped.

2-2. It is detected that the cleaning device 10 does not move for a target distance after moving for a first time.

In some embodiments, an acceleration sensor is disposed in the cleaning device 10. The cleaning device 10 receives the operation instruction of moving forward for the target distance within the first time. The acceleration sensor detects an acceleration of the cleaning device 10 during moving and sends the detected acceleration to the central processing unit 52 of the cleaning device 10. The central processing unit 52 calculates, based on the acceleration and the first time, an actual moving distance of the cleaning device 10. If the calculated actual moving distance is unequal to the target distance, it is determined that the cleaning device 10 is currently trapped. The first time may be 3 seconds, 5 seconds, 10 seconds, 20 seconds, or the like.

2-3. It is detected that a difference between a position of the cleaning device 10 relative to a reference point before a second time and a position of the cleaning device 10 relative to the reference point after the second time is within a preset difference range. The reference point is determined by a third trigger sensor.

In some embodiments, the third trigger sensor may be a time of flight (Time of Flight, TOF) sensor. The TOF sensor may be disposed on the front wall 101a of the cleaning device 10. The TOF sensor determines a point in front of the cleaning device 10 as the reference point, calculates a first relative position of the cleaning device 10 relative to the reference point at a current time, and calculates a second relative position of the cleaning device 10 relative to the reference point after the second time to compare the first relative position with the second relative position. If the difference is within the preset difference range, it indicates that the cleaning device 10 does not move or moves for a short distance, and it is determined that the cleaning device 10 is trapped. The second time may be 5 seconds, 10 seconds, 20 seconds, or the like.

2-4. A current of a drive motor of the cleaning device 10 increases, and a current increase meets a current change for a trapped situation.

In some embodiments, while the difference between the position of the cleaning device 10 relative to the reference point before the second time and the position of the cleaning device 10 relative to the reference point after the second time is within the preset difference range, the current of the drive motor of the cleaning device 10 increases, further indicating that the cleaning device 10 is trapped. It may be understood that, in addition to the above situation, the situation 2-1 may be combined with the situation 2-4, or the situation 2-2 may be combined with the situation 2-4 or other situations to determine whether the cleaning device 10 is trapped.

(3) The cleaning device 10 receives a preset instruction. In some embodiments, it is detected that the cleaning device 10 receives the preset instruction, and the cleaning member 430 is controlled according to the preset instruction. The preset instruction may be a remote instruction. The remote instruction may be an instruction sent by a remote control or an instruction sent by a mobile phone, a tablet, or the like. The cleaning member 430 of the cleaning device 10 is controlled, according to the remote instruction, to move telescopically and/or rotate. It may be understood that, the preset instruction may be the remote instruction or an instruction that is automatically generated based on a current state of the cleaning device 10. This is not limited herein.

(4) The cleaning device 10 is in a preset operating mode. The preset operating mode includes at least one of: an energy saving mode, a return mode, and a charging mode. The return mode indicates that cleaning is completed in a returning process. It may be understood that the preset operating mode may further include a trap escaping mode and the like other than the above operating modes. This is not specifically limited herein.

In some embodiments, the cleaning member 430 is controlled when it is detected that the cleaning device 10 is in the preset operating mode. For example, when the cleaning device 10 is in the energy saving mode or the return mode, and the cleaning member 430 is in the extended state, the cleaning member 430 needs to be controlled to be retracted in the direction close to the cleaning device body 101. When the cleaning device 10 is in a rest mode, and the cleaning member 430 is in the retracted state, the cleaning member 430 does not need to be controlled to be repeatedly retracted in the direction close to the cleaning device body 101.

Step S720: Control the cleaning member 430 of the cleaning device 10 to move telescopically.

A telescopic movement includes at least one of: an extension movement in the direction away from the cleaning device body 101 and a retraction movement in the direction close to the cleaning device body 101.

In some embodiments, a default state of the cleaning member 430 of the cleaning device 10 is the retracted state. When it is detected that the distance between the cleaning device 10 and the target object is within the preset distance range, the cleaning member 430 of the cleaning device 10 may be controlled to extend in the direction away from the cleaning device body 101 of the cleaning device 10 to clean the target object.

In some other embodiments, the default state of the cleaning member 430 of the cleaning device 10 is the extended state. When it is detected that the cleaning device 10 is in at least one of cases: in the trapped state, receiving the preset instruction, and in the preset operating mode, the cleaning member 430 of the cleaning device 10 may be controlled to be retracted in the direction close to the cleaning device body 101 of the cleaning device 10.

Further, in a process of controlling the cleaning member 430 to move telescopically, the in-position sensor is used to detect whether the telescopic movement is in position. In response to detecting that the telescopic movement is in position, it is determined to control the cleaning member 430 to stop moving telescopically.

In addition, when it is detected that the cleaning device 10 currently meets a rotation trigger condition, the cleaning member 430 of the cleaning device 10 may be controlled to rotate relative to the cleaning device body 101, or when it is detected that the cleaning device 10 is in a target operating state, the cleaning member 430 of the cleaning device 10 is controlled to rotate around its own axis, so that the cleaning member 430 operates.

In the present disclosure, the cleaning member 430 of the cleaning device 10 can rotate around its own axis, move telescopically, and rotate, so that the cleaning member 430 can move flexibly. This can expand a range of single cleaning of the cleaning device 10 during cleaning and reduce a cleaning path of the cleaning device 10. Therefore, the cleaning efficiency is improved. In addition, when the cleaning device 10 is trapped during cleaning the pool, the cleaning member 430 can move flexibly to escape from the trap. A range occupied by the cleaning device 10 is reduced, so that the cleaning device 10 escapes from the trap.

In addition, a position of the cleaning member 430 may be associated with the liquid inlet portion 103 to expand the cleaning range of the liquid inlet portion 103 and improve the cleaning efficiency.

A person skilled in the art may understand that, in the above method of the specific embodiments, an order in which the steps are written does not indicate that the steps should be strictly performed in the order and does not limit an implementation process. A specific order of performing the steps shall be determined based on functions and possible internal logic.

Figure 38:
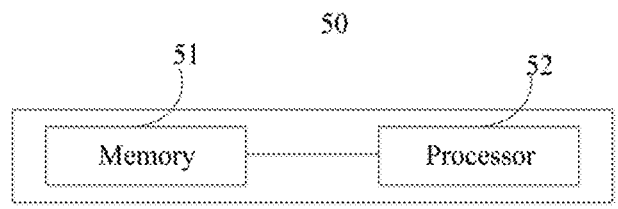
FIG. 38 is a schematic diagram of a framework of an electronic device according to an embodiment of the present disclosure.

FIG. 38 is a schematic diagram of a framework of an electronic device according to an embodiment of the present disclosure. The electronic device 50 includes a memory 51 and a processor 52 coupled to each other. The processor 52 is configured to execute program instructions stored in the memory 51 to implement the steps of the control method of the cleaning device 10 in any of the above embodiments. In the present disclosure, the electronic device 50 is the cleaning device 10.

Specifically, the processor 52 is configured to control itself and the memory 51 to implement the steps of the control method of the cleaning device 10 in any of the above embodiments. The processor 52 may also be referred to as a central processing unit (Central Processing Unit, CPU). The processor 52 may be an integrated circuit chip having a signal processing capability. The processor 52 may alternatively be a general-purpose processor 52, a digital signal processor 52 (Digital Signal Processor, DSP), an application specific integrated circuit (Application Specific Integrated Circuit, ASIC), a field-programmable gate array (Field-Programmable Gate Array, FPGA), or another programmable logic device, a discrete gate, a transistor logic device, or a discrete hardware component. The general-purpose processor 52 may be a microprocessor 52, or the processor 52 may be any conventional processor 52. In addition, the processor 52 may be implemented by an integrated circuit chip.

Figure 39:
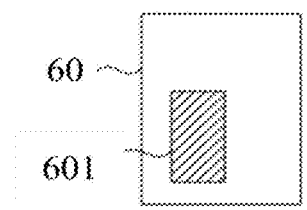
FIG. 39 is a schematic diagram of a framework of a computer-readable storage medium according to an embodiment of the present disclosure.

FIG. 39 is a schematic diagram of a framework of a computer-readable storage medium according to an embodiment of the present disclosure. The computer-readable storage medium 60 stores program instructions 601 that can be run by the processor 52. The program instructions 601 are executed to implement the steps of the control method for the cleaning device 10 in any of the above embodiments.

In some embodiments, the apparatus provided in embodiments of the present disclosure has functions or includes modules that can be used to perform the method described in the above method embodiment. For details about specific implementations, refer to the description of the above method embodiment. For brevity, details are not described herein again.

Figure 40:
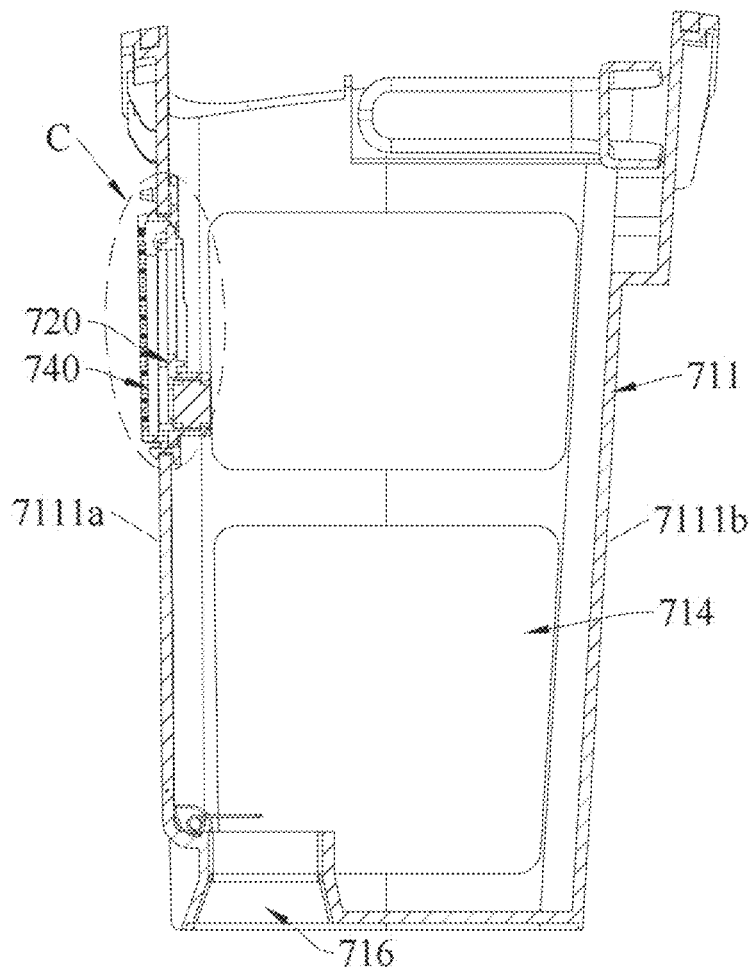
FIG. 40 is a schematic cross-sectional diagram of a filtering assembly of a cleaning device in a first motion state according to an eighth embodiment of the present disclosure.
Figure 41:
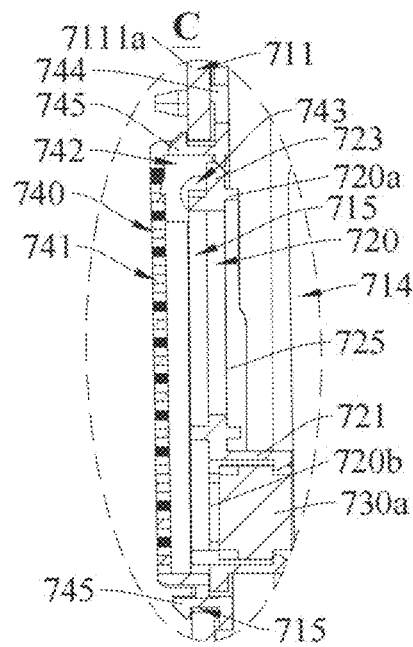
FIG. 41 is a schematic enlarged diagram of a portion C shown in FIG. 40.

FIG. 40 is a schematic cross-sectional diagram of the filtering assembly of the cleaning device in the first motion state according to an eighth embodiment of the present disclosure. FIG. 41 is a schematic enlarged diagram of a portion C shown in FIG. 40. In some embodiments, the cleaning device body 101 includes at least one filtering box cavity. The filtering mechanism includes at least one filtering assembly 710. The filtering assembly 710 includes at least one filtering box 711, a first filtering layer (not shown in the figure), at least one flow guiding opening 715, and a cover part 720. A first cavity 714 is formed in the filtering box 711. The filtering box 711 includes at least the first motion state and the second motion state. The first filtering layer is disposed at least on a side wall of the filtering box 711. The first filtering layer communicates with the first cavity 714. The flow guiding opening 715 is provided on the filtering box 711 and/or the first filtering layer. For example, the flow guiding opening 715 may be provided on the filtering box 711, the flow guiding opening 715 may be provided on the first filtering layer, or the flow guiding opening 715 may be provided on both the filtering box 711 and the first filtering layer. When the filtering box 711 is in the first motion state, the cover part 720 seals and covers the flow guiding opening 715. When the filtering box 711 is in the second motion state, the cover part 720 is opened to expose the flow guiding opening 715. It may be understood that opening the flow guiding opening 715 indicates that at least a part of water can flow out of the filtering box 711 through the flow guiding opening 715.

The filtering box water inlet portion 716 of the filtering box 711 is configured for water to enter the first cavity 714. The first filtering layer is configured to perform filtering. The water enters the first cavity 714 of the filtering box 711 through the filtering box water inlet portion 716, and the first filtering layer filters debris in the water out. The filtered water enters the filtering box cavity 1023 of the filtering assembly 710 and then enters the main water pump 210 through the filtering box cavity 1023.

The first motion state or the third motion state may be a state of the filtering assembly 710 when the cleaning device 10 cleans the bottom of the pool or the water surface. In the first motion state or the third motion state, the filtering assembly 710 is in a normal placement state, the cover part 720 covers the flow guiding opening 715 in a natural placement state, and a pushing force generated by the water normally flowing through the filtering assembly 710 is not sufficient to push the cover part 720 to be away from the flow guiding opening 715. The second motion state is a state of the filtering assembly 710 when the cleaning device 10 climbs a slope or a wall under the water surface or when the first filtering layer is clogged. In the second motion state, the filtering assembly 710 tilts, is inverted, or is in an operating state with the cleaning device 10, and the cover part 720 moves under the action of gravity and/or an external force, such as the pushing force generated by the water flow, so that the flow guiding opening 715 is opened. The first motion state or the third motion state is different from the second motion state.

Figure 42:
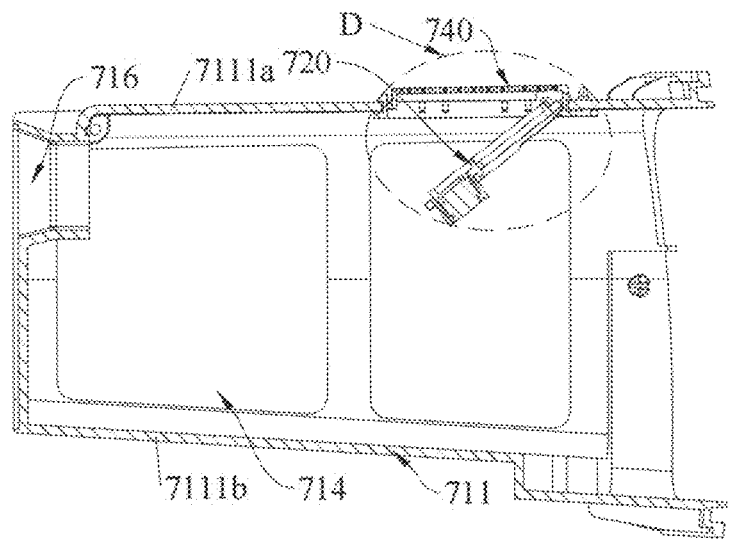
FIG. 42 is a schematic cross-sectional diagram of a filtering assembly of a cleaning device in a second motion state according to an eighth embodiment of the present disclosure.
Figure 43:
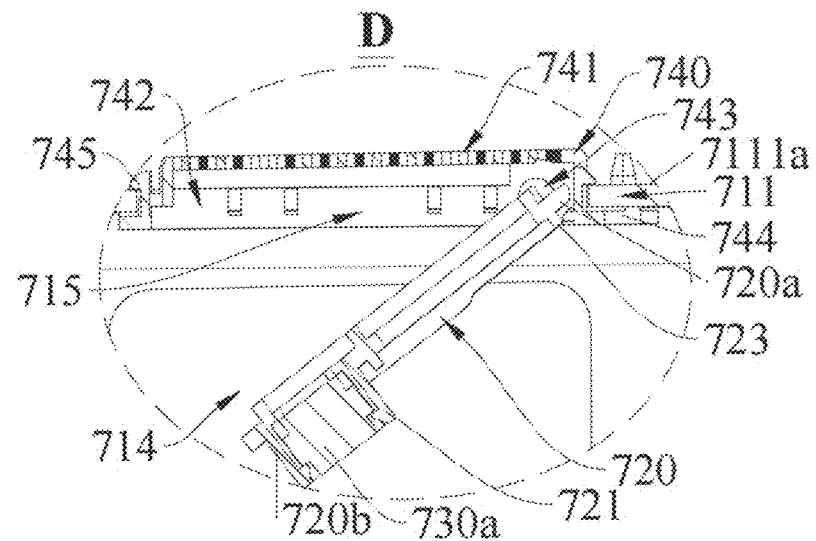
FIG. 43 is a schematic enlarged diagram of a portion D shown in FIG. 42.

FIG. 42 is a schematic cross-sectional diagram of the filtering assembly of the cleaning device in the second motion state according to the eighth embodiment of the present disclosure. FIG. 43 is a schematic enlarged diagram of a portion D shown in FIG. 42. With reference to FIG. 40 and FIG. 41, when the filtering box 711 is in the first motion state or the third motion state, the cover part 720 covers the flow guiding opening 715, and the water in the first cavity 714 flows out through the first filtering layer of the filtering box 711 to reduce impact on a cleaning effect of the cleaning device 10, so that the cleaning device 10 implements the normal cleaning function.

Figure 44:
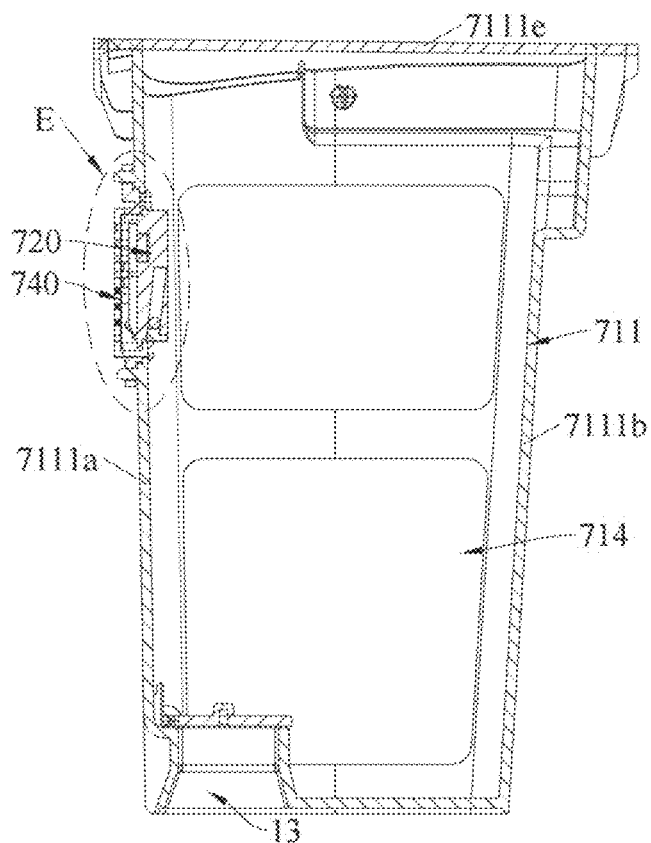
FIG. 44 is a schematic cross-sectional diagram of a filtering assembly of a cleaning device in a first motion state according to a ninth embodiment of the present disclosure.
Figure 45:
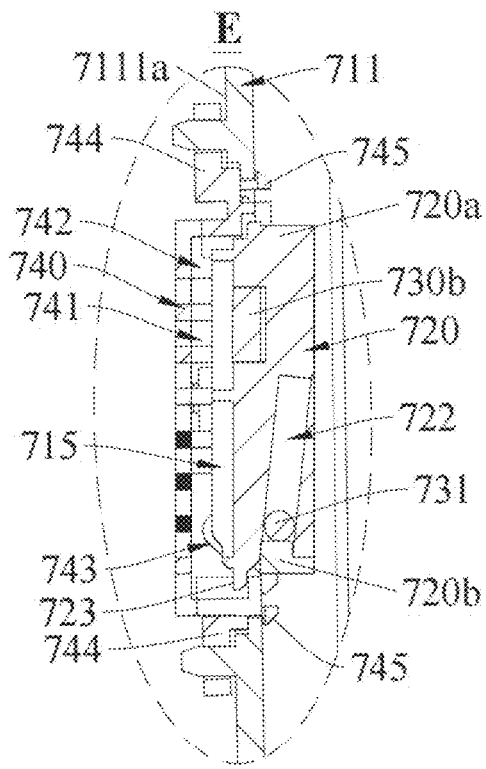
FIG. 45 is a schematic enlarged diagram of a portion E shown in FIG. 33.
Figure 46:
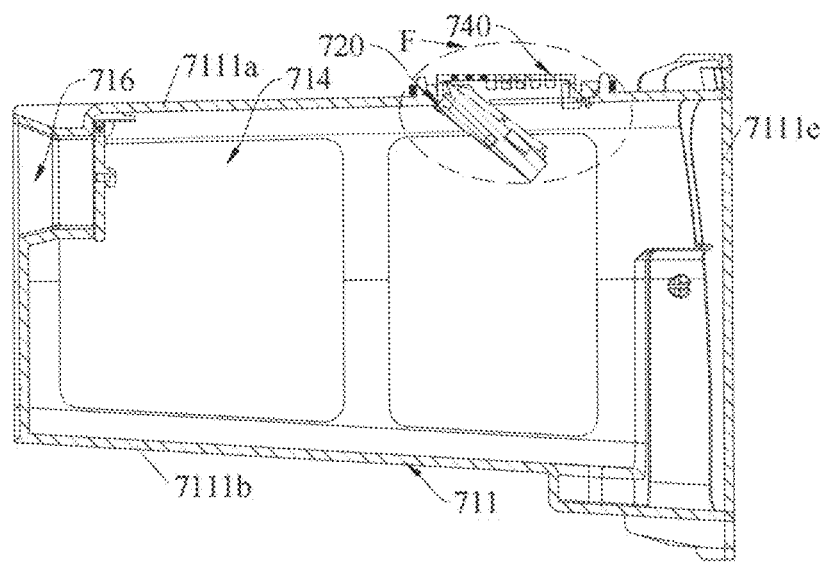
FIG. 46 is a schematic cross-sectional diagram of a filtering assembly of a cleaning device in a second motion state according to a ninth embodiment of the present disclosure.
Figure 47:
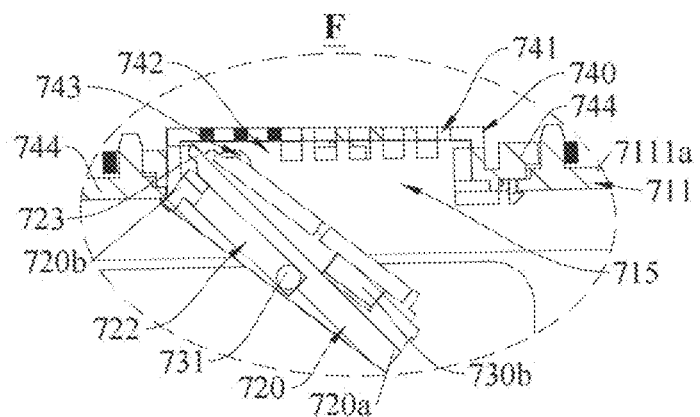
FIG. 47 is a schematic enlarged diagram of a portion F shown in FIG. 46.

FIG. 44 is a schematic cross-sectional diagram of the filtering assembly of the cleaning device in the first motion state according to a ninth embodiment of the present disclosure. FIG. 45 is a schematic enlarged diagram of a portion E shown in FIG. 44. FIG. 46 is a schematic cross-sectional diagram of the filtering assembly of the cleaning device in the second motion state according to the ninth embodiment of the present disclosure. FIG. 47 is a schematic enlarged diagram of a portion F shown in FIG. 46. With reference to FIG. 40 to FIG. 43, when the filtering assembly 710 is in the second motion state, the cover part 720 is gradually opened to expose the flow guiding opening 715. At least a part of the water in the first cavity 714 flows out directly through the flow guiding opening 715. This increases an amount of water flowing out of the filtering box 711. In this way, when the cleaning device 10 climbs the wall or the slope or when the first filtering layer is clogged to a certain extent, a requirement for the amount of water flowing into the main water pump 210 can always be met, so that the cleaning device 10 can stably climb the wall or the slope or operate stably. Therefore, the cleaning device 10 can be applied to more situations, such as underwater cleaning and water surface cleaning.

For example, when the filtering assembly 710 operates in the first motion state or the third motion state, and the first filtering layer is not clogged by stains to a certain extent, the filtering assembly 710 is in a normal operating state. When the cleaning device 10 climbs the wall or the slope, the cover part 720 moves under the action of gravity of the cover part or an external force to open the flow guiding opening 715, so that the cleaning device 10 can stably climb the wall or the slope.

When the filtering assembly 710 operates in the first motion state or the third motion state, and the first filtering layer is clogged by stains to a certain extent, the filtering assembly 710 cannot operate normally. In this case, the cover part 720 is opened to expose the flow guiding opening 715 to increase the amount of water flowing into the main water pump 210 and maintain stable operation performance of the cleaning device 10, so that the cleaning device 10 can stably climb the slope or the wall.

When the cleaning device 10 is climbing the wall or the slope, and the first filtering layer is clogged by stains, the cover part 720 is opened under the action of gravity of the cover part or the external force to expose the flow guiding opening 715, so that the cleaning device 10 can stably climb the wall or the slope.

Therefore, the first cavity 714, the flow guiding opening 715, and the cover part 720 of the filtering box 711 cooperate with each other, so that when the filtering box 711 is in the first motion state or the third motion state, the cover part 720 covers the flow guiding opening 715 to reduce impact on the cleaning effect of the cleaning device 10. When the filtering box 711 is in the second motion state, the cover part 720 is opened to expose the flow guiding opening 715 to increase the amount of water flowing out of the first cavity 714 and increase the amount of water flowing into the main water pump 210. In this way, a suction force applied to the cleaning device 10 is improved, so that wall climbing or slope climbing or operating performance of the cleaning device 10 is improved. This improves user experience.

The flow guiding opening 715 may include one flow guiding sub-opening (not shown in the figure), or the flow guiding opening 715 may include more than two flow guiding sub-openings, such as two flow guiding sub-openings, three flow guiding sub-openings, or a plurality of flow guiding sub-openings. A quantity of flow guiding sub-openings may be determined based on an actual situation. When there are a plurality of flow guiding sub-openings, an amount of water flowing out from the flow guiding opening formed by the plurality of flow guiding sub-openings needs to be substantially equal to an amount of water flowing out from the flow guiding opening 715 formed by one flow guiding sub-opening to ensure the amount of water flowing out from the flow guiding opening 715 to be consistent. In this way, the requirement for the amount of water flowing into the main water pump 210 can always be met when the cleaning device 10 climbs the wall or the slope or when the first filtering layer is clogged to a certain extent, so that the cleaning device 10 can stably climb the wall or the slope or operate stably.

There may be one, two, three, or four flow guiding openings 715. This is not limited herein. The periphery of the filtering box 711 is hollow. The first filtering layer is located at a hollowed region. The flow guiding opening 715 may be provided at the hollowed region of the filtering box 711 or at a position of the filtering box 711 other than the hollowed region, or the flow guiding opening 715 is provided on the first filtering layer. When the flow guiding opening 715 is provided on the first filtering layer, the periphery of the flow guiding opening 715 is defined by the filtering box 711, so that the cover part 720 more stably covers or is opened to expose the flow guiding opening 715.

In some embodiments, the cover part 720 may be driven by a drive assembly (not shown in the figure). The drive assembly is connected to the cover part 720, so that the cover part 720 covers or is opened to expose the flow guiding opening 715. The drive assembly may include a drive motor (not shown in the figure). The drive motor is connected to the cover part 720 to control the cover part 720 to move. Alternatively, a related structure is disposed on the cover part 720, and the cover part 720 is driven by the cover part 720 and the related structure, so that the cover part 720 covers or is opened to expose the flow guiding opening 715. In other embodiments, the cover part 720 may cover or be opened to expose the flow guiding opening 715 in other manners. This is not limited herein. The cover part 720 may be a cover plate, a flipping plate, or the like.

The cover part 720 may be mounted on the filtering box 711. The cover part 720 may be mounted on the filtering box 711 through pivoting, telescoping, hinging, or the like, to cover or be opened to expose the flow guiding opening 715.

Figure 48:
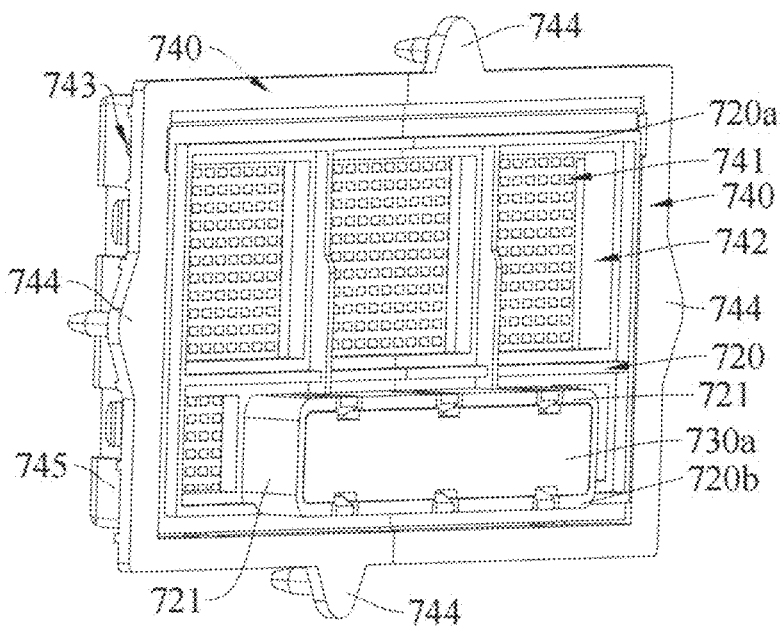
FIG. 48 is a partial schematic diagram of a filtering assembly of a cleaning device in a first motion state according to an eighth embodiment of the present disclosure.
Figure 49:
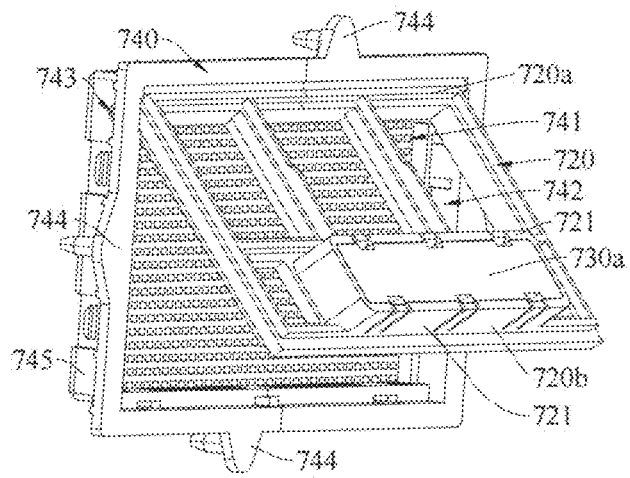
FIG. 49 is a partial schematic diagram of a filtering assembly of a cleaning device in a second motion state according to an eighth embodiment of the present disclosure.

FIG. 48 is a partial schematic diagram of the filtering assembly 710 of the cleaning device in the first motion state according to the eighth embodiment of the present disclosure. FIG. 49 is a partial schematic diagram of the filtering assembly 710 of the cleaning device in the second motion state according to the eighth embodiment of the present disclosure. In some embodiments, with reference to FIG. 40 to FIG. 43, the cover part 720 is pivotally connected to the filtering box 711. When the cover part 720 is pivotally connected to the filtering box 711, it is more labor-saving for the cover part 720 to cover or be opened to expose the flow guiding opening 715. The filtering assembly 710 further includes adjustment parts 730a and 730b mounted on the cover part 720. The adjustment parts 730a and 730b are away from a pivoting joint between the cover part 720 and the filtering box 711. Mounting positions of the adjustment parts 730a and 730b are away from the pivoting joint between the cover part 720 and the filtering box 711. The adjustment parts 730a and 730b assist the cover part 720 in covering or being opened to expose the flow guiding opening 715.

In the first motion state or the third motion state, a pivot point at which the cover part 720 rotates around the filtering box 711 is located on an action line of a sum of gravity and a buoyancy force applied to the cover part 720 and the adjustment parts 730a and 730b. In other words, a rotation moment of the cover part 720 around the filtering box 711 is zero. Therefore, the cover part 720 does not pivot and always remains in a vertical state to better cover the flow guiding opening 715.

In the second motion state, the filtering assembly 710 tilts or is flipped and inverted, and the pivot point at which the cover part 720 rotates around the filtering box 711 deviates from the action line of the sum of the gravity and the buoyancy force applied to the cover part 720 and the adjustment parts 730a and 730b. In other words, the rotation moment of the cover part 720 around the filtering box 711 is not zero, so that the cover part 720 has the rotation moment for rotating around the filtering box 711 to force the cover part 720 to rotate to open the flow guiding opening 715. The adjustment parts 730a and 730b may have different densities, provided that the adjustment parts 730a and 730b can assist the cover part 720 in moving. Specific structures of the adjustment parts 730a and 730b are not limited herein. In another second state, when the first filtering layer of the filtering assembly 710 is clogged, and the filtering assembly 710 does not obviously tilt or is not flipped and inverted, a large pressure difference between the filtering box cavity 1023 and the first cavity 714 is formed due to a pumping action of the main water pump 210. In response to the pressure difference, the cover part 720 can be opened to expose the flow guiding opening 715 to balance the pressure difference.

The adjustment parts 730a and 730b are disposed and mounted on the cover part 720, so that the cover part 720 can more quickly cover or be opened to expose the flow guiding opening 715, and the amount of water flowing out from the first cavity 714 is increased to improve the amount of water flowing into the main water pump 210. In this way, the wall climbing or slope climbing or operating performance of the cleaning device 10 is improved. In addition, the cover part 720 can be switched autonomously between the first motion state or the third motion state and the second motion state to reduce usage of the drive assembly. This reduces costs.

Specifically, the cover part 720 includes a first end 720a and a second end 720b opposite to each other. When the filtering assembly 710 is in the first motion state or the second motion state, the first end 720a is located at an uppermost end of the cover part 720, and the second end 720b is located at a lowermost end of the cover part 720. Both the first end 720a and the second end 720b may be configured to be pivotally connected to the filtering box 711. However, because the first end 720a and the second end 720b are disposed at different positions, a force applied to the cover part 720 when the first end 720a is pivotally connected to the filtering box 711 is different from a force applied to the cover part 720 when the second end 720b is pivotally connected to the filtering box 711. To close the flow guiding opening 715 in the first motion state or the third motion state and open the flow guiding opening 715 in the second motion state, when the first end 720a or the second end 720b is pivotally connected to the filtering box 711, the positions of the adjustment parts 730a and 730b need to be adjusted to assist a force in being applied to the cover part 720. Based on this, the following describes and analyzes specific results when the first end 720a or the second end 720b is pivotally connected to the filtering box 711.

Embodiment 1

In the Embodiment 1, the first end 720a is pivotally connected to the filtering box 711, and the second end 720b pivots around the first end 720a to be away from or abut against the filtering box 711 to open or close the flow guiding opening 715. In this case, the filtering assembly 710 is entirely located underwater, that is, the filtering assembly 710 is entirely located at a position under the water surface, and the gravity of the adjustment part 730a is greater than a buoyancy force.

Specifically, the first end 720a is pivotally connected to the filtering box 711, and the adjustment part 730a is away from a pivoting joint between the first end 720a and the filtering box 711. Because the gravity of the adjustment part 730a is greater than the buoyancy force, the second end 720b can pivot around the first end 720a to be away from the filtering box 711, so that the cover part 720 is opened to expose the flow guiding opening 715. Alternatively, the second end 720b can pivot around the first end 720a to abut against the filtering box 711, so that the cover part 720 covers the flow guiding opening 715. The gravity of the adjustment part 730a is much greater than the buoyancy force applied to the cover part 720 underwater. When the filtering box 711 is in the first motion state or the third motion state, a gravity center of the cover part 720 is changed by using the adjustment part 730a. In this way, a certain preload force may be applied to the cover part 720 in a gravity direction. The cover part 720 can be attached to the filtering box 711 under the preload force. When the filtering box 711 is in the second motion state, the second end 720b pivots around the first end 720b to be away from the filtering box 711 under the gravity of the cover part 720 and the gravity of the adjustment part 730a.

The first end 720a is pivotally connected to the filtering box 711, the second end 720b pivots around the first end 720a to be away from or abut against the filtering box 711, and the gravity of the adjustment part 730a is greater than the buoyancy force. This increases a speed at which the cover part 720 covers or is opened to expose the flow guiding opening 715, facilitates autonomous switching of the cover part 720 between the first motion state and the second motion state, reduces usage of the drive assembly, and reduces costs.

Optionally, in this embodiment, a density of the adjustment part 730a is greater than 1 g/cm$^3$. The density of the adjustment part 730a may be 1.1 g/cm$^3$, 2 g/cm$^3$, 3 g/cm$^3$, 3.4 g/cm$^3$, 4.3 g/cm$^3$, or the like. This is not limited herein. In other words, the density of the adjustment part 730a needs to be greater than the density of water. When the filtering box 711 is in the first motion state or the third motion state, the gravity of the cover part 720 is changed depending on the adjustment part 730a, so that the cover part 720 extends along the gravity direction, that is, the cover part 720 remains in a vertical state. In this case, the cover part 720 can cover the flow guiding opening 715. In addition, when the filtering box 711 is in the second motion state, the cover part 720 can be opened under the gravity of the cover part 720 and the gravity of the adjustment part 730a to expose the flow guiding opening 715.

The density of the adjustment part 730a is defined, so that the cover part 720 can quickly cover or be opened to expose the flow guiding opening 715. The adjustment part 730a may be a counterweight block (not shown in the figure). The counterweight block may be a metal block, an alloy block, a stone, or the like. This is not limited herein.

More specifically, a ratio of a distance between a center of the adjustment part 730a and the first end 720a to a distance between the center of the adjustment part 730a to the second end 720b is less than 1. The distance between the center of the adjustment part 730a and the first end 720a is S1. The distance between the center of the adjustment part 730a and the second end 720b is S2. The ratio of S1 to S2 is less than 1. This is not limited in this embodiment. For example, the ratio of S1 to S2 may be equal to or greater than 1. A position relationship between the adjustment part 730a and the first end 720a and a position relationship between the adjustment part 730a and the second end 720b are limited, and a position of the gravity center of the cover part 720 is adjusted, so that the preload force is applied to the cover part 720 in the first motion state or the third motion state. Therefore, the cover part 720 is tightly attached to the filtering box 711.

In some specific application scenarios, the adjustment part 730a protrudes from an inner side surface 725 of the cover part 720, and the inner surface 725 faces the first cavity 714. When the filtering box 711 is in the first motion state or the third motion state, an angle between the gravity direction and a connection line between a gravity center of the adjustment part 730a and a pivoting center of the cover part 720 is an acute angle. The adjustment part 730a may be detachably or fixedly connected to the cover part 720. The detachable connection may be clamping, inserting, or bolt fastening. That the angle between the gravity direction and the connection line between the gravity center of the adjustment part 730a and the pivoting center of the cover part 720 is the acute angle means that the gravity center of the adjustment part 730a is disposed higher than the side surface of the cover part 720 and facing the first cavity 714 to increase the preload force applied to the cover part 720 in the first motion state or the third motion state, so that the speed at which the cover part 720 covers the flow guiding opening 715 is increased. In addition, the cover part 720 more easily pivots to be away from the flow guiding opening 715, so that the speed at which the cover part 720 is opened to expose the flow guiding opening 715 is increased.

Further, the cover part 720 is provided with an adjustment part mounting portion 721. The adjustment part mounting portion 721 provides a mounting position for the adjustment part 730a. The adjustment part 730a may be disposed in the adjustment part mounting portion 721 through clamping, inserting, or bolt fastening.

Embodiment 2

Figure 50:
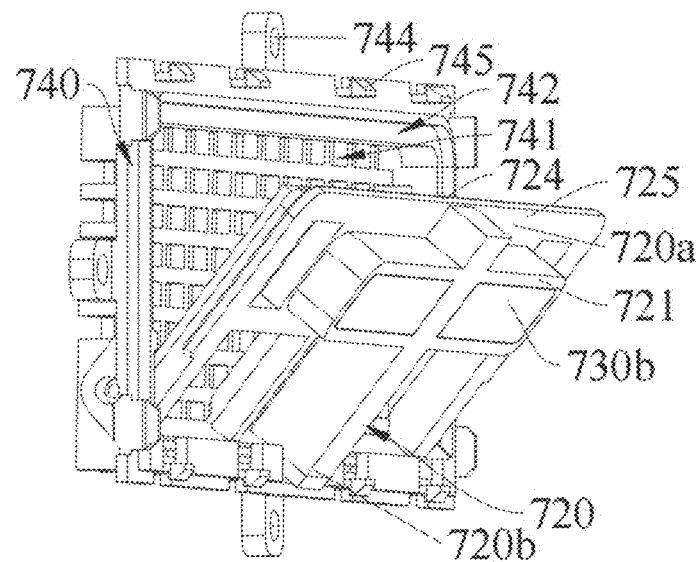
FIG. 50 is a partial schematic diagram of a filtering assembly of a cleaning device in a second motion state according to an eighth embodiment of the present disclosure.
Figure 51:
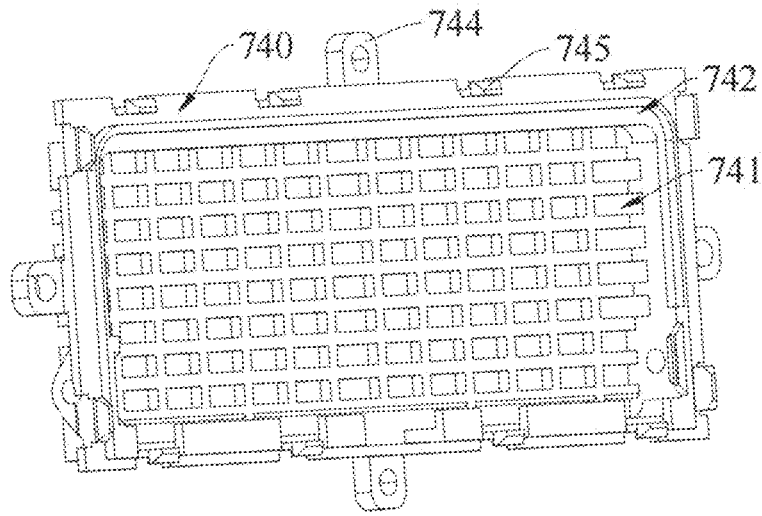
FIG. 51 is a schematic diagram of a structure of a mounting bracket in a filtering assembly of a cleaning device according to a ninth embodiment of the present disclosure.

FIG. 50 is a partial schematic diagram of the filtering assembly of the cleaning device in the second motion state according to the eighth embodiment of the present disclosure. FIG. 51 is a schematic diagram of a structure of a mounting bracket in the filtering assembly of the cleaning device according to the ninth embodiment of the present disclosure. With reference to FIG. 44 and FIG. 45, the second end 720b is pivotally connected to the filtering box 711. The first end 720a pivots around the second end 720b to be away from or abut against the filtering box 711 to open or close the flow guiding opening 715. In this case, the filtering assembly 710 is entirely located underwater, that is, the filtering assembly 710 is entirely located at a position under the water surface, and a buoyancy force applied to the adjustment part 730b is greater than the gravity of the adjustment part 730b.

Specifically, the second end 720b is pivotally connected to the filtering box 711, and the adjustment part 730b is away from a pivoting joint between the second end 720b and the filtering box 711. The first end 720a can pivot around the second end 720b to be away from the filtering box 711, so that the cover part 720 is opened to expose the flow guiding opening 715. Alternatively, the first end 720a can pivot around the second end 720b to abut against the filtering box 711. Because the buoyancy force applied to the adjustment part 730b is greater than the gravity of the adjustment part 730b, the cover part 720 can cover the flow guiding opening 715. The buoyancy force applied to the adjustment part 730b is much greater than the gravity of the cover part 720 in the water. When the filtering box 711 is in the first motion state or the third motion state, the cover part 720 extends along a direction of the buoyancy force under the buoyancy force applied to the adjustment part 730b. In this case, the cover part 720 can cover the flow guiding opening 715. When the filtering box 711 is in the second motion state, the first end 720a pivots around the second end 720b to be away from the filtering box 711 under the gravity of the cover part 720.

The second end 720b is pivotally connected to the filtering box 711, the first end 720a pivots around the second end 720b to be away from or abut against the filtering box 711, and the buoyancy force applied to the adjustment part 730b is greater than the gravity. This increases a speed at which the cover part 720 covers or is opened to expose the flow guiding opening 715, facilitates autonomous switching of the cover part 720 between the first motion state and the second motion state, reduces usage of the drive assembly, and reduces costs.

Optionally, in this embodiment, a density of the adjustment part 730b is less than 1 $g/cm^3$. The density of the adjustment part 730b may be 0.9 $g/cm^3$, 0.8 $g/cm^3$, 0.64 $g/cm^3$, 0.54 $g/cm^3$, 0.1 $g/cm^3$, or the like. This is not limited herein. In other words, the density of the adjustment part 730b needs to be less than the density of water. When the filtering box 711 is in the first motion state or the third motion state, the cover part 720 is in the vertical state under the buoyancy force applied to the adjustment part 730b, so that the cover part 720 covers the flow guiding opening 715. In addition, when the filtering box 711 is in the second motion state, the cover part 720 may be opened under the gravity of the cover part 720 to expose the flow guiding opening 715.

The density of the adjustment part 730b is defined, so that the cover part 720 can be adjusted to quickly cover the flow guiding opening 715. The adjustment part 730b may be a hollow structure, foam, plastic, an air bag, or the like. This is not limited herein. The hollow structure may be a hollow box-like structure. In this embodiment, the adjustment part 730b is foam.

More specifically, in the Embodiment 2, the filtering assembly 710 further includes a moving part 731. The cover part 720 further includes an accommodating channel 722. The accommodating channel 722 is provided between the first end 720a and the second end 720b. A center line of the accommodating channel 722 intersects a plane on which the first end 720a or the second end 720b is located. The moving part 731 is accommodated in the accommodating channel 722 and can move along the accommodating channel 722.

In a process of switching the filtering box 711 from the first motion state to the second motion state or a process of switching the filtering box 711 from the second motion state to the first motion state, the moving part 731 is accommodated in the accommodating channel 722 and can move along the accommodating channel 722. A position of the moving part 731 can be changed to change a position of the gravity center of the cover part 720, so that the cover part 720 can quickly cover or close the flow guiding opening 715. This improves the wall climbing or slope climbing or operating performance of the cleaning device 10. The moving part 731 may be a rolling part (not shown in the figure). The rolling part rolls in the accommodating channel 722, so that friction between the rolling part and the accommodating channel 722 can be reduced, and the position of the gravity center of the cover part 720 can be changed more quickly. The rolling part may be a rolling ball. A density of the rolling ball may be greater than 1 $g/cm^3$. A size of the rolling ball may be determined based on an actual situation. This is not limited herein.

The accommodating channel 722 is provided between the first end 720a and the second end 720b, and the center line of the accommodating channel 722 intersects the plane on which the first end 720a is located, that is, the accommodating channel 722 is provided close to the first end 720a.

Alternatively, the accommodating channel 722 is provided between the first end 720a and the second end 720b, and the center line of the accommodating channel 722 intersects the plane on which the second end 720b is located, that is, the accommodating channel 722 is provided close to the second end 720b. The accommodating channel 722 may be provided at any angle at the first end 720a or the second end 720b.

In some embodiments, the center line of the accommodating channel 722 vertically intersects the plane on which the first end 720a or the second end 720b is located. The center line of the accommodating channel 722 vertically intersects the plane on which the first end 720a is located, or the center line of the accommodating channel 722 vertically intersects the plane on which the second end 720b is located. When the moving part 731 moves along the accommodating channel 722, the gravity center can be changed along a direction from the first end 720a to the second end 720b, so that the gravity center of the cover part 720 can be changed regularly, which is simple and can be implemented easily.

In some embodiments, the cover part 720 includes the inner side surface 725 facing the first cavity 714. The accommodating channel 722 extends from the second end 720b to the first end 720a along a direction close to the inner side surface 725. In other words, the accommodating channel 722 tilts. When the filtering box 711 is in the second motion state, the moving part 731 moves, under the gravity, from the second end 720b to the first end 720a along the accommodating channel 722. In this case, the gravity center of the cover part 720 moves forward, and the gravity of the cover part 720 is greater than the buoyancy force applied to the cover part 720, so that the cover part 720 is opened to expose the flow guiding opening 715.

A tilting direction of the accommodating channel 722 is changed, so that the moving part 731 can conveniently move, and the gravity center of the cover part 720 can be quickly changed. In this way, the cover part 720 can be quickly opened to expose the flow guiding opening 715 or quickly cover the flow guiding opening 715.

In the Embodiment 1, the Embodiment 2, or any other specific embodiments, the cover part 720 may be directly pivotally connected to a side wall of the filtering box 711. However, to implement stable and firm mounting, the cover part 720 may be indirectly pivotally connected to the side wall of the filtering box 711 by using other mounting parts, such as a mounting bracket 740.

In some embodiments, as shown in FIG. 40 to FIG. 51, the mounting bracket 740 is disposed on the side wall of the filtering box 711. At least a part of the mounting bracket 740 covers the flow guiding opening 715. The part of the mounting bracket 740 covers the flow guiding opening 715, and the part is provided with a plurality of grill holes 741. The plurality of grill holes 741 communicate with the flow guiding opening 715. The cover part 720 is movably mounted on the mounting bracket 740.

Specifically, the mounting bracket 740 is detachably connected to or fixed to the side wall of the filtering box 711. In a process of mounting the mounting bracket 740 to the side wall of the filtering box 711, at least a part of the mounting bracket 740 covers the flow guiding opening 715. The part of the mounting bracket 740 covers the flow guiding opening 715, and the part is provided with the plurality of grill holes 741. The plurality of grill holes 741 communicate with the flow guiding opening 715. At least a part of the water in the first cavity 714 flows out through the flow guiding opening 715 and the grill holes 741 sequentially. The plurality of grill holes 741 are provided on the mounting bracket 740 to prevent large debris (leaves or the like) from entering the main water pump 210 when the cover part 720 is opened, so that the main water pump impeller 212 in the main water pump 210 is prevented from being damaged. Sizes and shapes of the grill holes 741 are not limited, provided that an actual use requirement can be met. In this embodiment, each of the plurality of grille holes 741 is square.

Further, the mounting bracket 740 is detachably mounted to the side wall of the filtering box 711. The detachable connection may be clamping, bolt fastening, or inserting. In this embodiment, the periphery of the mounting bracket 740 is provided with a plurality of mounting portions 744. Each of the plurality of mounting portions 744 is provided with a mounting hole (not shown in the figure). A fixed part extends through the mounting hole to be fixed to the side wall of the filtering box 711. In addition, a plurality of mounting buckles 745 are provided on the periphery of the mounting bracket 740. The plurality of mounting buckles 745 are inserted into the flow guiding opening 715 to be clamped to a side wall of the flow guiding opening 715. The mounting portions 744 cooperate with the mounting buckles 745, so that the mounting bracket 740 is mounted to the side wall of the filtering box 711 more stably. This improves stability of the filtering assembly 710. Positions and quantities of the mounting bracket 740 and the mounting buckles 745 are determined based on an actual situation. This is not limited herein.

In addition, when the filtering box 711 is provided with the mounting bracket 740, the cover part 720 may be movably mounted on the mounting bracket 740. The movable connection may be a rotatable connection. The cover part 720 is rotatably connected to the mounting bracket 740.

In some specific embodiments, a side surface of the mounting bracket 740 faces the first cavity 714, and the side surface is recessed to form the accommodating cavity 742. A side wall of the accommodating cavity 742 is provided with a pivoting portion mounting groove 743. The cover part 720 is movably accommodated in the accommodating cavity 742. The cover part 720 is provided with a pivoting portion 723 protruding from the cover part 720. A stop position-limiting protrusion is provided below the pivoting portion 723. The pivoting portion 723 is pivotally mounted in the pivoting portion mounting groove 743. The stop position-limiting protrusion moves with the cover member 720 to stop on the side wall.

The accommodating cavity 742 is recessedly provided in the side surface of the mounting bracket 740, and the side surface faces the first cavity 714. The accommodating cavity 742 can be configured to accommodate the cover part 720. The accommodating cavity 742 communicates with the pivoting portion mounting groove 743. The pivoting portion 723 is fixedly or detachably mounted to the cover part 720. When the cover part 720 is movably mounted in the accommodating cavity 742, the pivoting portion 723 is pivotally mounted in the pivoting portion mounting groove 743, so that the cover part 720 rotates. The stop position-limiting protrusion is provided below the pivoting portion 723. The pivoting portion 723 and the stop position-limiting protrusion are detachably or fixedly connected to each other. The stop position-limiting protrusion has a stopping and position-limiting function. When the pivoting portion 723 pivots, the stop position-limiting protrusion also rotates with the pivoting portion 723. When the cover part 720 rotates to reach a certain angle, the stop position-limiting protrusion stops on the side wall of the accommodating cavity 742, so that the cover part 720 is stopped from rotating, and a rotation angle of the cover part 720 is limited.

The accommodating cavity 742, the pivoting portion mounting groove 743, the pivoting portion 723, and stop position-limiting protrusion cooperate with each other to limit the rotation angle of the cover part 720, so that the cover part 720 is prevented from being adsorbed to the side wall of the filtering box 711 due to the excessively large rotation angle of the cover part 720, and therefore, covering performance of the cover part 720 is not affected.

When the filtering box 711 is in the second motion state, an included angle between the cover part 720 and the filtering box 711 can be limited by the stop position-limiting protrusion. The included angle between the cover part 720 and the filtering box 711 is greater than or equal to 30° and less than or equal to 100°. The included angle between the cover part 720 and the filtering box 711 may be 30°, 43°, 54°, 65°, 76°, 87°, 90°, 98°, 100°, or the like. This is not limited herein. A range of the included angle between the cover part 720 and the filtering box 711 is limited, so that at least a part of the water in the first cavity 714 can flow out through the flow guiding opening 715 to increase the amount of water flowing out of the filtering box 711, and a risk that the cover part 720 is adsorbed onto the side wall of the filtering box 711 is reduced. In this embodiment, when the filtering box 711 is in the second motion state, the cover part 720 is disposed vertically relative to the filtering box 711 under the stop position-limiting protrusion, that is, the included angle between the cover part 720 and the filtering box 711 is 90°.

Optionally, in other embodiments, when the cover part 720 pivots in the filtering box 711, structures, such as the pivoting portion mounting groove 743, the pivoting portion 723, and the stop position-limiting protrusion between the cover part 720 and the mounting bracket 740, may also be disposed between the cover part 720 and the filtering box 711. Details are not described herein again.

Optionally, a lap portion 724 extends from an edge of the cover part 720. The lap portion 724 abuts against the inner side surface 725 of the mounting bracket 740 when the cover part 720 is accommodated in the accommodating cavity 742. The lap portion 724 is fixedly or detachably connected to the cover part 720. The lap portion 724 is disposed at the edge of the cover part 720. When the filtering box 711 is in the first motion state or the third motion state, the lap portion 724 of the cover part 720 may abut against the inner side surface 725 of the mounting bracket 740 when the cover part 720 is accommodated in the accommodating cavity 742.

In the above manner, sealing performance of the cover part 720 covering the flow guiding opening 715 is improved, so that water flowing into the filtering box 711 through a gap between the cover part 720 and the mounting bracket 740 is reduced, and therefore, cleaning efficiency of the cleaning device 10 is not affected.

Figure 52:
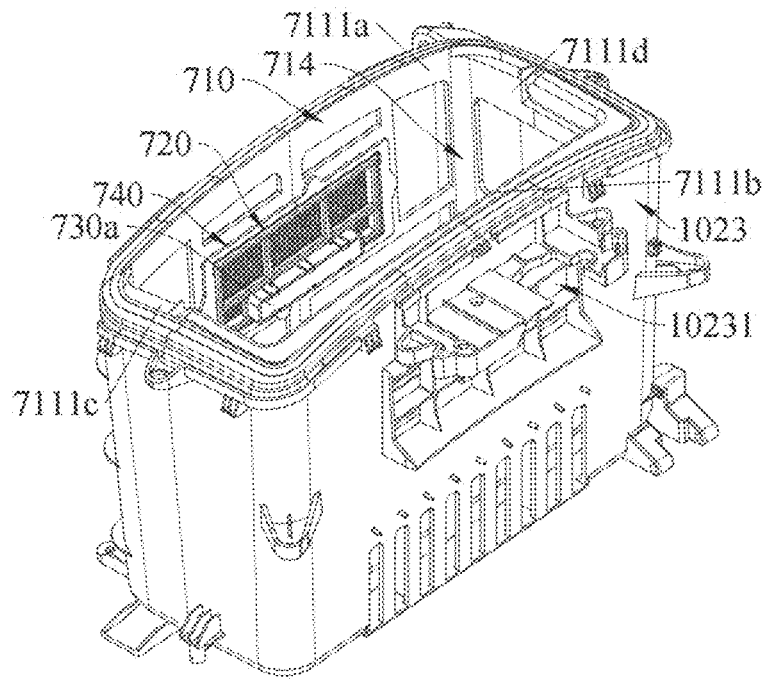
FIG. 52 is a partial schematic diagram of a cleaning device according to an eighth embodiment of the present disclosure.
Figure 53:
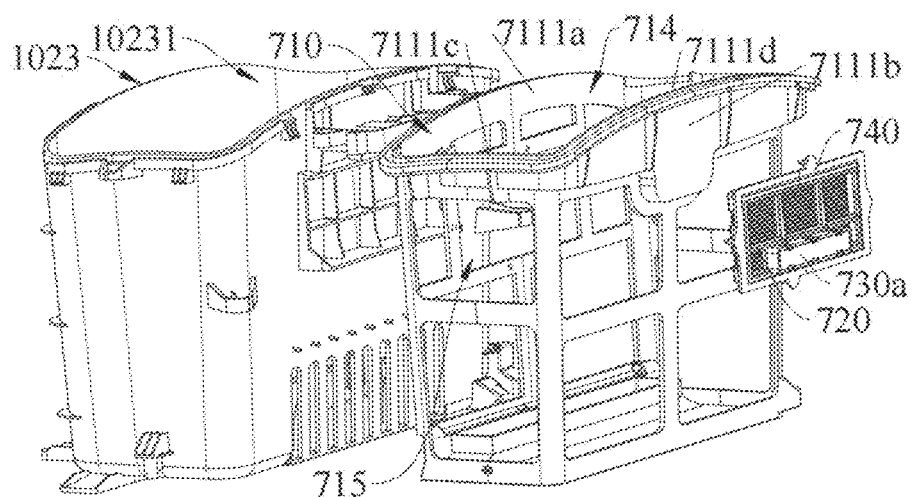
FIG. 53 is a partial schematic exploded diagram of a cleaning device according to an eighth embodiment of the present disclosure.

FIG. 52 is a partial schematic diagram of a cleaning device according to the eighth embodiment of the present disclosure. FIG. 53 is a partial schematic exploded diagram of the cleaning device according to the eighth embodiment of the present disclosure. With reference to FIG. 40 to FIG. 47, in some actual application scenarios, the filtering box 711 of the filtering assembly 710 in embodiments of the present disclosure is substantially square. The filtering box 711 has at least two configurations. In the first configuration, the filtering box 711 has an opening. The filtering box 711 includes a first side surface 7111a, a second side surface 7111b, a third side surface 7111c, and a fourth side surface 7111d. The first side surface 7111a, the second side surface 7111b, the third side surface 7111c, and the fourth side surface 7111d are jointly enclosed to form the opening. The first side surface 7111a and the second side surface 7111b are disposed opposite to each other. The third side surface 7111c and the fourth side surface 7111d are disposed opposite to each other. The first side surface 7111a is close to a front of a moving direction of the cleaning device 10. The flow guiding opening 715 may be provided on at least one of the first side surface 7111a, the second side surface 7111b, the third side surface 7111c, and the fourth side surface 7111d. At least one of the first side surface 7111a, the second side surface 7111b, the third side surface 7111c, and the fourth side surface 7111d may be provided with one, two, or more than two flow guiding openings 715. This is not limited herein. In other words, the cover part 720 may be pivotally connected to at least one of the first side surface 7111a, the second side surface 7111b, the third side surface 7111c, and the fourth side surface 7111d. The cover part 720 covers or is opened to expose a corresponding flow guiding opening 715.

When the flow guiding opening 715 is provided on the first side surface 7111a, the cover part 720 is disposed on the first side surface 7111a and pivots towards the interior of the filtering box 711. When the flow guiding opening 715 is provided on both the second side surface 7111b and the third side surface 7111c, the cover parts 720 on the second side surface 7111b and the third side surface 7111c are provided with the pivoting portions 723. The pivoting portion 723 is vertically disposed on the mounting bracket 740 or the side wall of the filtering box 711. The cover part 720 may pivot towards the interior or the exterior of the filtering box 711. Certainly, in other embodiments, the cover part 720 may be disposed in other manners. This is not limited herein. When the flow guiding opening 715 is provided on the fourth side surface 7111d, the cover part 720 may be disposed on the fourth side surface 7111d and pivot towards the periphery of the filtering box 711.

In the second configuration, the filtering box 711 has no opening. The filtering box 711 includes a first side surface 7111a, a second side surface 7111b, a third side surface 7111c, a fourth side surface 7111d, and a fifth side surface 7111e. The fifth side surface 7111e covers an opening formed by enclosure of the first side surface 7111a, the second side surface 7111b, the third side surface 7111c, and the fourth side surface 7111d. The fifth side surface 7111e is fixedly or detachably connected to at least one of the first side surface 7111a, the second side surface 7111b, the third side surface 7111c, and the fourth side surface 7111d. The first side surface 7111a, the second side surface 7111b, the third side surface 7111c, the fourth side surface 7111d, and the fifth side surface 7111e are disposed to ensure the filtering box 711 to be in a closed state. The flow guiding opening 715 may be provided on at least one of the first side surface 7111a, the second side surface 7111b, the third side surface 7111c, the fourth side surface 7111d, and the fifth side surface 7111e. In other words, the cover part 720 may be pivotally connected to at least one of the first side surface 7111a, the second side surface 7111b, the third side surface 7111c, the fourth side surface 7111d, and the fifth side surface 7111e. The cover part 720 covers or is opened to expose a corresponding flow guiding opening 715.

The cover part 720 may be disposed on the fifth side surface 7111e when the flow guiding opening 715 is provided on the fifth side surface 7111e. Alternatively, the cover part 720 may be disposed at a position on the cleaning device 10 and close to the fifth side surface 7111e. In other words, the cover part 720 may pivotally rotate towards the interior or the exterior of the filtering box 711. Therefore, the position at which the cover part 720 is disposed is related to a structure of the filtering box 711, the position of the flow guiding opening 715, and the structure of the cleaning device 10. A structure of the cover part 720 may be determined and finely adjusted based on an actual situation, provided that the cover part 720 can cover or be opened to expose the flow guiding opening 715. In this way, a suction force applied to the cleaning device 10 is improved, so that the wall climbing or slope climbing or operating performance of the cleaning device 10 is improved. This improves user experience.

When the filtering assembly 710 is only provided with one flow guiding opening 715, the cover part 720 having the first configuration and the adjustment part 730a whose density is greater than 1 g/cm³ may be disposed at the flow guiding opening 715, or the cover part 720 having the second configuration, the adjustment part 730b whose density is less than 1 g/cm³, and the moving part 731 may be disposed at the flow guiding opening 715.

When the filtering assembly 710 is provided with two flow guiding openings 715, the cover part 720 having the first configuration and the adjustment part 730a whose density is greater than 1 g/cm³ may be disposed at each of the two flow guiding openings 715, or the cover part 720 having the second configuration, the adjustment part 730b whose density is less than 1 g/cm³, and the moving part 731 may be disposed at each of the two flow guiding openings 715, or the cover part 720 having the first configuration and the adjustment part 730a whose density is greater than 1 g/cm³ may be disposed at one of the two flow guiding openings 715, and the cover part 720 having the second configuration, the adjustment part 730b whose density is less than 1 g/cm³, and the moving part 731 may be disposed at the other one of the two flow guiding openings 715.

When the filtering assembly 710 is provided with three or more flow guiding openings 715, the type of the cover part 720 and the type of the adjustment part 730b disposed at each flow guiding opening 715 may be determined based on an actual situation. Details are not described herein again.

In addition, the shape of the flow guiding opening 715 may be regular or irregular. The regular shape may be a regular polygon, a circle, or the like. The irregular shape may be formed by an arc and a folded line. A shape of the cover part 720 may be the same as or different from that of the flow guiding opening 715. When the shape of the cover part 720 is different from the shape of the flow guiding opening 715, and the filtering box 711 is in the first motion state or the third motion state, the specific shape of the cover part 720 is not limited, provided that the cover part 720 can cover the flow guiding opening 715.

It may be understood that the cover part 720 of the filtering assembly 710 in this embodiment of the present disclosure is further provided with a second filtering layer. When the cover part 720 is not opened, the second filtering layer filters debris to prevent normal operation of the cleaning device 10 from being affected by the cover part 720. A specific position and a form of the second filtering layer are not limited herein, provided that a position at which the second filtering layer is provided avoids the positions at which the adjustment parts 730a and 730b are disposed.

The cover part 720 may be movably connected to the cleaning device 10. For example, the cover part 720 may be mounted on a component of the cleaning device 10 other than the filtering box 711 through pivoting, telescoping, hinging, or the like. The cover part 720 is configured to cover or be opened to expose the flow guiding opening 715.

When the cover part 720 is pivotally connected to the cleaning device 10, a structure of the cover part 720 is the same as the structure of the above cover part 720 that is pivotally connected to the filtering box 711. Details are not described herein again. In other words, the cover part 720 may be disposed at various positions. A specific position of the cover part 720 is determined based on an actual situation.

Figure 54:
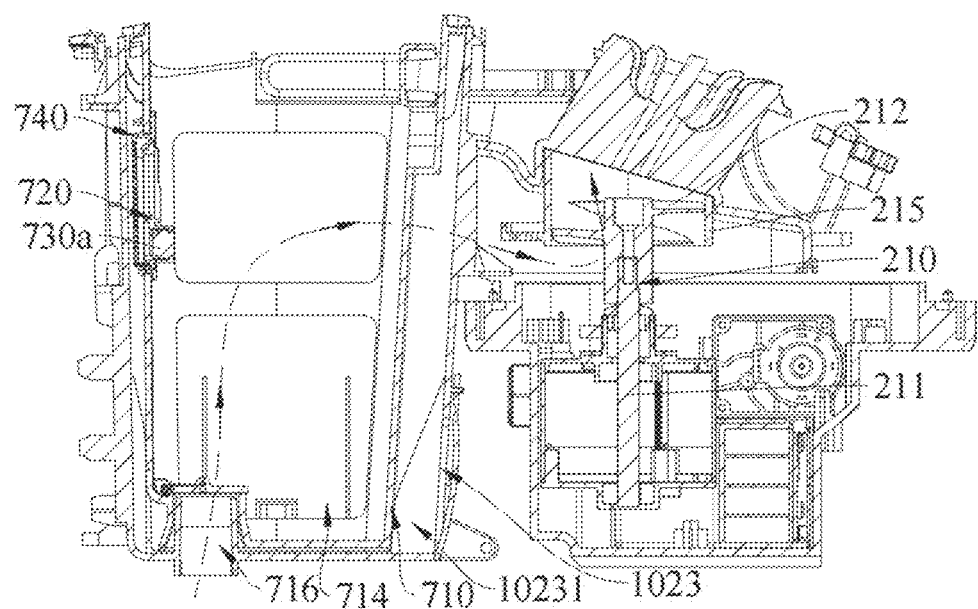
FIG. 54 is a partial schematic cross-sectional diagram of a cleaning device according to an eighth embodiment of the present disclosure.

FIG. 54 is a partial schematic cross-sectional diagram of the cleaning device according to the eighth embodiment of the present disclosure. With reference to FIG. 40 to FIG. 47, FIG. 52, and FIG. 53, in some embodiments, the cleaning device 10 includes a filtering assembly 710. The filtering assembly 710 is the filtering assembly 710 described in the above embodiments. Details are not described herein again. The filtering assembly 710 is disposed, so that the impact on the cleaning effect of the cleaning device 10 can be reduced, and the amount of water flowing into the main water pump 210 can be increased. In this way, the suction force applied to the cleaning device 10 is increased, so that wall climbing or slope climbing or operating performance of the cleaning device 10 is improved. This improves user experience.

In an embodiment, the filtering box water inlet portion 716 is formed in the filtering box 711. The filtering box water inlet portion 716 communicates with the first cavity 714. In other words, water flows into the first cavity 714 through the filtering box water inlet portion 716. The cleaning device 10 further includes the main water pump 210. The main water pump 210 is disposed outside the filtering box 711. The main water pump 210 communicates with the first cavity 714 of the filtering box 711. The main water pump 210 provides a driving force to drive the water to flow and guide a flow direction of the water.

When the filtering assembly 710 is in the first motion state or the third motion state, the cover part 720 covers the flow guiding opening 715. The main water pump 210 is configured to guide the water to flow into the main water pump 210 sequentially through the filtering box water inlet portion 716, the first cavity 714, and the first filtering layer. In other words, the main water pump 210 is configured to guide the water in the pool to flow into the first cavity 714 through the filtering box water inlet portion 716, and the water in the first cavity 714 flows into the main water pump 210 through the first filtering layer on the filtering box 711.

When the filtering assembly 710 is in the second motion state, the cover part 720 is opened to expose the flow guiding opening 715. The main water pump 210 is configured to guide at least a part of the water to flow into the main water pump 210 sequentially through the filtering box water inlet portion 716, the first cavity 714, and the flow guiding opening 715. In other words, the main water pump 210 is configured to guide the water in the pool to flow into the first cavity 714 through the filtering box water inlet portion 716, at least a part of the water in the first cavity 714 directly flows into the main water pump 210 through the flow guiding opening 715, and another part of the water flows into the main water pump 210 through the first filtering layer.

Therefore, the main water pump 210 provides a driving force to drive the water to flow and limits the flow direction of the water, and a requirement for the amount of water flowing into the main water pump 210 can always be met. In this way, stable wall climbing or slope climbing or operating performance of the cleaning device 10 can be maintained.

In an embodiment, the cleaning device 10 includes the filtering box cavity 1023. A second cavity 10231 is formed in the filtering box cavity 1023. The filtering assembly 710 is disposed inside the second cavity 10231. The second cavity 10231 communicates with the first cavity 714 of the filtering box 711 in the filtering assembly 710. For example, the second cavity 10231 may communicate with the first cavity 714 through the first filtering layer and the flow guiding opening 715. The main water pump 210 is disposed outside the filtering box cavity 1023. The filtering box water inlet portion 716 is formed between the filtering box 711 and the filtering box cavity 1023. The filtering box water inlet portion 716 communicates with the first cavity 714. In other words, water flows into the first cavity 714 through the filtering box water inlet portion 716. A position and a disposition manner of the filtering box water inlet portion 716 are not limited herein, provided that the water can directly enter the first cavity 714 through the filtering box water inlet portion 716.

When the cleaning device 10 is placed in the pool, the main water pump 210 is configured to guide water in the pool to flow into the first cavity 714 through the filtering box water inlet portion 716, and then, the water flows into the second cavity 10231 after being filtered by the first filtering layer, and the water flows into the main water pump 210 through the second cavity 10231.

When the filtering assembly 710 is in the first motion state or the third motion state, the cover part 720 covers the flow guiding opening 715. The main water pump 210 is configured to guide water to flow into the main water pump 210 sequentially through the filtering box water inlet portion 716, the first cavity 714, the first filtering layer, and the second cavity 10231. In other words, the main water pump 210 is configured to guide the water in the pool to flow into the first cavity 714 through the filtering box water inlet portion 716, the water in the first cavity 714 flows into the second cavity 10231 through the first filtering layer on the filtering box 711, and then, the water flows into the main water pump 210 through the second cavity 10231. The first motion state or the third motion state is a state of the filtering box 711 when the cleaning device 10 moves in a direction perpendicular to the gravity direction, or the first motion state or the third motion state is a state in which the cleaning device 10 is disposed at a certain tilting angle, and the cover part 720 cannot be opened under the gravity of the cover part 720 or an external force to expose the flow guiding opening 715.

When the filtering box 711 of the filtering assembly 710 is in the second motion state, the cover part 720 is opened to expose the flow guiding opening 715. The main water pump 210 is configured to guide at least a part of the water to flow into the main water pump 210 sequentially through the filtering box water inlet portion 716, the first cavity 714, the flow guiding opening 715, and the second cavity 10231. In other words, the main water pump 210 is configured to guide the water in the pool to flow into the first cavity 714 through the filtering box water inlet portion 716, at least a part of the water in the first cavity 714 directly flows into the second cavity 10231 through the flow guiding opening 715, another part of the water flows into the second cavity 10231 through the first filtering layer, and then, the water flows into the main water pump 210 through the second cavity 10231.

The filtering box cavity 1023 is disposed in the cleaning device 10, so that the water can be concentrated in the second cavity 10231 and concentratedly flow into the main water pump 210 to improve the requirement for the amount of water flowing into the main water pump 210. In this way, the wall climbing or slope climbing or operating performance of the cleaning device 10 is further improved. The filtering box cavity 1023 is provided with a water outlet (not shown in the figure). The water outlet communicates with the main water pump 210. A side wall of the filtering box cavity 1023 is close to the main water pump 210, and the side wall is provided with the water outlet, or the water outlet may be provided at other positions on the filtering box cavity 1023. This is not limited herein.

In an embodiment, the cover part 720 is pivotally connected to the filtering box cavity 1023. A structure of the cover part 720 pivotally connected to the filtering box cavity 1023 is the same as a structure of the cover part 720 pivotally connected to the filtering box 711. Details are not described herein again. The cover part 720 is disposed on the filtering box cavity 1023 to reduce a resistance applied by the cover part 720 against the water flow, so that the water can flow out of the filtering box 711 more smoothly. For example, the cover part 720 may be disposed on the side wall of the filtering box cavity 1023 to cover or be opened to expose the flow guiding opening 715.

In a process in which the cover part 720 is opened to expose the flow guiding opening 715, when the cleaning device 10 is switched from the second state to the first state, the cover part 720 can be automatically reset due to the structure thereof, so that the cover part 720 covers the flow guiding opening 715. Certainly, a reset assembly may be disposed between the cover part 720 and the filtering box 711 or between the cover part 720 and the filtering box cavity 1023. Resetting can be implemented quickly by the reset assembly. The reset assembly may be a torsion spring, a spring, a tension spring, or the like. This is not limited herein.

In an embodiment, the cleaning device 10 further includes a flipping cover (not shown in the figure). The filtering box cavity 1023 has an opening (not shown in the figure). The flipping cover covers the opening to seal the filtering box cavity 1023. The flipping cover is disposed on the top of the filtering box cavity 1023. The flow guiding opening 715 is provided at the top of the filtering box 711. In this case, the filtering box 711 is partially hollowed and is provided with the flow guiding opening 715. The cover part 720 is movably connected to the flipping cover to cover or be opened to expose the flow guiding opening 715 of the filtering box 711. In other words, the cover part 720 may be disposed on the flipping cover in addition to the filtering box cavity 1023.

In other embodiments, when the top of the filtering box 711 includes the fifth side surface 7111*e*, the cover part 720 may be movably mounted on a top cover housing (not shown in the figure) of the cleaning device 10. The top cover housing is an outermost housing of the cleaning device 10. When the top cover housing is opened, the filtering assembly 710 can be removed from the cleaning device 10 and may be cleaned or replaced. The cover part 720 covers or is opened to expose the flow guiding opening 715 on the fifth side surface 7111*e*.

In some embodiments, when the top of the filtering box 711 includes the fifth side surface 7111*e*, the flow guiding opening 715 is formed on the fifth side surface 7111*e*. The cover part 720 may be movably mounted on the fifth side surface 7111*e* to cover or be opened to expose the flow guiding opening 715 on the fifth side surface 7111*e*.

In an embodiment, the cover part 720 is further provided with a second filtering layer (not shown in the figure). The second filtering layer communicates with the first cavity 714 and the second cavity 10231. The second filtering layer is configured to perform filtering. When the filtering assembly 710 is in the first motion state or the third motion state, the cover part 720 covers the flow guiding opening 715. The water in the pool can flow into the first cavity 714 through the filtering box water inlet portion 716. The water in the first cavity 714 flows into the second cavity 10231 through the first filtering layer on the filtering box 711 and the second filtering layer on the cover part 720. Then, the water flows into the main water pump 210 through the second cavity 10231. The second filtering layer is disposed on the cover part 720, so that the cleaning efficiency of the cleaning device 10 can be improved. A structure of the second filtering layer may be the same as or different from the structure of the first filtering layer. This is not limited herein.

In an embodiment, the main water pump 210 includes a main water pump impeller casing 215. An area of the flow guiding opening 715 of the filtering assembly 710 is larger than a cross-sectional area, for water entering, of the main water pump impeller casing 215. Because the area of the flow guiding opening 715 is larger than the cross-sectional area, for water entering, of the main water pump impeller casing 215, an area for water flowing out of the filtering assembly 710 is increased. In this way, the amount of water flowing out of the filtering assembly 710 is larger than the amount of water flowing into the main water pump 210 to ensure that the requirement for the amount of water flowing into the main water pump 210 is always met when the cleaning device climbs the wall or the slope or the first filtering layer is clogged, so that the stable wall climbing or slope climbing or operating performance is maintained.

The main water pump 210 further includes a main water pump impeller 212 and a main water pump motor 211. An output end of the main water pump motor 211 is connected to the main water pump impeller 212. The main water pump motor 211 drives the main water pump impeller 212 to rotate inside the main water pump impeller casing 215. The main water pump motor 211 in the main water pump 210 drives the main water pump impeller 212 to rotate, so that the water can flow into the main water pump impeller 212. In this way, a speed at which water flows out of the filtering assembly 710 is increased, and the cleaning efficiency of the cleaning device 10 for sewage in the pool is improved.

Because a size of garbage on the liquid surface 30 is larger than a size of garbage under the liquid surface 30, a size of the filtering mesh hole of the first filtering layer of the filtering assembly when the cleaning device 10 performs water surface cleaning is larger than a size of the filtering mesh hole of the first filtering layer of the filtering assembly when the cleaning device 10 performs underwater cleaning. In some embodiments, the filtering box 711 may be provided with two or more first filtering layers. The cover part 720 covers or is opened to expose the flow guiding opening 715 on the filtering assembly 710. When the cleaning device 10 performs underwater cleaning, the cover part 720 covers the flow guiding opening 715. The plurality of filtering layers are stacked to perform filtering, so that a filtering efficiency for underwater cleaning is increased. When the cleaning device 10 performs water surface cleaning, the cover part 720 is at least partially opened to expose the flow guiding opening 715, and the flow guiding opening 715 is used, so that a quantity of first filtering layers is reduced. In this way, large garbage on the liquid surface 30 can be filtered easily, and the large garbage is less likely to block the plurality of first filtering layers. A structure, a disposition manner, and a position of the cover part 720 are the same as those described above. Details are not described herein again.

Based on the above description, the cleaning device 10 can implement cleaning in the pool in various situations, including bottom cleaning, wall cleaning, water surface cleaning, waterline cleaning, and water quality processing at a set depth in the pool.

During bottom cleaning and wall cleaning, a dust-loaded water flow is sucked through the first water inlet 1031 at the bottom of the cleaning device 10, enters the filtering mechanism through the filtering box opening for underwater cleaning 7162 of the filtering mechanism to be filtered, and then is drained from the cleaning device body through the liquid outlet portion 104. In addition, at least one first cleaning part 410 located at the bottom of the cleaning device 10 brushes the bottom and the wall of the pool. During waterline cleaning, the at least one first cleaning part 410 of the cleaning device 10 brushes the waterline along the side wall. In this way, stains adhering to the waterline are brushed off from the waterline and fall to the bottom of the pool or are partially drawn into the filtering mechanism of the cleaning device 10 through the first water inlet 1031.

During water surface cleaning, at least one filtering box opening for water surface cleaning 7161 (may be the same as the filtering box opening for underwater cleaning 7162) is provided on the cleaning device 10, so that garbage floating on the water surface is drawn into the filtering mechanism of the cleaning device 10. In addition, due to the impact of wind on the water surface, garbage may be blown to the wall or a corner of the pool. Due to the limitation of the structure, when the cleaning device 10 performs cleaning, the garbage at the waterline of the wall or the corner of the pool may be not cleaned. In this case, a nozzle may be disposed on the cleaning device 10 to blow the above garbage away from the waterline of the wall or the corner of the pool to a cleaning range of the filtering box opening for water surface cleaning 7161. This improves the cleaning efficiency.

If the filtering mechanism has a filtering mesh structure, the filtering mechanism may be clogged by garbage, floating algae, and the like in the water during operation. Consequently, water cannot flow smoothly. This affects the amount of water drained from the cleaning device 10. When the cleaning device 10 operates at the bottom or on the wall of the pool, the drained water provides a counter pushing force for the cleaning device 10 to be attached to the wall. Especially when the cleaning device 10 operates on the side wall of the pool, the cleaning device 10 is likely to tumble if the counter pushing force is not sufficient. Therefore, a second water flow path may be provided in the filtering mechanism to cope with clogging of the filtering mesh structure in the filtering mechanism, so that the cleaning device 10 can be still stably attached to the side wall and operate.

In some cases, because the first cleaning part 410 is limited by the structure of the cleaning device 10 and the effective cleaning range of the cleaning device 10, some specific regions are difficult to clean, such as a certain range of a joint between the bottom and the wall of the pool, a certain range of a joint between walls of the pool, and the like. In this case, at least one rotary brush 431 may be disposed on the cleaning device 10 to clean the above specific regions. To ensure that during the normal operation of the cleaning device 10, the rotary brush 431 does not affect the operation of the cleaning device 10, the rotary brush 431 may be configured in a telescopic manner. For example, the rotary brush 431 may be controlled to extend and perform cleaning when needed, and when cleaning is completed, the rotary brush 431 may be controlled to be retracted into the cleaning device 10.

The above description describes only implementations of the present disclosure and is not intended to limit the scope of the present disclosure. Any equivalent structure or equivalent process transformation performed based on the contents of the specification and the accompanying drawings of the present disclosure or applied directly or indirectly in other related technical fields shall fall within the protection scope of the present disclosure.

What is claimed is:

1. A cleaning device, comprising a cleaning device body, wherein the cleaning device body comprises:
   a liquid inlet portion, comprising at least a first water inlet and a second water inlet;
   a liquid outlet portion, comprising at least a first water outlet;
   a filtering mechanism, comprising at least a filtering box, wherein the filtering box comprises at least a filtering box opening for underwater cleaning, a filtering box opening for water surface cleaning, and a filtering box outlet, the filtering box opening for underwater cleaning is in fluid communication with the first water inlet, the filtering box opening for water surface cleaning is in fluid communication with the second water inlet, and the filtering box outlet is in fluid communication with the first water outlet; and
   a drive mechanism configured to generate a suction force, so that a first water flow path is formed by using at least the first water inlet, the filtering mechanism, and the liquid outlet portion,
   wherein the filtering box further comprises at least one filtering box roller brush assembly and at least one drive gear, the at least one filtering box roller brush assembly is disposed at the filtering box opening for water surface cleaning, and the at least one drive gear is configured to drive the at least one filtering box roller brush assembly to rotate; and the cleaning device body further comprises:
   a power mechanism, wherein the power mechanism comprises at least a motor, and the motor is in transmission connection to the at least one drive gear; and
   when the filtering box is removed from the cleaning device body, the at least one filtering box roller brush assembly and the at least one drive gear are removed simultaneously from the cleaning device body with the filtering box; and
   a mode switching member, comprising:
      a buoyancy cavity, configured to accommodate at least gas;
      an air inlet, configured for gas to enter the buoyancy cavity; and
      a buoyancy adjustment part, configured to drive the gas to enter the buoyancy cavity through the air inlet,
      wherein the mode switching member is configured for the cleaning device to be switched from a first motion state to a third motion state via a second motion state, wherein the cleaning device performs underwater cleaning in the first motion state, the cleaning device cleans a pool wall or a waterline in the second motion state, the cleaning device performs water surface cleaning in the third motion state, and a posture of the cleaning device in the first motion state is substantially identical to a posture of the cleaning device in the third motion state.

2. The cleaning device according to claim 1, wherein the at least one filtering box roller brush assembly is connected to the at least one drive gear through a connection shaft.

3. The cleaning device according to claim 1, wherein the at least one filtering box roller brush assembly is disposed inside or outside the filtering box opening for water surface cleaning.

4. The cleaning device according to claim 1, wherein the cleaning device further comprises a first cleaning part and a wheel, the power mechanism comprises at least a movement drive part, the movement drive part is the motor, and the motor drives the wheel, the first cleaning part, and the at least one drive gear to rotate.

5. The cleaning device according to claim 4, wherein the wheel comprises at least a first wheel and a second wheel, the first wheel is in transmission connection to the second wheel through a track, the movement drive part drives the first wheel, and the second wheel drives the first cleaning part and the at least one drive gear to rotate.

6. The cleaning device according to claim 4, wherein the first cleaning part and the at least one filtering box roller brush assembly rotate in a same direction.

7. The cleaning device according to claim 1, further comprising a wheel, wherein the power mechanism comprises at least a movement drive part and a first power drive part, the first power drive part is the motor, and the movement drive part drives the wheel to rotate, to drive the cleaning device to move.

8. The cleaning device according to claim 7, further comprising a first cleaning part, wherein
   the movement drive part further drives the first cleaning part to rotate; or
   the power mechanism further comprises a second power drive part, and the second power drive part drives the first cleaning part to rotate.

9. The cleaning device according to claim 5, wherein the cleaning device comprises two first wheels and two second wheels.

10. The cleaning device according to claim 9, wherein the cleaning device comprises two movement drive parts, and the two movement drive parts are respectively connected to the two first wheels.

11. The cleaning device according to claim 1, wherein the first water inlet is located at a bottom of the cleaning device body, and when the cleaning device performs underwater cleaning, the first water inlet faces a to-be-cleaned surface; and the second water inlet is provided on a side surface of a front part of the cleaning device body, and when the cleaning device performs water surface cleaning, the second water inlet is at least partially exposed at a liquid surface.

12. The cleaning device according to claim 1, wherein the buoyancy cavity is made of a flexible material or a rigid material.

13. The cleaning device according to claim 12, wherein there are one, two, or more buoyancy cavities.

14. The cleaning device according to claim 13, wherein the buoyancy cavity is provided at a front end and a rear end of the cleaning device.

15. The cleaning device according to claim 1, comprising a top cover housing, wherein when the top cover housing is opened, the filtering mechanism is removed from the cleaning device.

16. The cleaning device according to claim 1, comprising a nozzle, wherein when the cleaning device performs water surface cleaning, garbage at a waterline of the pool wall or a corner is blown to a cleaning range of the filtering box opening for water surface cleaning by using the nozzle.

17. The cleaning device according to claim 1, further comprising: a filtering box opening cover plate for water surface cleaning, configured to be opened to expose the filtering box opening for water surface cleaning or cover the filtering box opening for water surface cleaning; and a filtering box opening cover plate for underwater cleaning, configured to be opened to expose the filtering box opening for underwater cleaning or cover the filtering box opening for underwater cleaning.

18. The cleaning device according to claim 17, wherein the filtering box opening cover plate for water surface cleaning is disposed outside the at least one filtering box roller brush assembly.

19. The cleaning device according to claim 17, wherein when the cleaning device performs water surface cleaning in the third motion state, the filtering box opening cover plate for water surface cleaning is opened to expose the filtering box opening for water surface cleaning, and the filtering box opening cover plate for underwater cleaning covers the filtering box opening for underwater cleaning.

20. The cleaning device according to claim 17, wherein when the cleaning device operates in the first motion state or the second motion state, the filtering box opening cover plate for water surface cleaning covers the filtering box opening for water surface cleaning, and the filtering box opening cover plate for underwater cleaning is opened to expose the filtering box opening for underwater cleaning.

* * * * *